United States Patent
Haddock et al.

(10) Patent No.: US 11,739,529 B2
(45) Date of Patent: *Aug. 29, 2023

(54) MOUNTING DEVICE FOR A METAL ROOF

(71) Applicant: RMH Tech LLC, Colorado Springs, CO (US)

(72) Inventors: Dustin M. M. Haddock, Colorado Springs, CO (US); Jonathon Moss, Colorado Springs, CO (US); Nikolaus Jo Holley, Colorado Springs, CO (US)

(73) Assignee: RMH TECH LLC, Colorado Springs, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/833,252

(22) Filed: Jun. 6, 2022

(65) Prior Publication Data

US 2022/0298795 A1    Sep. 22, 2022

Related U.S. Application Data

(63) Continuation of application No. 17/203,481, filed on Mar. 16, 2021, now Pat. No. 11,352,793.
(Continued)

(51) Int. Cl.
*E04D 13/00* (2006.01)
*F16B 2/06* (2006.01)
(Continued)

(52) U.S. Cl.
CPC .............. *E04D 13/00* (2013.01); *F16B 2/065* (2013.01); *E04D 3/30* (2013.01); *E04D 3/362* (2013.01);
(Continued)

(58) Field of Classification Search
CPC .......... E04D 13/00; E04D 3/30; E04D 3/362; E04B 1/61; E04B 2001/405;
(Continued)

(56) References Cited

U.S. PATENT DOCUMENTS 42,992 A    5/1864  Howe
97,316 A    11/1869 Rogers
(Continued)

FOREIGN PATENT DOCUMENTS

AT    13076    8/1903
AT    26329    11/1906
(Continued)

OTHER PUBLICATIONS

U.S. Appl. No. 14/257,747, filed Apr. 21, 2014 now U.S. Pat. No. 9,085,000.
(Continued)

*Primary Examiner* — Tan Le
(74) *Attorney, Agent, or Firm* — Sheridan Ross P.C.

(57) ABSTRACT

A mounting device or clamp is provided that can be secured to a roof joint without damaging the roof joint. Two roof panels can be joined at a roof joint that extends away from the roof. The clamp has a body with a slot to receive the roof joint. An insert of the clamp is rotatable relative to the body from a first position to a second position. The clamp body can be positioned over the roof joint, and the insert can rotate or pivot from the first position to the second position relative to the body to secure the clamp to the roof joint. In one embodiment, a body of the clamp has a first arm that is concave and the insert has a concave portion to engage the roof joint. Alternatively, in another embodiment, the insert can be connected to the clamp body such that either a first projection or a second projection of the insert faces a roof joint.

20 Claims, 28 Drawing Sheets

Related U.S. Application Data

(60) Provisional application No. 62/990,160, filed on Mar. 16, 2020, provisional application No. 62/990,161, filed on Mar. 16, 2020.

(51) Int. Cl.
| | | |
|---|---|---|
| *E04D 3/30* | (2006.01) | |
| *H02S 20/23* | (2014.01) | |
| *E04D 3/362* | (2006.01) | |
| *F16B 5/12* | (2006.01) | |
| *F24S 25/63* | (2018.01) | |
| *F24S 25/615* | (2018.01) | |

(52) U.S. Cl.
CPC ............ *F16B 5/126* (2013.01); *F24S 25/615* (2018.05); *F24S 25/63* (2018.05); *H02S 20/23* (2014.12)

(58) Field of Classification Search
CPC ........ E04F 13/0842; F16B 2/06; F16B 2/065; F16B 5/126; F16B 5/065; H02S 20/23; F24S 25/63; F24S 25/615
See application file for complete search history.

(56) References Cited

U.S. PATENT DOCUMENTS

| | | | |
|---|---|---|---|
| 106,580 A | 8/1870 | Hathorn | |
| 189,431 A | 4/1877 | Creighton | |
| 224,608 A | 2/1880 | Rendle | |
| 250,580 A | 12/1881 | Rogers | |
| 332,413 A | 12/1885 | List | |
| 386,316 A | 7/1888 | Hawthorne | |
| 405,605 A | 6/1889 | Sagendorph | |
| 407,772 A | 7/1889 | Curtis et al. | |
| 446,217 A | 2/1891 | Dickelman | |
| 459,876 A | 9/1891 | Powers | |
| 472,014 A | 3/1892 | Densmore | |
| 473,512 A | 4/1892 | Laird | |
| 491,173 A | 2/1893 | Hayward | |
| 507,776 A | 10/1893 | Berger et al. | |
| 529,774 A | 11/1894 | Baird | |
| 602,983 A | 4/1898 | Folsom | |
| 733,697 A | 7/1903 | Chronik | |
| 756,884 A | 4/1904 | Parry | |
| 831,445 A | 9/1906 | Kosmatka | |
| 881,757 A | 3/1908 | Winsor | |
| 884,850 A | 4/1908 | Peter | |
| 927,522 A | 7/1909 | Gery | |
| 933,784 A | 9/1909 | Peter | |
| 939,516 A | 11/1909 | Laird | |
| 1,054,091 A | 2/1913 | Darnall | |
| 1,085,474 A | 1/1914 | Peterson | |
| 1,136,460 A | 4/1915 | Wright | |
| 1,230,363 A | 6/1917 | Baird | |
| 1,279,669 A | 9/1918 | Deming | |
| 1,330,309 A | 2/1920 | Dixon | |
| 1,399,461 A | 12/1921 | Childs | |
| 1,463,065 A | 7/1923 | Sieger | |
| 1,465,042 A | 8/1923 | Hruska | |
| 1,477,088 A * | 12/1923 | Turner | ...................... A23L 3/32 |
| | | | 426/247 |
| 1,511,529 A | 10/1924 | Standlee | |
| 1,620,428 A | 3/1927 | Becker | |
| 1,735,927 A | 11/1929 | Shaffer | |
| 1,735,937 A | 11/1929 | Shaffer | |
| 1,893,481 A | 1/1933 | Adams | |
| 1,946,862 A | 2/1934 | Koch, Jr. | |
| 1,957,933 A | 5/1934 | Brandl | |
| 2,079,768 A | 5/1937 | Levow | |
| 2,150,497 A | 3/1939 | Berg | |
| 2,183,008 A | 12/1939 | Camp | |
| 2,183,844 A | 12/1939 | Murphy | |
| 2,192,720 A | 3/1940 | Tapman | |
| 2,201,320 A | 5/1940 | Place | |
| 2,250,401 A | 7/1941 | Sylvester | |
| 2,274,010 A | 2/1942 | Stellin | |
| 2,340,692 A | 2/1944 | Ridd | |
| 2,429,833 A | 10/1947 | Luce | |
| 2,443,362 A | 6/1948 | Tinnerman | |
| 2,448,752 A | 9/1948 | Wagner | |
| 2,457,250 A | 12/1948 | Macomber | |
| 2,472,586 A | 6/1949 | Harvey | |
| 2,504,776 A | 4/1950 | Woodfield et al. | |
| 2,525,217 A | 10/1950 | Glitsch | |
| 2,574,007 A | 11/1951 | Anderson | |
| 2,658,247 A | 11/1953 | Heuer | |
| 2,714,037 A | 7/1955 | Singer et al. | |
| 2,730,381 A | 1/1956 | Curtiss | |
| 2,740,027 A | 3/1956 | Budd et al. | |
| 2,808,491 A | 10/1957 | Rhee et al. | |
| 2,810,173 A | 10/1957 | Bearden | |
| 2,875,805 A | 3/1959 | Flora | |
| 2,985,174 A * | 5/1961 | Guth | ........................ B42F 9/00 |
| | | | 24/67.1 |
| 3,039,161 A | 6/1962 | Gagnon | |
| 3,064,772 A | 11/1962 | Clay | |
| 3,095,672 A | 7/1963 | Di Tullio | |
| 3,112,016 A | 11/1963 | Peterson | |
| 3,136,206 A | 6/1964 | Adams | |
| 3,194,524 A | 7/1965 | Trumbull | |
| 3,221,467 A | 12/1965 | Henkels | |
| 3,231,076 A | 1/1966 | Frieman | |
| 3,232,393 A | 2/1966 | Attwod | |
| 3,232,573 A | 2/1966 | Berman | |
| 3,242,620 A | 3/1966 | Kaiser | |
| 3,247,316 A | 4/1966 | Weimer, Jr. | |
| 3,288,409 A | 11/1966 | Bethea, Jr. | |
| 3,296,750 A | 1/1967 | Zaleski | |
| 3,298,653 A | 1/1967 | Omholt | |
| 3,301,513 A | 1/1967 | Masao | |
| 3,307,235 A | 3/1967 | Hennings | |
| 3,318,057 A | 5/1967 | Norsworthy | |
| 3,333,799 A | 8/1967 | Peterson | |
| 3,335,995 A | 8/1967 | Pickles | |
| 3,341,909 A | 9/1967 | Havener | |
| 3,363,864 A | 1/1968 | Olgreen | |
| 3,394,524 A | 7/1968 | Howarth | |
| 3,425,127 A | 2/1969 | Long | |
| 3,482,369 A | 12/1969 | Burke | |
| 3,495,363 A | 2/1970 | Johnson | |
| 3,496,691 A | 2/1970 | Seaburg et al. | |
| 3,503,244 A | 3/1970 | Joslin | |
| 3,523,709 A | 8/1970 | Heggy et al. | |
| 3,527,619 A | 9/1970 | Miley | |
| 3,565,380 A | 2/1971 | Langren | |
| 3,572,623 A | 3/1971 | Lapp | |
| 3,590,543 A | 7/1971 | Heirich | |
| 3,656,747 A | 4/1972 | Revell, Jr. et al. | |
| 3,667,182 A | 6/1972 | Stemler | |
| 3,667,185 A | 6/1972 | Maurer | |
| 3,715,705 A | 2/1973 | Kuo | |
| 3,719,919 A | 3/1973 | Tibolla | |
| 3,753,326 A | 8/1973 | Kaufman, Sr. | |
| 3,778,537 A | 12/1973 | Miller | |
| 3,792,560 A | 2/1974 | Naylor | |
| 3,809,799 A | 5/1974 | Taylor | |
| 3,810,069 A | 5/1974 | Jaconette, Jr. | |
| 3,817,270 A | 6/1974 | Ehrens et al. | |
| 3,824,664 A | 7/1974 | Seeff | |
| 3,845,601 A | 11/1974 | Kostecky | |
| 3,861,098 A | 1/1975 | Schaub | |
| 3,904,161 A | 9/1975 | Scott | |
| 3,914,001 A | 10/1975 | Nelson et al. | |
| 3,921,253 A | 11/1975 | Nelson | |
| 3,960,352 A | 6/1976 | Plattner et al. | |
| 3,986,746 A | 10/1976 | Chartier | |
| 3,998,018 A | 12/1976 | Hodges | |
| 4,001,474 A | 1/1977 | Hereth | |
| 4,007,574 A | 2/1977 | Riddell | |
| 4,018,538 A | 4/1977 | Smyrni et al. | |
| 4,034,532 A | 7/1977 | Reinwall, Jr. | |
| 4,051,289 A | 9/1977 | Adamson | |
| 4,127,975 A | 12/1978 | Judkins | |

(56) References Cited

U.S. PATENT DOCUMENTS

| | | | |
|---|---|---|---|
| 4,130,970 A | 12/1978 | Cable | |
| 4,141,182 A | 2/1979 | McMullen | |
| 4,147,257 A * | 4/1979 | Zippel .................... G09F 5/00 |
| | | | 24/67.1 |
| 4,162,595 A | 7/1979 | Ramos et al. | |
| 4,162,755 A | 7/1979 | Bott | |
| 4,189,882 A | 2/1980 | Harrison et al. | |
| 4,189,891 A | 2/1980 | Johnson et al. | |
| 4,200,107 A | 4/1980 | Reid | |
| 4,203,646 A | 5/1980 | Desso et al. | |
| 4,215,677 A | 8/1980 | Erickson | |
| 4,223,053 A | 9/1980 | Brogan | |
| 4,252,458 A | 2/1981 | Keen | |
| 4,261,338 A | 4/1981 | McAlister | |
| 4,261,384 A | 4/1981 | Dahlbring | |
| 4,263,474 A | 4/1981 | Tennant | |
| 4,270,721 A | 6/1981 | Mainor, Jr. | |
| 4,291,934 A | 9/1981 | Kund | |
| 4,307,976 A | 12/1981 | Butler | |
| 4,321,416 A | 3/1982 | Tennant | |
| 4,351,140 A | 9/1982 | Simpson | |
| 4,358,916 A | 11/1982 | Lacasse | |
| 4,366,656 A | 1/1983 | Simpson | |
| 4,393,859 A | 7/1983 | Marossy et al. | |
| 4,449,335 A | 5/1984 | Fahey | |
| 4,456,321 A | 6/1984 | Jones et al. | |
| 4,461,514 A | 7/1984 | Schwarz | |
| 4,467,582 A | 8/1984 | Hague | |
| 4,475,776 A | 10/1984 | Teramachi | |
| 4,546,586 A | 10/1985 | Knudson | |
| 4,560,224 A | 12/1985 | Weisenburger | |
| 4,567,706 A | 2/1986 | Wendt | |
| 4,570,405 A | 2/1986 | Knudson | |
| 4,588,240 A | 5/1986 | Ruehl et al. | |
| 4,593,877 A | 6/1986 | van der Wyk | |
| 4,601,600 A | 7/1986 | Karlsson | |
| 4,656,794 A | 4/1987 | Thevenin et al. | |
| 4,666,116 A | 5/1987 | Lloyd | |
| 4,669,808 A | 6/1987 | Owen | |
| 4,674,252 A | 6/1987 | Nicholas et al. | |
| 4,682,454 A | 7/1987 | Simpson | |
| 4,686,809 A | 8/1987 | Skelton | |
| 4,701,586 A | 10/1987 | Hagberg | |
| 4,704,058 A | 11/1987 | Crunwell | |
| 4,753,425 A | 6/1988 | Yang | |
| 4,773,791 A | 9/1988 | Hartkorn | |
| 4,782,642 A | 11/1988 | Conville | |
| 4,799,444 A | 1/1989 | Lisowski | |
| 4,805,364 A | 2/1989 | Smolik | |
| 4,809,476 A | 3/1989 | Satchell | |
| 4,810,573 A | 3/1989 | Harriett | |
| 4,835,927 A | 6/1989 | Michlovic | |
| 4,840,529 A | 6/1989 | Phillips | |
| 4,848,858 A | 7/1989 | Suzuki | |
| 4,854,096 A | 8/1989 | Smolik | |
| 4,864,081 A | 9/1989 | Bates | |
| 4,878,331 A | 11/1989 | Taylor | |
| 4,895,338 A | 1/1990 | Froutzis | |
| 4,901,963 A | 2/1990 | Yoder | |
| 4,905,444 A | 3/1990 | Semaan | |
| 4,909,011 A | 3/1990 | Freeman et al. | |
| 4,949,929 A | 8/1990 | Kesselman et al. | |
| 4,961,712 A | 10/1990 | Schwenk et al. | |
| 4,970,833 A | 11/1990 | Porter | |
| 4,987,699 A | 1/1991 | Gold | |
| 4,991,368 A | 2/1991 | Amstutz | |
| 4,993,959 A | 2/1991 | Randolph | |
| 5,007,612 A | 4/1991 | Manfre | |
| 5,019,111 A | 5/1991 | Dempsey et al. | |
| 5,036,949 A | 8/1991 | Crocker et al. | |
| 5,039,352 A | 8/1991 | Mueller | |
| 5,092,939 A | 3/1992 | Nath et al. | |
| 5,094,435 A | 3/1992 | Depperman | |
| 5,118,571 A | 6/1992 | Petersen | |
| 5,119,612 A | 6/1992 | Taylor et al. | |
| 5,125,608 A | 6/1992 | McMaster et al. | |
| 5,127,205 A | 7/1992 | Eidson | |
| 5,138,820 A | 8/1992 | Pearce | |
| 5,140,793 A | 8/1992 | Knudson | |
| 5,152,107 A | 10/1992 | Strickert | |
| 5,164,020 A | 11/1992 | Wagner et al. | |
| 5,176,462 A | 1/1993 | Chen | |
| 5,187,911 A | 2/1993 | Cotter | |
| 5,213,300 A | 5/1993 | Rees | |
| 5,222,340 A | 6/1993 | Bellem | |
| 5,224,427 A | 7/1993 | Riches et al. | |
| 5,228,248 A | 7/1993 | Haddock | |
| 5,251,993 A | 10/1993 | Sigourney | |
| 5,268,038 A | 12/1993 | Riermeier et al. | |
| 5,271,194 A | 12/1993 | Drew | |
| 5,277,006 A | 1/1994 | Ruster | |
| 5,282,340 A | 2/1994 | Cline et al. | |
| 5,287,670 A | 2/1994 | Funaki | |
| 5,290,366 A | 3/1994 | Riermeier et al. | |
| 5,307,601 A | 5/1994 | McCracken | |
| 5,312,079 A | 5/1994 | Little, Jr. | |
| 5,313,752 A | 5/1994 | Hatzinikolas | |
| D347,701 S | 6/1994 | McCracken | |
| 5,352,154 A | 10/1994 | Rotter et al. | |
| 5,356,519 A | 10/1994 | Grabscheid et al. | |
| 5,356,705 A | 10/1994 | Kelch et al. | |
| D351,989 S | 11/1994 | Cline et al. | |
| 5,363,615 A | 11/1994 | Christopher et al. | |
| 5,363,624 A | 11/1994 | Cotter | |
| 5,379,567 A | 1/1995 | Vahey | |
| 5,390,453 A | 2/1995 | Untiedt | |
| 5,391,084 A | 2/1995 | Kreitzman | |
| 5,392,574 A | 2/1995 | Sayers | |
| 5,408,797 A | 4/1995 | Bellem | |
| 5,409,549 A | 4/1995 | Mori | |
| 5,413,063 A | 5/1995 | King | |
| 5,413,397 A | 5/1995 | Gold | |
| 5,417,028 A | 5/1995 | Meyer | |
| 5,425,209 A | 6/1995 | Funaki | |
| 5,426,906 A | 6/1995 | McCracken | |
| 5,439,307 A | 8/1995 | Steinhilber | |
| 5,453,027 A | 9/1995 | Buell et al. | |
| D364,338 S | 11/1995 | Cline | |
| 5,479,752 A | 1/1996 | Menegoli | |
| 5,482,234 A | 1/1996 | Lyon | |
| 5,483,772 A | 1/1996 | Haddock | |
| 5,483,782 A | 1/1996 | Hall | |
| 5,491,931 A | 2/1996 | Haddock | |
| 5,497,591 A | 3/1996 | Nelson | |
| 5,522,185 A | 6/1996 | Cline | |
| 5,533,839 A | 7/1996 | Shimada | |
| D372,421 S | 8/1996 | Cline | |
| 5,557,903 A | 9/1996 | Haddock | |
| 5,571,338 A | 11/1996 | Kadonome et al. | |
| 5,596,858 A | 1/1997 | Jordan | |
| 5,596,859 A | 1/1997 | Horton et al. | |
| 5,598,785 A | 2/1997 | Zaguroli, Jr. | |
| 5,600,971 A | 2/1997 | Suk | |
| D378,343 S | 3/1997 | Macor | |
| 5,609,326 A | 3/1997 | Stearns et al. | |
| 5,613,328 A | 3/1997 | Alley | |
| 5,640,812 A | 6/1997 | Crowley et al. | |
| 5,647,178 A | 7/1997 | Cline | |
| 5,660,008 A | 8/1997 | Bevilacqua | |
| 5,664,750 A | 9/1997 | Cohen | |
| 5,667,181 A | 9/1997 | van Leeuwen et al. | |
| D384,574 S | 10/1997 | Cox | |
| 5,681,191 A | 10/1997 | Robicheau et al. | |
| 5,688,131 A | 11/1997 | Byfield, Jr. | |
| D387,443 S | 12/1997 | Blankenbiller | |
| 5,694,721 A | 12/1997 | Haddock | |
| 5,697,197 A | 12/1997 | Simpson | |
| 5,715,640 A | 2/1998 | Haddock | |
| 5,732,513 A | 3/1998 | Alley | |
| 5,743,063 A | 4/1998 | Boozer | |
| 5,743,497 A | 4/1998 | Michael | |
| 5,746,029 A | 5/1998 | Ullman | |
| 5,755,824 A | 5/1998 | Blechschmidt et al. | |
| 5,765,310 A | 6/1998 | Gold | |

(56) References Cited

U.S. PATENT DOCUMENTS

| | | |
|---|---|---|
| 5,765,329 A | 6/1998 | Huang |
| 5,787,653 A | 8/1998 | Sakai et al. |
| 5,794,386 A | 8/1998 | Klein |
| 5,809,703 A | 9/1998 | Kelly |
| 5,826,379 A | 10/1998 | Curry |
| 5,826,390 A | 10/1998 | Sacks |
| 5,828,008 A | 10/1998 | Lockwood et al. |
| 5,829,723 A | 11/1998 | Brunner et al. |
| 5,842,318 A | 12/1998 | Bass et al. |
| 5,853,296 A | 12/1998 | Gunther et al. |
| 5,885,118 A | 3/1999 | Billenstein et al. |
| 5,890,340 A | 4/1999 | Kafarowski |
| 5,897,088 A | 4/1999 | Kirschner |
| 5,901,507 A | 5/1999 | Smeja et al. |
| 5,942,046 A | 8/1999 | Kahlfuss et al. |
| 5,970,586 A | 10/1999 | Demel et al. |
| 5,983,588 A | 11/1999 | Haddock |
| 5,987,714 A | 11/1999 | Smith |
| 5,994,640 A | 11/1999 | Bansemir et al. |
| 5,997,368 A | 12/1999 | Mello et al. |
| 6,029,415 A | 2/2000 | Culpepper et al. |
| 6,073,410 A | 6/2000 | Schimpf et al. |
| 6,073,920 A | 6/2000 | Colley |
| 6,079,678 A | 6/2000 | Schott et al. |
| 6,083,010 A | 7/2000 | Daoud |
| 6,088,979 A | 7/2000 | Neal |
| 6,095,462 A | 8/2000 | Morgan |
| 6,099,203 A | 8/2000 | Landes |
| 6,105,317 A | 8/2000 | Tomiuchi et al. |
| 6,106,310 A | 8/2000 | Davis et al. |
| 6,111,189 A | 8/2000 | Garvison et al. |
| 6,119,317 A | 9/2000 | Pfister |
| 6,132,070 A | 10/2000 | Vosika et al. |
| 6,158,180 A | 12/2000 | Edwards |
| 6,164,033 A | 12/2000 | Haddock |
| 6,182,403 B1 | 2/2001 | Mimura et al. |
| 6,186,799 B1 | 2/2001 | Mello |
| 6,206,991 B1 | 3/2001 | Starr |
| 6,223,477 B1 | 5/2001 | Alley |
| 6,237,297 B1 | 5/2001 | Paroly |
| 6,253,496 B1 | 7/2001 | Gilchrist |
| 6,256,934 B1 | 7/2001 | Alley |
| 6,269,596 B1 | 8/2001 | Ohtsuka et al. |
| 6,276,285 B1 | 8/2001 | Ruch |
| 6,312,283 B1 | 11/2001 | Hio |
| 6,320,114 B1 | 11/2001 | Kuechler |
| 6,336,616 B1 | 1/2002 | Lin |
| 6,360,491 B1 | 3/2002 | Ullman |
| 6,364,262 B1 | 4/2002 | Gibson et al. |
| 6,364,374 B1 | 4/2002 | Noone et al. |
| 6,370,828 B1 | 4/2002 | Genschorek |
| 6,382,569 B1 | 5/2002 | Schattner et al. |
| 6,385,914 B2 | 5/2002 | Alley |
| 6,393,796 B1 | 5/2002 | Goettl et al. |
| 6,443,680 B1 | 9/2002 | Bodin |
| 6,453,623 B1 | 9/2002 | Nelson et al. |
| 6,470,629 B1 | 10/2002 | Haddock |
| 6,497,080 B1 | 12/2002 | Malcolm |
| 6,499,259 B1 | 12/2002 | Hockman |
| 6,508,442 B1 | 1/2003 | Dolez |
| 6,521,821 B2 | 2/2003 | Makita et al. |
| 6,534,702 B1 | 3/2003 | Makita et al. |
| 6,536,166 B1 | 3/2003 | Alley |
| 6,536,729 B1 | 3/2003 | Haddock |
| 6,576,830 B2 | 6/2003 | Nagao et al. |
| 6,602,016 B2 | 8/2003 | Eckart et al. |
| 6,622,441 B2 | 9/2003 | Miller |
| 6,637,671 B2 | 10/2003 | Alley |
| 6,647,671 B1 | 11/2003 | Alley |
| 6,655,633 B1 | 12/2003 | Chapman, Jr. |
| 6,665,991 B2 | 12/2003 | Hasan |
| 6,688,047 B1 | 2/2004 | McNichol |
| D487,595 S | 3/2004 | Sherman |
| 6,715,256 B1 | 4/2004 | Fischer |
| 6,718,718 B2 | 4/2004 | Haddock |
| 6,725,623 B1 | 4/2004 | Riddell et al. |
| 6,730,841 B2 | 5/2004 | Heckeroth |
| 6,732,982 B1 | 5/2004 | Messinger |
| 6,751,919 B2 | 6/2004 | Calixto |
| D495,595 S | 9/2004 | Dressier |
| D496,738 S | 9/2004 | Sherman |
| 6,799,742 B2 | 10/2004 | Nakamura et al. |
| 6,834,466 B2 | 12/2004 | Trevorrow et al. |
| 6,918,217 B2 | 7/2005 | Jakob-Bamberg et al. |
| 6,918,727 B2 | 7/2005 | Huang |
| 6,922,948 B2 | 8/2005 | Smeja et al. |
| 6,967,278 B2 | 11/2005 | Hatsukaiwa et al. |
| 7,012,188 B2 | 3/2006 | Erling |
| 7,013,612 B2 | 3/2006 | Haddock |
| 7,063,763 B2 | 6/2006 | Chapman, Jr. |
| 7,100,338 B2 | 9/2006 | Haddock |
| 7,104,020 B1 | 9/2006 | Suttle |
| 7,127,852 B1 | 10/2006 | Dressler |
| 7,191,794 B2 | 3/2007 | Hodges |
| 7,195,513 B1 | 3/2007 | Gherardini |
| 7,219,863 B1 | 5/2007 | Collett, II |
| 7,240,770 B2 | 7/2007 | Mullins et al. |
| 7,260,918 B2 | 8/2007 | Liebendorfer |
| 7,281,695 B2 | 10/2007 | Jordan |
| 7,386,922 B1 | 6/2008 | Taylor et al. |
| 7,406,924 B1 | 8/2008 | Impey |
| 7,410,139 B1 | 8/2008 | Rorich |
| 7,431,252 B2 | 10/2008 | Birli et al. |
| 7,435,134 B2 | 10/2008 | Lenox |
| 7,451,573 B2 | 11/2008 | Orszulak et al. |
| 7,458,555 B2 | 12/2008 | Mastropaolo et al. |
| 7,459,196 B2 | 12/2008 | Sturm |
| 7,469,511 B2 | 12/2008 | Wobber |
| 7,493,730 B2 | 2/2009 | Fennell, Jr. |
| 7,513,080 B1 | 4/2009 | Showalter |
| 7,516,580 B2 | 4/2009 | Fennell, Jr. |
| 7,568,871 B2 | 8/2009 | Chopp, Jr. et al. |
| 7,578,711 B2 | 8/2009 | Robinson |
| 7,600,349 B2 | 10/2009 | Liebendorfer |
| 7,658,356 B1 | 2/2010 | Nehls |
| 7,686,625 B1 | 3/2010 | Dyer et al. |
| 7,703,256 B2 | 4/2010 | Haddock |
| 7,707,800 B2 | 5/2010 | Kannisto |
| 7,712,278 B2 | 5/2010 | Lonardi |
| 7,721,492 B2 | 5/2010 | Plaisted et al. |
| 7,731,138 B2 | 6/2010 | Wiesner et al. |
| 7,733,667 B2 | 6/2010 | Qin et al. |
| 7,758,003 B2 | 7/2010 | Pourtier et al. |
| 7,758,011 B2 | 7/2010 | Haddock |
| 7,762,027 B1 | 7/2010 | Wentworth et al. |
| 7,766,292 B2 | 8/2010 | Liebendorfer |
| 7,780,472 B2 | 8/2010 | Lenox |
| 7,788,874 B2 | 9/2010 | Miller |
| 7,788,879 B2 | 9/2010 | Brandes et al. |
| 7,824,191 B1 | 11/2010 | Browder |
| 7,827,920 B2 | 11/2010 | Beck et al. |
| 7,845,127 B2 | 12/2010 | Brescia |
| 7,847,181 B2 | 12/2010 | Brescia |
| 7,861,480 B2 | 1/2011 | Wendelburg et al. |
| 7,861,485 B1 | 1/2011 | Wentworth et al. |
| 7,874,117 B1 | 1/2011 | Simpson |
| 7,891,618 B2 | 2/2011 | Carnevali |
| 7,895,808 B1 | 3/2011 | Wentworth et al. |
| 7,905,064 B1 | 3/2011 | Wentworth et al. |
| 7,915,519 B2 | 3/2011 | Kobayashi |
| 7,926,777 B2 | 4/2011 | Koesema, Jr. |
| 7,954,287 B2 | 6/2011 | Bravo et al. |
| 7,976,257 B2 | 7/2011 | Kufner et al. |
| 7,988,464 B2 | 8/2011 | Kossak et al. |
| 8,011,153 B2 | 9/2011 | Orchard |
| 8,066,200 B2 | 11/2011 | Hepner et al. |
| 8,070,119 B2 | 12/2011 | Taylor |
| 8,092,129 B2 | 1/2012 | Wiley et al. |
| 8,096,503 B2 | 1/2012 | Verweyen |
| D653,940 S | 2/2012 | Yasher |
| 8,109,048 B2 | 2/2012 | West |
| 8,146,299 B2 | 4/2012 | Stearns et al. |
| 8,151,522 B2 | 4/2012 | Stearns et al. |
| 8,153,700 B2 | 4/2012 | Stearns et al. |

(56) References Cited

U.S. PATENT DOCUMENTS

| | | |
|---|---|---|
| D658,977 S | 5/2012 | Riddell et al. |
| 8,226,061 B2 | 7/2012 | Nehls |
| 8,251,326 B2 | 8/2012 | McPheeters |
| 8,272,172 B2 | 9/2012 | Li |
| 8,294,026 B2 | 10/2012 | Wang et al. |
| 8,312,678 B1 | 11/2012 | Haddock |
| 8,316,590 B2 | 11/2012 | Cusson |
| 8,316,621 B2 | 11/2012 | Safari Kermanshahi et al. |
| D674,513 S | 1/2013 | Liu |
| 8,344,239 B2 | 1/2013 | Plaisted |
| 8,347,572 B2 | 1/2013 | Piedmont |
| 8,375,654 B1 | 2/2013 | West et al. |
| 8,387,319 B1 | 3/2013 | Gilles-Gagnon et al. |
| 8,404,963 B2 | 3/2013 | Kobayashi |
| 8,407,895 B2 | 4/2013 | Hartelius et al. |
| 8,413,946 B2 | 4/2013 | Hartelius et al. |
| 8,424,821 B2 | 4/2013 | Liu |
| 8,430,372 B2 | 4/2013 | Haddock |
| 8,448,405 B2 | 5/2013 | Schaefer et al. |
| 8,453,986 B2 | 6/2013 | Schnitzer |
| 8,458,967 B2 | 6/2013 | Kalkanoglu et al. |
| 8,495,997 B1 | 7/2013 | Laubach |
| 8,505,254 B2 | 8/2013 | Welter et al. |
| 8,528,888 B2 | 9/2013 | Header |
| 8,584,424 B2 | 11/2013 | Smith |
| 8,590,223 B2 | 11/2013 | Kilgore et al. |
| 8,627,617 B2 | 1/2014 | Haddock et al. |
| 8,627,632 B2 | 1/2014 | Werner et al. |
| D699,176 S | 2/2014 | Salomon et al. |
| 8,640,402 B1 | 2/2014 | Bilge |
| 8,656,649 B2 | 2/2014 | Haddock |
| 8,683,751 B2 | 4/2014 | Stearns |
| 8,695,290 B1 | 4/2014 | Kim et al. |
| 8,701,354 B2 | 4/2014 | Stearns et al. |
| 8,701,372 B2 | 4/2014 | Nuernberger et al. |
| 8,713,881 B2 | 5/2014 | DuPont et al. |
| 8,733,027 B1 | 5/2014 | Marston et al. |
| 8,745,935 B2 | 6/2014 | DuPont et al. |
| 8,752,338 B2 | 6/2014 | Schaefer et al. |
| 8,756,870 B2 | 6/2014 | Teller et al. |
| 8,770,885 B2 | 7/2014 | Myers |
| 8,776,456 B1 | 7/2014 | Schrock |
| 8,782,983 B2 | 7/2014 | Stearns |
| 8,791,611 B2 | 7/2014 | Arnould et al. |
| 8,806,813 B2 | 8/2014 | Plaisted et al. |
| 8,806,815 B1 | 8/2014 | Liu et al. |
| 8,813,441 B2 | 8/2014 | Rizzo |
| 8,826,163 B1 | 9/2014 | Chanin et al. |
| 8,826,618 B2 | 9/2014 | Stearns |
| 8,829,330 B2 | 9/2014 | Meyer et al. |
| 8,833,714 B2 | 9/2014 | Haddock et al. |
| 8,839,573 B2 | 9/2014 | Cusson et al. |
| 8,839,575 B1 | 9/2014 | Liu et al. |
| 8,844,234 B2 | 9/2014 | Haddock et al. |
| 8,850,754 B2 | 10/2014 | Rizzo |
| 8,854,829 B1 | 10/2014 | Bopp et al. |
| 8,875,463 B2 | 11/2014 | Plagemann et al. |
| 8,888,431 B2 | 11/2014 | Haney |
| 8,893,441 B1 | 11/2014 | Hess, III et al. |
| 8,894,424 B2 | 11/2014 | DuPont |
| D718,703 S | 12/2014 | Rizzo |
| D718,704 S | 12/2014 | Rizzo |
| 8,910,928 B2 | 12/2014 | Header |
| 8,920,586 B2 | 12/2014 | Poulakis |
| 8,925,263 B2 | 1/2015 | Haddock et al. |
| 8,935,893 B2 | 1/2015 | Liu et al. |
| 8,938,932 B1 | 1/2015 | Wentworth et al. |
| 8,950,157 B1 | 2/2015 | Schrock |
| 8,955,259 B2 | 2/2015 | Hemingway |
| 8,966,833 B2 | 3/2015 | Ally |
| 8,991,065 B1 | 3/2015 | Schrock |
| 9,003,728 B2 | 4/2015 | Asci |
| 9,003,733 B1 | 4/2015 | Simpson et al. |
| 9,010,042 B2 | 4/2015 | Anderson et al. |
| 9,011,034 B2 | 4/2015 | Liu |
| 9,052,123 B2 | 6/2015 | Anderson et al. |
| 9,065,191 B2 | 6/2015 | Martin et al. |
| 9,076,899 B2 | 7/2015 | Schrock |
| 9,085,900 B2 | 7/2015 | Haddock |
| 9,086,185 B2 | 7/2015 | Haddock |
| 9,097,443 B2 | 8/2015 | Liu et al. |
| 9,127,451 B1 | 9/2015 | Boor |
| 9,134,044 B2 | 9/2015 | Stearns et al. |
| 9,147,785 B2 | 9/2015 | Haddock et al. |
| D740,113 S | 10/2015 | Olenick |
| 9,166,524 B2 | 10/2015 | West et al. |
| 9,175,878 B2 | 11/2015 | Kemmer et al. |
| 9,194,130 B1 | 11/2015 | Stanley |
| 9,194,613 B2 | 11/2015 | Nuernberger et al. |
| 9,200,456 B2 | 12/2015 | Murphy |
| 9,222,263 B2 | 12/2015 | Haddock |
| 9,223,907 B2 | 12/2015 | Chanin et al. |
| 9,306,490 B2 | 4/2016 | Haddock et al. |
| 9,309,910 B2 | 4/2016 | Anderson et al. |
| 9,331,629 B2 | 5/2016 | Cheung et al. |
| 9,341,285 B2 | 5/2016 | Magno, Jr. et al. |
| 9,447,988 B2 | 9/2016 | Stearns et al. |
| 9,473,066 B2 | 10/2016 | Stephan et al. |
| 9,479,110 B2 | 10/2016 | Patton et al. |
| 9,496,697 B1 | 11/2016 | Wentworth |
| 9,530,916 B2 | 12/2016 | Haddock et al. |
| 9,534,390 B2 | 1/2017 | Pendley et al. |
| 9,599,280 B2 | 3/2017 | West et al. |
| 9,608,559 B2 | 3/2017 | Haddock et al. |
| 9,611,652 B2 | 4/2017 | Haddock et al. |
| 9,647,433 B2 | 5/2017 | Meine |
| 9,647,607 B2 | 5/2017 | Patton et al. |
| 9,689,411 B2 | 6/2017 | Meine et al. |
| 9,712,106 B2 | 7/2017 | Wentworth et al. |
| 9,714,670 B2 | 7/2017 | Header |
| 9,722,532 B2 | 8/2017 | Almy |
| 9,732,512 B2 | 8/2017 | Haddock |
| 9,742,173 B2 | 8/2017 | Wentworth |
| 9,755,572 B2 | 9/2017 | Wentworth et al. |
| D800,055 S | 10/2017 | Rothschild |
| 9,813,012 B2 | 11/2017 | Wentworth et al. |
| 9,819,303 B2 | 11/2017 | Ash |
| 9,831,817 B2 | 11/2017 | Rothschild |
| 9,845,584 B1 | 12/2017 | Goldammer |
| 9,850,661 B2 | 12/2017 | Kovacs |
| 9,853,593 B2 | 12/2017 | Cinnamon et al. |
| 9,865,938 B2 | 1/2018 | Meine et al. |
| 9,876,463 B2 | 1/2018 | Jasmin |
| 9,893,676 B2 | 2/2018 | Anderson et al. |
| 9,893,677 B1 | 2/2018 | Liu |
| 9,920,958 B2 | 3/2018 | Haddock et al. |
| 9,926,706 B2 | 3/2018 | Hockman |
| 9,966,745 B2 | 5/2018 | Wentworth |
| 9,985,361 B2 | 5/2018 | Martin |
| 9,985,575 B2 | 5/2018 | Stearns et al. |
| 10,036,414 B2 | 7/2018 | Wiley et al. |
| 10,036,576 B1 | 7/2018 | Robinson |
| D827,160 S | 8/2018 | Menton |
| 10,053,856 B2 | 8/2018 | Haddock |
| 10,054,336 B2 | 8/2018 | Haddock et al. |
| D827,873 S | 9/2018 | Menton |
| D827,874 S | 9/2018 | Menton |
| 10,077,562 B2 | 9/2018 | Haddock et al. |
| 10,103,682 B2 | 10/2018 | Haddock et al. |
| 10,103,683 B2 | 10/2018 | Wentworth |
| 10,106,987 B2 | 10/2018 | Haddock et al. |
| 10,141,662 B2 | 11/2018 | Bernard et al. |
| 10,186,791 B2 | 1/2019 | Meine et al. |
| 10,202,991 B2 | 2/2019 | Lewis |
| 10,205,418 B2 | 2/2019 | Nayar |
| 10,211,773 B2 | 2/2019 | Jasmin et al. |
| 10,211,775 B2 | 2/2019 | Wentworth et al. |
| 10,218,305 B1 | 2/2019 | Schrock |
| 10,240,820 B2 | 3/2019 | Ash et al. |
| 10,291,176 B2 | 5/2019 | Wentworth et al. |
| 10,312,855 B2 | 6/2019 | Lester et al. |
| 10,337,764 B2 | 7/2019 | Ash et al. |
| 10,359,069 B2 | 7/2019 | Ash et al. |
| 10,385,573 B2 | 8/2019 | Van Leuven |

(56) References Cited

U.S. PATENT DOCUMENTS

| | | |
|---|---|---|
| 10,443,896 B2 | 10/2019 | Haddock et al. |
| 10,454,190 B1 | 10/2019 | Martin |
| 10,472,828 B2 | 11/2019 | Stearns et al. |
| 10,502,457 B2 | 12/2019 | Haddock et al. |
| 10,511,252 B2 | 12/2019 | Wentworth et al. |
| 10,530,293 B2 | 1/2020 | Legall et al. |
| 10,551,090 B2 | 2/2020 | De Vogel et al. |
| 10,594,251 B2 | 3/2020 | Stearns et al. |
| 10,622,935 B1 | 4/2020 | Liu |
| 10,634,175 B2 | 4/2020 | Haddock |
| 10,640,980 B2 | 5/2020 | Haddock |
| 10,644,643 B2 | 5/2020 | Stearns et al. |
| 10,673,151 B2 | 6/2020 | Ash et al. |
| 10,686,401 B2 | 6/2020 | Ash et al. |
| 10,731,355 B2 | 8/2020 | Haddock et al. |
| 10,749,459 B1 | 8/2020 | Liu et al. |
| 10,749,466 B2 | 8/2020 | Smeja |
| 10,763,777 B2 | 9/2020 | Stearns et al. |
| 10,797,634 B1 | 10/2020 | Jasmin et al. |
| 10,816,240 B2 | 10/2020 | Robinson |
| 10,837,476 B2 | 11/2020 | Lewis |
| 10,851,826 B2 | 12/2020 | Ash et al. |
| 10,859,292 B2 | 12/2020 | Haddock et al. |
| 10,868,491 B2 | 12/2020 | Wentworth et al. |
| 10,903,785 B2 | 1/2021 | Haddock et al. |
| D909,853 S | 2/2021 | Jasmin |
| 10,931,225 B2 | 2/2021 | Yang et al. |
| 10,948,002 B2 | 3/2021 | Haddock |
| 11,009,262 B2 | 5/2021 | Ash et al. |
| 11,012,023 B2 | 5/2021 | Stearns et al. |
| D923,203 S | 6/2021 | Muther |
| D923,823 S | 6/2021 | Muther |
| 11,035,126 B2 | 6/2021 | Haddock et al. |
| 11,041,310 B1 | 6/2021 | Haddock et al. |
| 11,085,188 B2 | 8/2021 | Haddock |
| 11,118,353 B2 | 9/2021 | Stearns et al. |
| 11,121,484 B2 | 9/2021 | Ash et al. |
| 11,121,669 B2 | 9/2021 | Stearns et al. |
| 11,139,773 B2 | 10/2021 | Eriksson |
| 11,139,774 B2 | 10/2021 | Wentworth et al. |
| 11,189,941 B2 | 11/2021 | Ash et al. |
| 11,196,187 B2 | 12/2021 | Ash et al. |
| 11,201,581 B2 | 12/2021 | Stearns et al. |
| 11,296,648 B1 | 4/2022 | Jasmin et al. |
| 11,333,179 B2 | 5/2022 | Haddock |
| 11,352,793 B2 * | 6/2022 | Haddock ................. F16B 2/065 |
| 11,368,005 B2 | 6/2022 | Meine et al. |
| 11,552,591 B2 | 1/2023 | Jasmin et al. |
| 11,575,343 B2 | 2/2023 | Wentworth et al. |
| 2002/0026765 A1 | 3/2002 | Vahey |
| 2002/0088196 A1 | 7/2002 | Haddock |
| 2002/0160635 A1 | 10/2002 | Kurrer et al. |
| 2003/0015637 A1 | 1/2003 | Liebendorfer |
| 2003/0062078 A1 | 4/2003 | Mimura |
| 2003/0070368 A1 | 4/2003 | Shingleton |
| 2003/0131551 A1 | 7/2003 | Mollinger et al. |
| 2003/0146346 A1 | 8/2003 | Chapman, Jr. |
| 2003/0173460 A1 | 9/2003 | Chapman, Jr. |
| 2003/0201009 A1 | 10/2003 | Nakajima et al. |
| 2004/0035065 A1 | 2/2004 | Orszulak et al. |
| 2004/0055233 A1 | 3/2004 | Showalter |
| 2004/0164208 A1 | 8/2004 | Nielson et al. |
| 2004/0231949 A1 | 11/2004 | Le et al. |
| 2004/0237465 A1 | 12/2004 | Refond |
| 2005/0102958 A1 | 5/2005 | Anderson |
| 2005/0115176 A1 | 6/2005 | Russell |
| 2005/0117997 A1 | 6/2005 | Pinzl |
| 2005/0210769 A1 | 9/2005 | Harvey |
| 2005/0257434 A1 | 11/2005 | Hockman |
| 2006/0065805 A1 | 3/2006 | Barton et al. |
| 2006/0075691 A1 | 4/2006 | Verkamlp |
| 2006/0096061 A1 | 5/2006 | Weiland et al. |
| 2006/0118163 A1 | 6/2006 | Plaisted et al. |
| 2006/0174571 A1 | 8/2006 | Panasik et al. |
| 2006/0174931 A1 | 8/2006 | Mapes et al. |
| 2006/0254192 A1 | 11/2006 | Fennell, Jr. |
| 2007/0075198 A1 | 4/2007 | Foser |
| 2007/0131273 A1 | 6/2007 | Kobayashi |
| 2007/0199590 A1 | 8/2007 | Tanaka et al. |
| 2007/0241238 A1 | 10/2007 | Neace |
| 2007/0246039 A1 | 10/2007 | Brazier et al. |
| 2007/0248434 A1 | 10/2007 | Wiley et al. |
| 2007/0289229 A1 | 12/2007 | Aldo |
| 2007/0289233 A1 | 12/2007 | Haddock |
| 2008/0035140 A1 | 2/2008 | Placer et al. |
| 2008/0041011 A1 | 2/2008 | Kannisto |
| 2008/0184639 A1 | 8/2008 | Cotter |
| 2008/0190047 A1 | 8/2008 | Allen |
| 2008/0236520 A1 | 10/2008 | Maehara et al. |
| 2008/0265232 A1 | 10/2008 | Terrels et al. |
| 2008/0302407 A1 | 12/2008 | Kobayashi |
| 2009/0000220 A1 | 1/2009 | Lenox |
| 2009/0007520 A1 | 1/2009 | Navon |
| 2009/0194098 A1 | 8/2009 | Placer |
| 2009/0229213 A1 | 9/2009 | Mistelski |
| 2009/0230205 A1 | 9/2009 | Hepner et al. |
| 2009/0320826 A1 | 12/2009 | Kufner |
| 2010/0058701 A1 | 3/2010 | Yao et al. |
| 2010/0133040 A1 | 6/2010 | London |
| 2010/0154784 A1 | 6/2010 | King et al. |
| 2010/0162641 A1 | 7/2010 | Reyal et al. |
| 2010/0171016 A1 | 7/2010 | Haddock |
| 2010/0175738 A1 | 7/2010 | Huss et al. |
| 2010/0192505 A1 | 8/2010 | Schaefer et al. |
| 2010/0193651 A1 | 8/2010 | Railsback et al. |
| 2010/0206303 A1 | 8/2010 | Thorne |
| 2010/0212720 A1 | 8/2010 | Meyer et al. |
| 2010/0276558 A1 | 11/2010 | Faust et al. |
| 2010/0288337 A1 | 11/2010 | Rizzo |
| 2010/0293874 A1 | 11/2010 | Liebendorfer |
| 2010/0314517 A1 | 12/2010 | Patzer |
| 2011/0039458 A1 | 2/2011 | Byrne |
| 2011/0078892 A1 | 4/2011 | Hartelius et al. |
| 2011/0120047 A1 | 5/2011 | Stearns et al. |
| 2011/0138585 A1 | 6/2011 | Kmita et al. |
| 2011/0154750 A1 | 6/2011 | Welter et al. |
| 2011/0174360 A1 | 7/2011 | Plaisted et al. |
| 2011/0179606 A1 | 7/2011 | Magno, Jr. et al. |
| 2011/0209745 A1 | 9/2011 | Korman |
| 2011/0214365 A1 | 9/2011 | Aftanas |
| 2011/0214388 A1 | 9/2011 | London |
| 2011/0232212 A1 | 9/2011 | Pierson et al. |
| 2011/0239546 A1 | 10/2011 | Tsuzuki et al. |
| 2011/0247292 A1 | 10/2011 | Li |
| 2011/0260027 A1 | 10/2011 | Farnham, Jr. |
| 2011/0271611 A1 | 11/2011 | Maracci et al. |
| 2011/0272545 A1 | 11/2011 | Liu |
| 2011/0314752 A1 | 12/2011 | Meier |
| 2012/0073630 A1 | 3/2012 | Wu |
| 2012/0079781 A1 | 4/2012 | Koller |
| 2012/0085041 A1 | 4/2012 | Place |
| 2012/0099943 A1 | 4/2012 | Chiu |
| 2012/0102853 A1 | 5/2012 | Rizzo |
| 2012/0153108 A1 | 6/2012 | Schneider |
| 2012/0167364 A1 | 7/2012 | Koch et al. |
| 2012/0175322 A1 | 7/2012 | Park et al. |
| 2012/0192519 A1 | 8/2012 | Ray |
| 2012/0193310 A1 | 8/2012 | Fluhrer et al. |
| 2012/0201601 A1 | 8/2012 | Rizzo |
| 2012/0244729 A1 | 9/2012 | Rivera et al. |
| 2012/0248271 A1 | 10/2012 | Zeilenga |
| 2012/0298188 A1 | 11/2012 | West et al. |
| 2012/0299233 A1 | 11/2012 | Header |
| 2012/0325761 A1 | 12/2012 | Kubsch et al. |
| 2013/0011187 A1 | 1/2013 | Schuit et al. |
| 2013/0048056 A1 | 2/2013 | Kilgore et al. |
| 2013/0089388 A1 | 4/2013 | Liu et al. |
| 2013/0091692 A1 | 4/2013 | Stanley |
| 2013/0118545 A1 | 5/2013 | Bosler et al. |
| 2013/0149030 A1 | 6/2013 | Merhar et al. |
| 2013/0167470 A1 | 7/2013 | Montgomery et al. |
| 2013/0168525 A1 | 7/2013 | Haddock |
| 2013/0220403 A1 | 8/2013 | Rizzo |
| 2013/0227833 A1 | 9/2013 | Rizzo |

(56) References Cited

U.S. PATENT DOCUMENTS

| | | |
|---|---|---|
| 2013/0263917 A1 | 10/2013 | Hamamura |
| 2013/0313043 A1 | 11/2013 | Lallier |
| 2013/0340358 A1 | 12/2013 | Danning |
| 2014/0000681 A1 | 1/2014 | Zhao et al. |
| 2014/0003861 A1 | 1/2014 | Cheung |
| 2014/0041202 A1 | 2/2014 | Schnitzer et al. |
| 2014/0069048 A1 | 3/2014 | Ally |
| 2014/0096462 A1 | 4/2014 | Haddock |
| 2014/0179133 A1 | 6/2014 | Redel |
| 2014/0220834 A1 | 8/2014 | Rizzo |
| 2014/0231605 A1 | 8/2014 | Sharpe et al. |
| 2014/0260068 A1 | 9/2014 | Pendley et al. |
| 2014/0283467 A1 | 9/2014 | Chabas et al. |
| 2014/0311087 A1* | 10/2014 | Haddock .................. E04C 2/38 52/801.1 |
| 2014/0338273 A1 | 11/2014 | Stapleton |
| 2014/0341645 A1 | 11/2014 | Liu et al. |
| 2015/0052834 A1 | 2/2015 | Gies et al. |
| 2015/0060620 A1 | 3/2015 | Smeja |
| 2015/0107168 A1 | 4/2015 | Kobayashi |
| 2015/0129517 A1 | 5/2015 | Wildes |
| 2015/0200620 A1 | 7/2015 | Haddock et al. |
| 2015/0214884 A1 | 7/2015 | Rizzo |
| 2015/0249423 A1 | 9/2015 | Braunstein et al. |
| 2016/0025262 A1 | 1/2016 | Stearns et al. |
| 2016/0049901 A1 | 2/2016 | Muther et al. |
| 2016/0060869 A1 | 3/2016 | Smeja |
| 2016/0087576 A1 | 3/2016 | Johansen et al. |
| 2016/0111835 A1 | 4/2016 | Nayar |
| 2016/0111997 A1 | 4/2016 | Ganshaw et al. |
| 2016/0111998 A1 | 4/2016 | Schmid |
| 2016/0130815 A1 | 5/2016 | Menegoli |
| 2016/0160524 A1 | 6/2016 | Malins |
| 2016/0176105 A1 | 6/2016 | Stanley |
| 2016/0177984 A1 | 6/2016 | Kovacs et al. |
| 2016/0268958 A1 | 9/2016 | Wildes et al. |
| 2017/0040928 A1 | 2/2017 | Schuit et al. |
| 2017/0067258 A1 | 3/2017 | Stearns et al. |
| 2017/0073974 A1 | 3/2017 | Kovacs |
| 2017/0107723 A1 | 4/2017 | Stearns et al. |
| 2017/0237386 A1 | 8/2017 | Stephan et al. |
| 2017/0301265 A1 | 10/2017 | Kyle et al. |
| 2017/0302221 A1 | 10/2017 | Jasmin |
| 2017/0336021 A1 | 11/2017 | Anderson |
| 2018/0013382 A1 | 1/2018 | Smeja |
| 2018/0167026 A1 | 6/2018 | Xie |
| 2019/0013772 A1 | 1/2019 | Bamat et al. |
| 2019/0049151 A1 | 2/2019 | Harris et al. |
| 2019/0106885 A1 | 4/2019 | Stearns et al. |
| 2019/0123460 A1 | 4/2019 | Ash et al. |
| 2019/0165717 A1 | 5/2019 | Haddock et al. |
| 2019/0178274 A1 | 6/2019 | Katz |
| 2019/0195252 A1 | 6/2019 | Pryor et al. |
| 2019/0226214 A1 | 7/2019 | Van Leuven |
| 2019/0273460 A1 | 9/2019 | Kovacs |
| 2019/0285224 A1 | 9/2019 | McKechnie et al. |
| 2019/0330853 A1 | 10/2019 | Van Leuven |
| 2019/0343085 A1 | 11/2019 | Donado |
| 2019/0345719 A1 | 11/2019 | Header |
| 2019/0363667 A1 | 11/2019 | Braunstein et al. |
| 2019/0372501 A1 | 12/2019 | Wada et al. |
| 2020/0144959 A1 | 5/2020 | Stearns et al. |
| 2020/0191180 A1* | 6/2020 | Haddock .................. F16B 2/065 |
| 2020/0208658 A1 | 7/2020 | Roman |
| 2020/0252023 A1 | 8/2020 | Stearns et al. |
| 2020/0313604 A1 | 10/2020 | Harris et al. |
| 2020/0313611 A1 | 10/2020 | Ash et al. |
| 2020/0318349 A1 | 10/2020 | Stearns et al. |
| 2020/0321763 A1 | 10/2020 | Joshi et al. |
| 2020/0340712 A1 | 10/2020 | Leitch et al. |
| 2020/0362632 A1 | 11/2020 | Fort |
| 2021/0005115 A1 | 1/2021 | Johnson |
| 2021/0028741 A1 | 1/2021 | Stearns et al. |
| 2021/0067085 A1 | 3/2021 | Stearns et al. |
| 2021/0079947 A1 | 3/2021 | Ash et al. |
| 2021/0104973 A1 | 4/2021 | Stearns et al. |
| 2021/0111546 A1 | 4/2021 | Varale |
| 2021/0140681 A1 | 5/2021 | Haddock et al. |
| 2021/0143771 A1 | 5/2021 | Haddock et al. |
| 2021/0159843 A1 | 5/2021 | Stearns et al. |
| 2021/0167720 A1 | 6/2021 | Stearns et al. |
| 2021/0184626 A1 | 6/2021 | Yang et al. |
| 2021/0194157 A1 | 6/2021 | Ash et al. |
| 2021/0199141 A1 | 7/2021 | Haddock |
| 2021/0265940 A1 | 8/2021 | Stearns et al. |
| 2021/0285223 A1 | 9/2021 | Haddock et al. |
| 2021/0301541 A1 | 9/2021 | Haddock et al. |
| 2021/0310249 A1 | 10/2021 | Haddock et al. |
| 2021/0363755 A1 | 11/2021 | Haddock |
| 2021/0376781 A1 | 12/2021 | Stearns et al. |
| 2021/0376782 A1 | 12/2021 | Stearns et al. |
| 2021/0388618 A1 | 12/2021 | Stearns et al. |
| 2022/0010823 A1 | 1/2022 | Moss et al. |
| 2022/0140771 A1 | 5/2022 | Stearns et al. |
| 2022/0145634 A1 | 5/2022 | Stearns et al. |
| 2022/0149545 A1 | 5/2022 | Ash et al. |
| 2022/0178586 A1 | 6/2022 | Ash et al. |
| 2022/0278516 A1 | 9/2022 | Meine et al. |
| 2023/0036926 A1 | 2/2023 | Jovanovic et al. |

FOREIGN PATENT DOCUMENTS

| | | |
|---|---|---|
| AT | 298762 | 5/1972 |
| AU | 2005201707 | 11/2006 |
| AU | 2009101276 | 1/2010 |
| AU | 2009245849 | 6/2010 |
| AU | 2014362215 | 6/2015 |
| AU | 2017203660 | 10/2018 |
| AU | 2016294152 | 12/2018 |
| CA | 2704915 | 9/2011 |
| CH | 204783 | 5/1939 |
| CH | 388590 | 2/1965 |
| CH | 469159 | 2/1969 |
| CH | 671063 | 7/1989 |
| CN | 202025767 | 11/2011 |
| CN | 202577780 | 12/2012 |
| CN | 103774795 | 5/2014 |
| CN | 104254654 | 12/2014 |
| CN | 105208941 | 12/2015 |
| CN | 206628755 | 11/2017 |
| CN | 206717199 | 12/2017 |
| CN | 206737192 | 12/2017 |
| CN | 206849001 | 1/2018 |
| CN | 108105222 | 6/2018 |
| CO | 6511275 | 8/2012 |
| DE | 298762 | 4/1916 |
| DE | 941690 | 4/1956 |
| DE | 2126082 | 12/1972 |
| DE | 2523087 | 11/1976 |
| DE | 2556095 | 6/1977 |
| DE | 3326223 | 4/1984 |
| DE | 3617225 | 11/1987 |
| DE | 3723020 | 1/1989 |
| DE | 3728831 | 1/1989 |
| DE | 9112788 | 12/1991 |
| DE | 4115240 | 10/1992 |
| DE | 10056177 | 5/2002 |
| DE | 10062697 | 7/2002 |
| DE | 10344202 | 4/2004 |
| DE | 202005006951 | 8/2005 |
| DE | 102005002828 | 8/2006 |
| DE | 202006015336 | 12/2006 |
| DE | 202007002252 | 4/2007 |
| DE | 202007018367 | 7/2008 |
| DE | 102007036206 | 2/2009 |
| DE | 202009010984 | 12/2009 |
| DE | 102008032985 | 1/2010 |
| DE | 202013002857 | 5/2013 |
| DE | 202015102936 | 9/2016 |
| DE | 202012013476 | 2/2017 |
| EP | 0481905 | 4/1992 |
| EP | 0722023 | 7/1996 |
| EP | 0952272 | 10/1999 |
| EP | 1126098 | 8/2001 |

(56) References Cited

FOREIGN PATENT DOCUMENTS

| | | |
|---|---|---|
| EP | 1447494 | 8/2004 |
| EP | 1804008 | 7/2007 |
| EP | 2105971 | 9/2009 |
| EP | 2327942 | 6/2011 |
| EP | 2375185 | 10/2011 |
| EP | 2746695 | 6/2014 |
| EP | 2528166 | 9/2015 |
| EP | 3092350 | 4/2019 |
| EP | 3364124 | 10/2019 |
| EP | 3552307 | 10/2019 |
| EP | 3361183 | 12/2019 |
| FR | 469159 | 7/1914 |
| FR | 1215468 | 4/1960 |
| FR | 2468209 | 4/1981 |
| FR | 2515236 | 4/1983 |
| FR | 2638772 | 5/1990 |
| FR | 2697060 | 4/1994 |
| FR | 2793827 | 11/2000 |
| FR | 2950375 | 3/2011 |
| FR | 2971577 | 8/2012 |
| FR | 2997169 | 4/2014 |
| FR | 3074369 | 12/2019 |
| GB | 2149829 | 6/1985 |
| GB | 2364077 | 1/2002 |
| GB | 2430946 | 4/2007 |
| GB | 2465484 | 5/2010 |
| GB | 2476104 | 6/2011 |
| JP | S56-158486 | 12/1981 |
| JP | H03-166452 | 7/1991 |
| JP | H04-73367 | 3/1992 |
| JP | H04-366294 | 12/1992 |
| JP | H05-346055 | 12/1993 |
| JP | H08-189150 | 7/1996 |
| JP | H09-177272 | 7/1997 |
| JP | H09-256562 | 9/1997 |
| JP | H11-172861 | 6/1999 |
| JP | 2000-120235 | 4/2000 |
| JP | 2000-179106 | 6/2000 |
| JP | 2000-234423 | 8/2000 |
| JP | 2000-303638 | 10/2000 |
| JP | 2001-193231 | 6/2001 |
| JP | 2001-303724 | 10/2001 |
| JP | 2002-146978 | 5/2002 |
| JP | 2002-180609 | 6/2002 |
| JP | 2003-096986 | 4/2003 |
| JP | 2003-155803 | 5/2003 |
| JP | 2003-213854 | 7/2003 |
| JP | 2004-060358 | 2/2004 |
| JP | 2004-068270 | 3/2004 |
| JP | 2004-092134 | 3/2004 |
| JP | 2004-124583 | 4/2004 |
| JP | 2004-156326 | 6/2004 |
| JP | 2004-264009 | 9/2004 |
| JP | 2004-278145 | 10/2004 |
| JP | 2005-171623 | 6/2005 |
| JP | 2005-322821 | 11/2005 |
| JP | 2006-097291 | 4/2006 |
| JP | 2009-052278 | 3/2009 |
| JP | 2009-179955 | 8/2009 |
| JP | 2009-185599 | 8/2009 |
| JP | 2011-069130 | 4/2011 |
| JP | 2011-185014 | 9/2011 |
| JP | 2011-236611 | 11/2011 |
| JP | 2012-144903 | 8/2012 |
| JP | 6033922 | 11/2016 |
| JP | 2018-091009 | 6/2018 |
| KR | 100957530 | 5/2010 |
| MX | 2017016056 | 8/2018 |
| NL | 2021378 | 1/2020 |
| NL | 2021379 | 1/2020 |
| NL | 2021380 | 1/2020 |
| NL | 2021740 | 5/2020 |
| PT | 3066398 | 12/2019 |
| PT | 3066399 | 12/2019 |
| WO | WO 96/08617 | 3/1996 |
| WO | WO 96/30606 | 10/1996 |
| WO | WO 97/08399 | 3/1997 |
| WO | WO 99/55982 | 11/1999 |
| WO | WO 01/39331 | 5/2001 |
| WO | WO 03/098126 | 11/2003 |
| WO | WO 2008/021714 | 2/2008 |
| WO | WO 2008/028151 | 3/2008 |
| WO | WO 2010/112049 | 10/2010 |
| WO | WO 2010/113003 | 10/2010 |
| WO | WO 2010/121830 | 10/2010 |
| WO | WO 2010/140878 | 12/2010 |
| WO | WO 2011/019460 | 2/2011 |
| WO | WO 2011/154019 | 12/2011 |
| WO | WO 2012/014203 | 2/2012 |
| WO | WO 2012/017711 | 2/2012 |
| WO | WO 2012/048056 | 4/2012 |
| WO | WO 2012/116121 | 8/2012 |
| WO | WO 2012/116777 | 9/2012 |
| WO | WO 2013/009375 | 1/2013 |
| WO | WO 2014/194576 | 12/2014 |
| WO | WO 2015/061113 | 4/2015 |
| WO | WO 2016/198305 | 12/2016 |
| WO | WO 2018/169391 | 9/2018 |
| WO | WO-2019074956 A1 * 4/2019 .............. F24S 25/33 |
| WO | WO 2019/239024 | 12/2019 |
| WO | WO 2020/022879 | 1/2020 |
| WO | WO 2020/022880 | 1/2020 |
| WO | WO 2020/162746 | 8/2020 |
| WO | WO 2020/187472 | 9/2020 |
| WO | WO 2021/043407 | 3/2021 |
| WO | WO 2021/061866 | 4/2021 |
| WO | WO 2021/086185 | 5/2021 |
| WO | WO 2021/102062 | 5/2021 |
| WO | WO 2021/119458 | 6/2021 |
| WO | WO 2022/240909 | 11/2022 |
| WO | WO 2023/028101 | 3/2023 |

OTHER PUBLICATIONS

U.S. Appl. No. 07/912,845, filed Jul. 13, 1992 now U.S. Pat. No. 5,228,248.
U.S. Appl. No. 08/091,176, filed Jul. 13, 1993 now U.S. Pat. No. 5,483,772.
U.S. Appl. No. 08/482,274, filed Jun. 7, 1995 now U.S. Pat. No. 5,715,640.
U.S. Appl. No. 08/987,368, filed Dec. 9, 1997 now U.S. Pat. No. 5,983,588.
U.S. Appl. No. 09/312,013, filed May 14, 1999 now U.S. Pat. No. 6,164,033.
U.S. Appl. No. 09/698,358, filed Oct. 27, 2000.
U.S. Appl. No. 10/118,057, filed Apr. 8, 2002 now U.S. Pat. No. 6,718,718.
U.S. Appl. No. 10/824,320, filed Apr. 13, 2004.
U.S. Appl. No. 08/335,987, filed Nov. 8, 1994 now U.S. Pat. No. 5,694,721.
U.S. Appl. No. 08/336,288, filed Nov. 8, 1994 now U.S. Pat. No. 5,491,931.
U.S. Appl. No. 09/313,105, filed May 17, 1999 now U.S. Pat. No. 6,536,729.
U.S. Appl. No. 09/313,103, filed May 17, 1999 now U.S. Pat. No. 6,470,629.
U.S. Appl. No. 09/758,805, filed Jan. 11, 2001.
U.S. Appl. No. 10/746,546, filed Dec. 23, 2003 now U.S. Pat. No. 7,100,338.
U.S. Appl. No. 10/746,596, filed Dec. 23, 2003 now U.S. Pat. No. 7,013,612.
U.S. Appl. No. 10/818,469, filed Apr. 5, 2004.
U.S. Appl. No. 10/823,410, filed Apr. 13, 2004 now U.S. Pat. No. 7,703,256.
U.S. Appl. No. 12/767,983, filed Apr. 27, 2010.
U.S. Appl. No. 12/960,679, filed Dec. 6, 2010.
U.S. Appl. No. 11/325,704, filed Jan. 5, 2006.
U.S. Appl. No. 11/425,338, filed Jun. 20, 2006.
U.S. Appl. No. 12/707,724, filed Feb. 18, 2010.

(56) References Cited

OTHER PUBLICATIONS

U.S. Appl. No. 11/759,172, filed Jun. 6, 2007 now U.S. Pat. No. 7,758,011.
U.S. Appl. No. 12/832,281, filed Jul. 8, 2010 now U.S. Pat. No. 8,430,372.
U.S. Appl. No. 13/857,759, filed Apr. 5, 2013.
U.S. Appl. No. 14/697,387, filed Apr. 27, 2015.
U.S. Appl. No. 14/789,607, filed Jul. 1, 2015 now U.S. Pat. No. 9,732,512.
U.S. Appl. No. 15/471,179, filed Mar. 28, 2017 now U.S. Pat. No. 10,053,856.
U.S. Appl. No. 15/663,081, filed Jul. 28, 2017 now U.S. Pat. No. 10,443,896.
U.S. Appl. No. 12/629,179, filed Dec. 2, 2009.
U.S. Appl. No. 12/542,132, filed Aug. 17, 2009 now U.S. Pat. No. 8,312,678.
U.S. Appl. No. 13/667,816, filed Nov. 2, 2012 now U.S. Pat. No. 8,656,649.
U.S. Appl. No. 14/153,925, filed Jan. 13, 2014 now U.S. Pat. No. 9,222,263.
U.S. Appl. No. 13/403,463, filed Feb. 23, 2012 now U.S. Pat. No. 8,833,714.
U.S. Appl. No. 14/444,405, filed Jul. 28, 2014.
U.S. Appl. No. 14/500,919, filed Sep. 29, 2014 now U.S. Pat. No. 9,611,652.
U.S. Appl. No. 15/452,388, filed Mar. 7, 2017.
U.S. Appl. No. 15/621,092, filed Jun. 13, 2017 now U.S. Pat. No. 10,077,562.
U.S. Appl. No. 15/621,739, filed Jun. 13, 2017 now U.S. Pat. No. 10,106,987.
U.S. Appl. No. 16/129,606, filed Sep. 12, 2018 now U.S. Pat. No. 10,731,355.
U.S. Appl. No. 16/592,521, filed Oct. 3, 2019 now U.S. Pat. No. 11,035,126.
U.S. Appl. No. 17/347,291, filed Jun. 14, 2021.
U.S. Appl. No. 14/030,615, filed Sep. 18, 2013.
U.S. Appl. No. 14/005,784, filed Jun. 13, 2014 now U.S. Pat. No. 9,530,916.
U.S. Appl. No. 15/386,911, filed Dec. 21, 2016.
U.S. Appl. No. 14/205,613, filed Mar. 12, 2014 now U.S. Pat. No. 9,147,785.
U.S. Appl. No. 14/840,206, filed Aug. 31, 2015, now U.S. Pat. No. 9,608,559.
U.S. Appl. No. 15/470,533, filed Mar. 27, 2017 now U.S. Pat. No. 10,103,682.
U.S. Appl. No. 16/139,853, filed Sep. 24, 2018.
U.S. Appl. No. 16/754,519, filed Apr. 8, 2020.
U.S. Appl. No. 10/810,114, filed Mar. 25, 2004 now U.S. Pat. No. 7,513,080.
U.S. Appl. No. 13/545,808, filed Jul. 10, 2012.
U.S. Appl. No. 13/724,976, filed Dec. 21, 2012 now U.S. Pat. No. 9,086,185.
U.S. Appl. No. 14/789,714, filed Jul. 1, 2015.
U.S. Appl. No. 13/712,474, filed Dec. 12, 2012 now U.S. Pat. No. 8,844,234.
U.S. Appl. No. 14/469,153, filed Aug. 26, 2014.
U.S. Appl. No. 16/539,960, filed Aug. 13, 2019 now U.S. Pat. No. 10,859,292.
U.S. Appl. No. 17/110,621, filed Dec. 3, 2020.
U.S. Appl. No. 15/798,023, filed Oct. 30, 2017 now U.S. Pat. No. 10,640,980.
U.S. Appl. No. 13/965,441, filed Aug. 13, 2013 now U.S. Pat. No. 8,925,263.
U.S. Appl. No. 14/558,356, filed Dec. 2, 2014 now U.S. Pat. No. 9,306,490.
U.S. Appl. No. 16/821,885, filed Mar. 17, 2020 now U.S. Pat. No. 11,041,310.
U.S. Appl. No. 17/353,483, filed Jun. 21, 2021.
U.S. Appl. No. 17/203,481, filed Mar. 16, 2021 now U.S. Pat. No. 11,352,793.
U.S. Appl. No. 17/203,483, filed Mar. 16, 2021.
U.S. Appl. No. 17/371,888, filed Jul. 9, 2021.
U.S. Appl. No. 29/812,325, filed Oct. 20, 2021.
U.S. Appl. No. 16/866,080, filed May 4, 2020 now U.S. Pat. No. 11,085,188.
U.S. Appl. No. 17/398,146, filed Aug. 10, 2021.
U.S. Appl. No. 16/360,923, filed Mar. 21, 2019 now U.S. Pat. No. 10,903,785.
U.S. Appl. No. 29/845,330, filed Jul. 6, 2022.
U.S. Appl. No. 17/156,469, filed Jan. 22, 2021.
U.S. Appl. No. 16/714,060, filed Dec. 13, 2019 now U.S. Pat. No. 10,948,002.
U.S. Appl. No. 17/199,947, filed Mar. 12, 2021.
U.S. Appl. No. 13/720,461, filed Dec. 19, 2012.
U.S. Appl. No. 15/628,927, filed Jun. 21, 2017 now U.S. Pat. No. 10,634,175.
U.S. Appl. No. 16/824,651. filed Mar. 19, 2020 now U.S. Pat. No. 11,333,179.
U.S. Appl. No. 17/745,528, filed May 16, 2022.
U.S. Appl. No. 12/855,850, filed Aug. 13, 2010 now U.S. Pat. No. 10,054,336.
U.S. Appl. No. 12/856,827, filed Aug. 16, 2010 now U.S. Pat. No. 9,920,958.
U.S. Appl. No. 12/856,844, filed Aug. 16, 2010 now U.S. Pat. No. 8,627,617.
U.S. Appl. No. 16/106,299, filed Aug. 21, 2018 now U.S. Pat. No. 10,502,457.
U.S. Appl. No. 08/383,477, filed Feb. 2, 1995.
U.S. Appl. No. 08/285,280, filed Aug. 1, 1994 now U.S. Pat. No. 5,557,903.
"Ace Clamp Cut Sheet | 5031 Z1-2," Ace Clamp, Nov. 2018, 1 page.
"ADJ Heavy Duty Lighting C-clamp," Sweetwater, 2011, 3 pages [retrieved online from: http://web.archive.org/web/20111112045516/http://www.sweetwater.com/store/detail/CClamp/].
"Aerocompact® Compactmetal TR Checklist," Aerocompact, Aug. 30, 2021, CL TR ENG EU V1, 2 pages [retrieved online from: cdn.intelligencebank.com/eu/share/8MnR/YJMd/ZBPL4/original/AEROCOMPACT_CL_TR_ENG_V1_WEB].
"Aerocompact® Compactmetal TR," Aerocompact, Sep. 2, 2021, PB TR ENG EU V1, 3 pages[retrieved online from: cdn.intelligencebank.com/eu/share/8MnR/qMBXP/VYrWa/original/AEROCOMPACT_Leaflet_TR_ENG_V1_ WEB].
"Aluminum," Wikipedia, Jul. 3, 2016, 21 pages [retrieved Oct. 3, 2017 from: en.wikipedia.org/w1ki/Aluminium].
"ClampFit-H Product Sheet," SchletterGmbH, Kirchdorf, Germany, Nov. 2015, 2 pages.
"CompactMETAL TR59 | TR74 Assembly Instructions," Aerocompact, Sep. 2021, 27 pages.
"ERK-TRB-C16 RiverClack Roofing Profile Interface," Enerack, 2021, 2 pages [retrieved online from: www.enerack.com/erk-trb-c16-riverclack-roofing-profile-interface-p00231p1.html].
"Grounding Clip for Electrical Protection," ARaymond, 2016, 2 pages.
IDEEMATEC Tracking & Mounting Systems [online], Apr. 2008, [retrieved Mar. 6, 2012], Retrieved from http://www.ideematec.de.
"Installation Instructions for Rayvolt®—Grounding clip for Framed PV Modules," ARaymond, Feb. 2016, Version 2.2, 1 page.
"Kee Walk—Roof Top Walkway," Simplified Safety, 2011, 3 pages [retrieved online from: https://web.archive.org/web/20120207115154/http://simplifiedsafety.com/solutions/keewalk-rooftop-walkway/].
"KeeLine® The Safety Solution for Horizontal Life Lines," Kee Safety, Ltd. 2012, 2 pages [retrieved online from: https://web.archive.org/web/20120305120830/http://keesafety.co.uk/products/kee_line].
"Miller Fusion Roof Anchor Post," Miller Fall Protection, 2011, 3 pages [retrieved online from: https://web.archive.org/web/20111211154954/www.millerfallprotection.com/fall-protection-products/roofing-products/miller-fusion-roof-anchor-post].
"New 'Alzone 360 system'", Arrid, 2008, 34 pages [retrieved online from: https://web.archive.org/web/20120317120735/www.arrid.com.au/?act=racking_parts].
"Oil Canning—Solutions," Pac-Clad, 2001, 2 pages [retrieved online from: pac-clad.com/aiapresentation/sld021.htm].

(56) References Cited

OTHER PUBLICATIONS

"Oil Canning," Metal Construction Association, 2003, Technical Bulletin #95-1060, 2 pages.
"REES-Snow Retention Systems," Weerbewind, 2010, 3 pages [retrieved online from: https://web.archive.org/web/20100310075027/www.rees-oberstdorf.de/en/products/snow-retention-system.html].
"S-5! WindClamp™ Install," Metal Roof Innovations, Ltd., 2014, 1 page.
"Solar mount. System," Schletter GmbH, 2012, 1 page [retrieved online from: https://web.archive.org/web/20120316154604/www.schletter.de/152-1-Solar-mounting-systems.html].
"Wiley Grounding & Bonding Solutions," Hubbell, 2020, 2 pages [retrieved online from: www.hubbell.com/wiley/en/grounding-and-bonding].
"Universal Clamps Brochure for Web," Universal Clamps, 2020, 2 pages.
"Wind Clamps for Metal Roofs," Metal Roof Innovations, Ltd., 2017, Version 081717, 2 pages.
"Wind Clamp Ultra DEK," Metal Roof Innovations, Ltd., Mar. 7, 2011, Drawing No. WC14-A-0-A_CCD, 1 page.
"Wind Clamp Double LOK," Metal Roof Innovations, Ltd., Mar. 7, 2011, Drawing No. WC15-A-0-A_CCD, 1 page.
Gallo "Oil-Canning," Metal Roofing Alliance, Ask-the-experts forum, Jun. 7, 2005, 4 pages [retrieved online from: www.metalroofingalliance.net/v2/forums/printview.cfm?action=mboard.members/viewmessages&ForumTopicID=4921&ForumCategoryID=1].
Haddock "History and Materials," Metalmag, Metal roofing from A (Aluminum) to Z (Zinc)—Part I, Sep./Oct. 2001, 4 pages.
Haddock "Metallic Coatings for Carbon Steel," Metalmag, Metal roofing from a (Aluminum) to Z (Zinc)—Part II, Nov./Dec. 2001, 8 pages.
International Search Report and Written Opinion for International (PCT) Patent Application No. PCT/US2021/022385, dated Jun. 15, 2021 13 pages.
International Search Report and Written Opinion for International (PCT) Patent Application No. PCT/US2021/022388, dated Jun. 15, 2021 13 pages.
Notice of Allowance for U.S. Appl. No. 17/203,481, dated Jan. 5, 2022 10 pages.
"Fix2000 check list," SchletterGmbH, last updated Jul. 2010, 1 page.
"Standing Seam RiverClack Clamp," Shanghai Woqin New Energy Technology Co., LTD., 2018, 4 pages [retrieved online on Mar. 23, 2022 from: www.wochnmount.com/Details.html?product_id=36].
Official Action for U.S. Appl. No. 17/203,483, dated Dec. 21, 2021 6 pages Restriction Requirement.
Official Action for U.S. Appl. No. 17/203,483, dated Mar. 29, 2022 10 pages.
Notice of Allowance for U.S. Appl. No. 17/203,483, dated Jul. 26, 2022 8 pages.
"Code: The SR-EC-010," Lockseam Ltd., Datasheet SR-EC-010 Version 2.0, 6 pages.
"EZ Grip Metal Deck Mount," SunModo Corp., 2019, 1 page.
"EZ Grip Metal Deck Mount," SunModo Corp., 2019, Product page, 3 pages [retrieved online May 30, 2019 from: sunmodo.com/product/ez-grip-metal-deck-mount/#].
"LM-KS-700," Lumax Energy, 2018, 1 page.
"LM-TBR-VL," Lumax Energy, Oct. 2018, 1 page [retrieved online from: https://lumaxenergy.co.za/wp-content/uploads/2018/12/Lumax-Energy-LM-TBR-VL.pdf/].
"Metal Roof Deck Mount Kit," SunModo Corp., Oct. 16, 2018, Product Drawing, 1 page.
"Non-Penetrative Clamps with Roofs," Clenergy, Dec. 2021, Datasheet, 5 pages.
"PV-ezRack Klip-lok Interface," Clenergy, 2020, 1 page.
"PV-ezRack SolarRoof-Black Anodized," Clenergy, 2020, 4 pages.
"Slot definition," Merriam-Webster Dictionary, 2022, 1 page [retrieved online Aug. 24, 2022 from www.merriam-webster.com/dictionary/slot].
"Standing Seam Rail Free One Sheet," SunModo, Corp., 2020, 2 pages.
"SunDock™ Standing Seam Rail-Free Attachment System," SunModo Corp., 2018, 1 page.
"SunDock Standing Seam PV Mounting System Installation Manual," SunModo, 2019, Doc. No. D10160-V006, 14 pages.
"Universal Klip-lok Interface pre-assembly with Cross Connector Clamp," Clenergy, 2020, 1 page.
"Universal Klip-lok Interface pre-assembly with Tin Interface A with ezClick module," Clenergy, 2020, 1 page.
International Preliminary Report on Patentability for International (PCT) Patent Application No. PCT/US2021/022385, dated Sep. 29, 2022 8 pages.
International Preliminary Report on Patentability for International (PCT) Patent Application No. PCT/US2021/022388, dated Sep. 29, 2022 9 pages.

\* cited by examiner

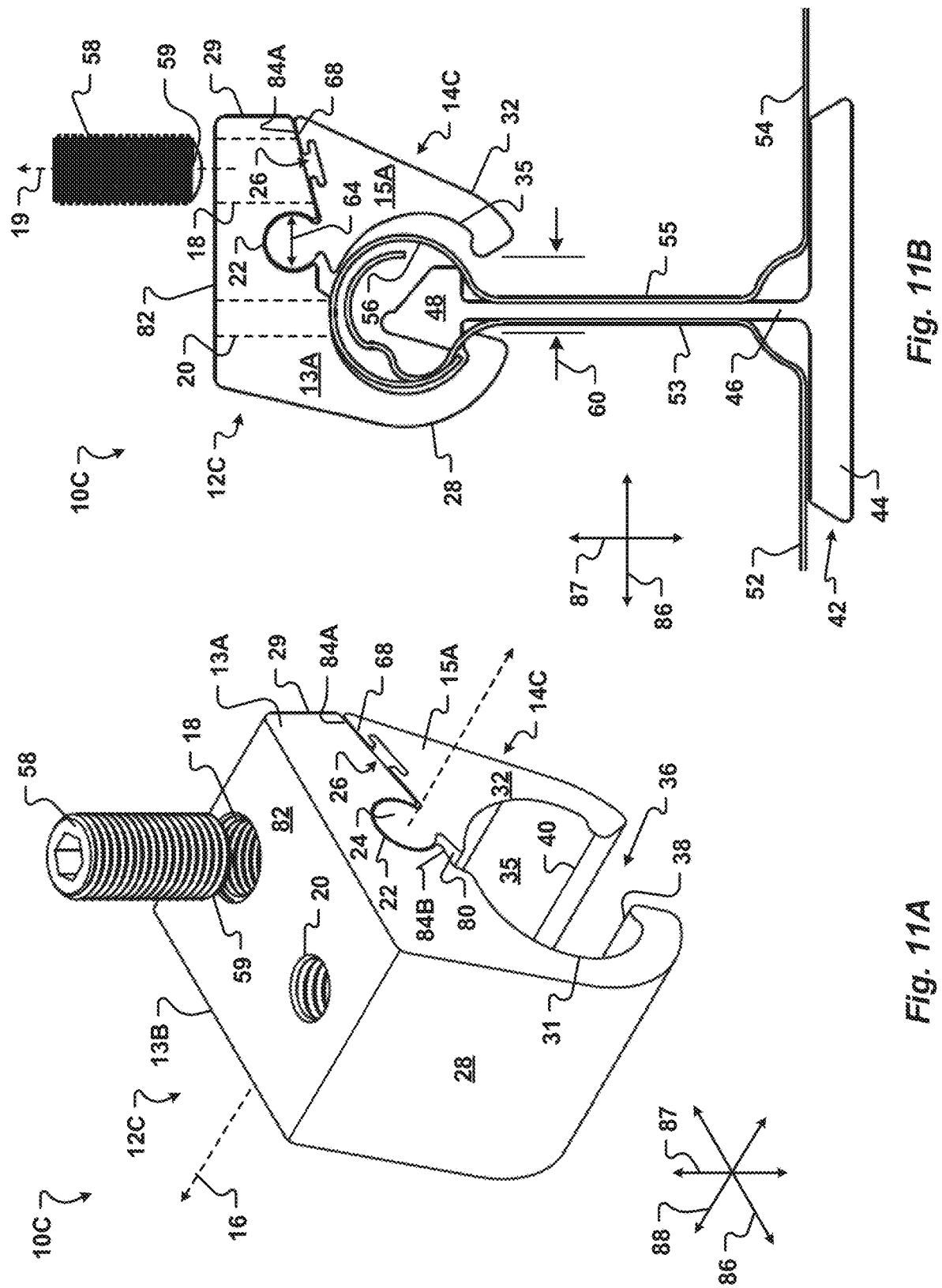

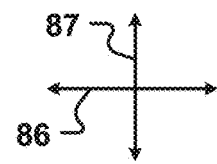
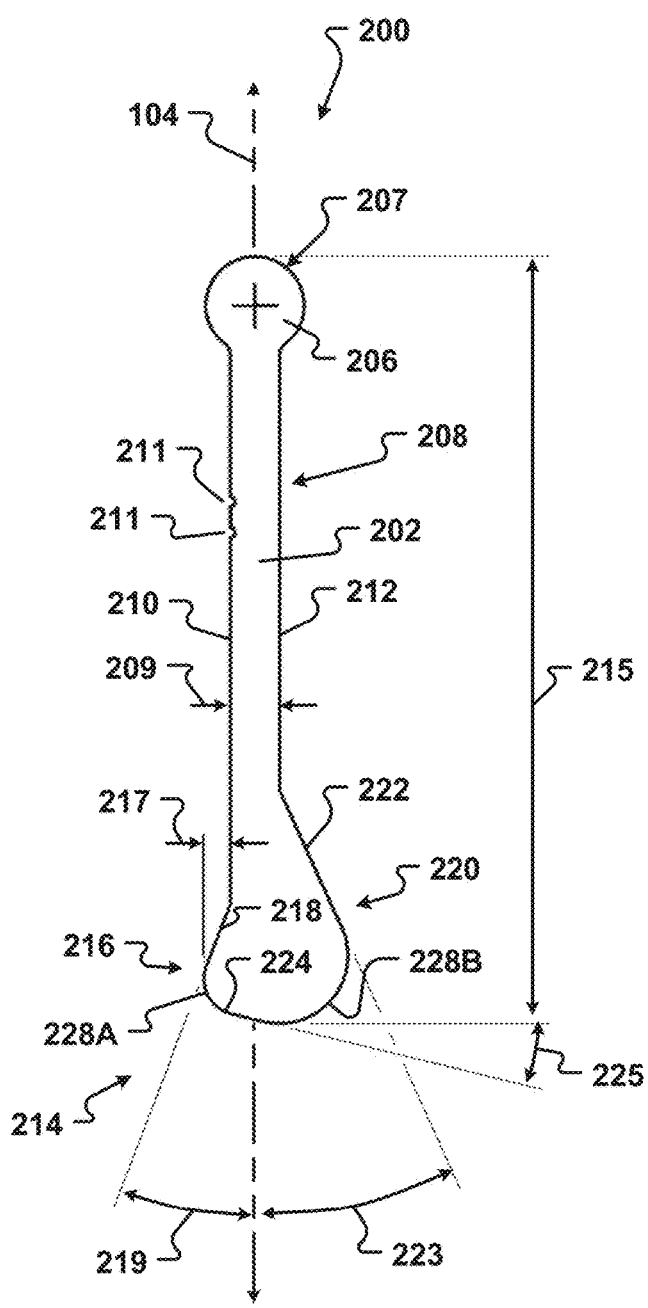
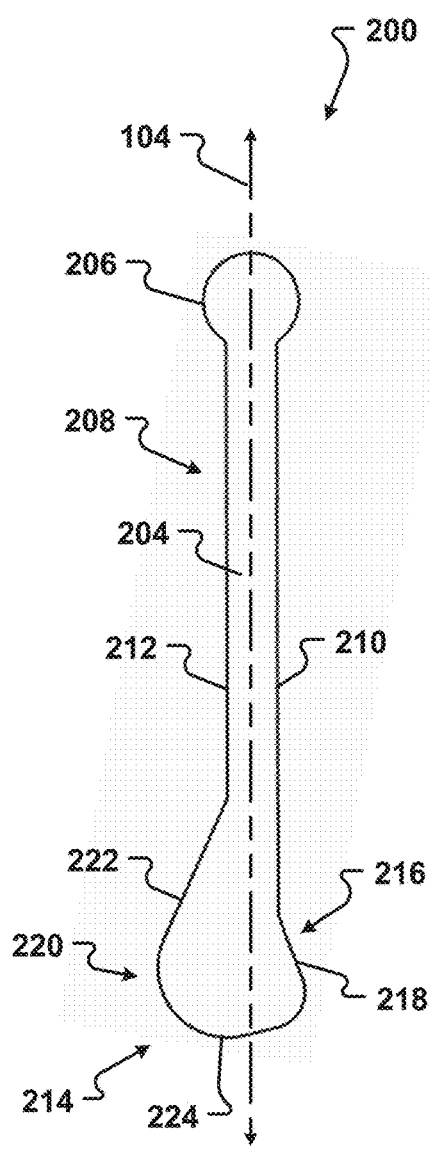
*Fig. 14A*                    *Fig. 14B*

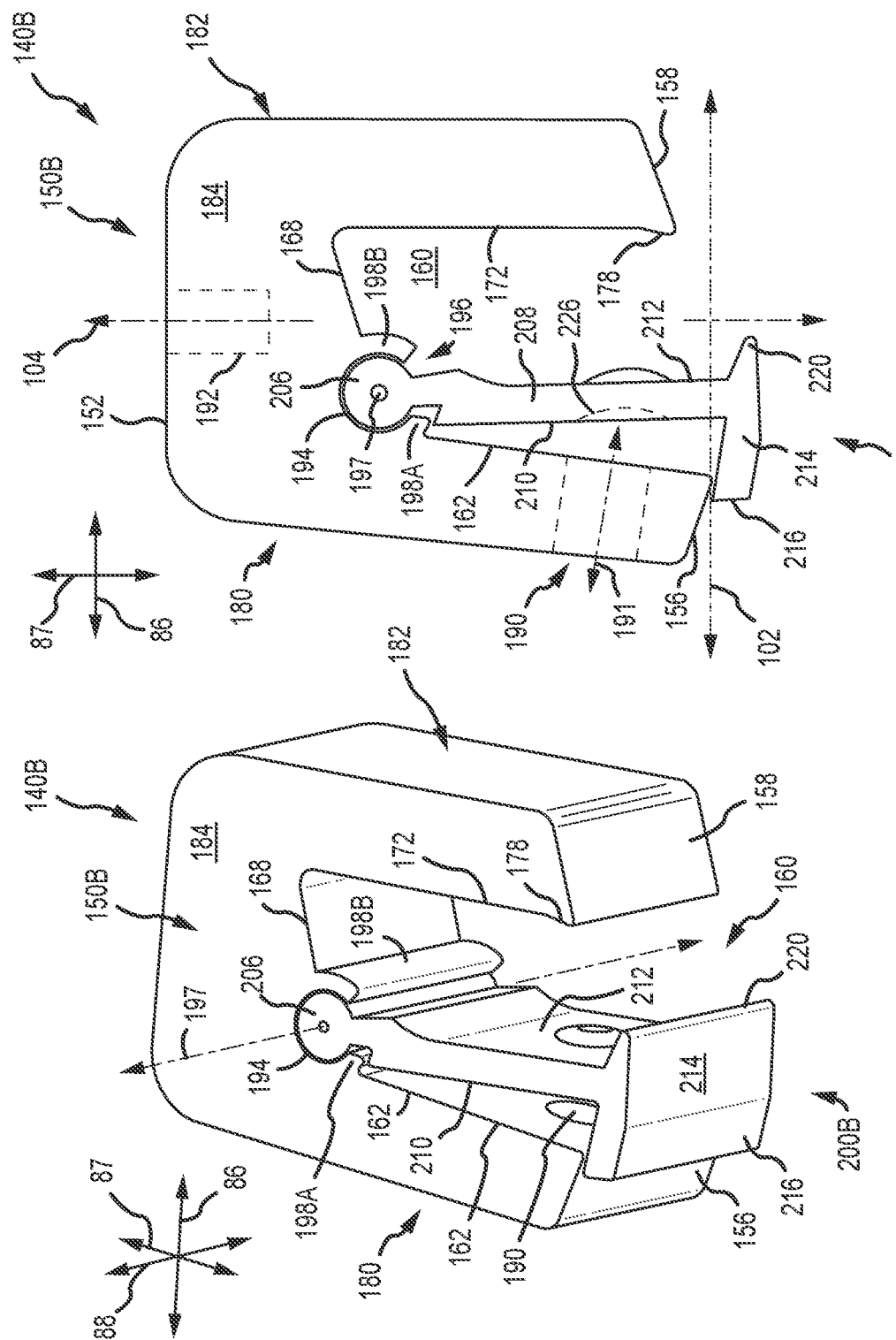

MOUNTING DEVICE FOR A METAL ROOF

CROSS-REFERENCE TO RELATED APPLICATIONS

This application is a continuation of U.S. application Ser. No. 17/203,481, filed on Mar. 16, 2021, which issued as U.S. Pat. No. 11,352,793 on Jun. 7, 2022, which claims priority under 35 U.S.C. § 119(e) to U.S. provisional patent application Ser. No. 62/990,160, filed Mar. 16, 2020, and to U.S. provisional patent application Ser. No. 62/990,161, filed Mar. 16, 2020, which are each incorporated herein in their entirety by reference.

FIELD OF THE DISCLOSURE

The present disclosure relates to mounting devices or clamps for securing structures to a roof or sidewall of a building.

BACKGROUND

Metal panels are increasingly used to construct parts of buildings such as roofs and sidewalls. During construction, adjacent panels are connected at joints, which are weatherproof and protect the building from the external environment. One type of joint is a standing seam joint that extends or protrudes away from the main surfaces of the panels. The standing seam mechanically joins two adjacent metal panels. These seamed joints may have many different configurations, including a single fold, double fold, snap seam, snap lock, nail strip, batten cap, T seam, and bulb seam. Some roof joints, including bulb seams, are typically slidably connected to an underlying halter or clip, such that the roof joint "floats" on the underlying support such as a halter or clip.

It is often desirable to install various types of structures such as heating units, air conditioning units, ventilation equipment, solar panels, etc. on these joints, particularly roofjoints. These structures can be secured to the roof joints with fasteners. However, installing structures on roof joints in a manner that punctures the roof joint with a hole at one or more locations is undesirable. Puncturing the roof joint with a hole presents leakage and corrosion issues for the roof, and holes in the roof joint are aesthetically displeasing. Further, forming holes through the roof may void a warranty of the roof provided by the manufacturer.

Mounting devices can provide a location for these structures to mount to a roof. Typically, a mounting device is secured to a roof joint without puncturing the roof joint, and then a structure is connected to the mounting device. These mounting devices can be secured to the roof by squeezing a seamed joint between two roof panels or another feature that extends away from the roof. U.S. Pat. No. 7,013,612 ("the '612 patent"), which is incorporated herein by reference in its entirety, describes a multi-piece clamp which engages a bulb seam roof joint and includes a seam fastener that is driven into a vertical sidewall of the bulb seam roof. While a mounting device may squeeze or pinch seams such as a single fold or double fold to secure the mounting device to the seam without negative effects, it is undesirable for a mounting device to squeeze a bulb seam roofjoint (or other roof joint that is installed on a support such as a halter or clip) to an extent that it is no longer able to float on the support. Moreover, crushing the bulb of a roof joint can damage the integrity of the roof joint, potentially allowing moisture and other external elements through the roof and into the building. Damaging the integrity of the roof joint can also make replacement or disassembly of the roofjoint and/or roof panels more difficult.

SUMMARY

One aspect of the present disclosure is directed to a mounting device or clamp that secures to a roof joint without pinning the roof joint to an underlying support such as a halter or clip, without crushing the roofjoint, and without forming a hole or penetrating the roof, while providing a location to connect a structure to the roofjoint. The clamp comprises an insert that rotates relative to a body where each of the insert and the body have an arm that extends around the terminal portion of the roof joint and grabs the roof joint underneath a distal end of a support over which the roof joint is installed. Distal ends of the arms can lock into place below a maximum diameter or dimension of the roof joint and secure the clamp to the body of the roof joint without pinning the roof joint to the underlying support.

The clamp body includes an aperture for a bar component, such as a threaded fastener or a set screw. The aperture is oriented such that a bar component advanced through the aperture will only engage a portion of the insert and such that the bar component will not contact the roof joint or other portions of the building surface. As the bar component is advanced against the insert, the insert will rotate relative to the clamp body.

According to at least some embodiments of the present disclosure, a clamp is provided that has an insert with a protrusion rotatably disposed in a recess of a body. In one configuration, the protrusion and the recess have circular cross-sectional shapes to promote the rotation of the protrusion within the recess. In addition, the protrusion can have a width that is greater than an opening of the recess to hold the protrusion in the recess. Therefore, to assemble the insert and the body, the protrusion slides into the recess along an axis of rotation. During installation of the clamp to a roof joint, the insert rotates relative to the body from a first position to a second position, which secures the clamp to the roof joint.

According to at least some embodiments of the present disclosure, a clamp is provided where the protrusion of the insert is offset from at least one edge of an upper surface of the insert to limit rotation of the insert relative to a body of the clamp. A protrusion of the insert can rotate within a recess of the body, and the insert can have an upper surface that is oriented toward the body. This upper surface can be substantially planar in some embodiments. The protrusion extends from this upper surface, and the protrusion can be offset from one or both edges of the upper surface when viewed in cross section or from an end. As a result, the offset from one edge defines a portion of the insert that ultimately contacts the body to limit rotation of the insert in one direction. Similarly, the offset from the opposing edge defines a portion of the insert that ultimately contacts the body to limit rotation of the insert in the other direction. Therefore, the offsets and described portions of the insert can prevent the insert from rotating too far relative to the body, which may help to prevent the clamp from crushing a roofjoint. In various embodiments, the offset and the limit of rotation can coincide with a first position or a second position of the insert as described herein. Alternatively, the offset can limit the rotation of the insert to other positions.

According to at least some embodiments of the present disclosure, each of the body and the insert has an arm adapted to extend around a terminal portion of a roof joint (e.g., the bulb seam portion of the roof joint) without damaging the cross-sectional shape of the roof joint. Each arm can extend around the roof joint seam such that each arm is set off from the surface of the roof joint seam, and thus, the arms float around the roof joint seam (which, in turn, floats on the underlying halter, clip, or other support). However, it will be appreciated that the present disclosure encompasses further embodiments, for instance, where the arms conform to and contact the outer surface of the roof joint seam without affecting the integrity of the roof joint. Each arm can extend along a line that has a radius of curvature, when viewed in cross section, to substantially match an exterior surface of a roof joint seam with a circular or bulb shape. Distal ends of each arm can turn inward to retain the clamp on the roof joint by contacting or partially deforming the roof joint underneath the seam thereof (but not so much that the roof joint is pinned to the underlying support), to secure the clamp to the roof joint. As the insert moves from a first position to a second position relative to the body of the clamp, the distance between the distal ends is reduced to secure the clamp to the roof joint without crushing the roof joint.

According to at least some embodiments of the present disclosure, a clamp is provided that has an insert with a deformable surface to further secure the insert and a body of the clamp together. The deformable surface can be located on an upper surface of the insert. Alternatively, in another embodiment, the deformable surface is positioned on an outer surface of the insert. A bar component such as a bolt or set screw may be advanced through the body to contact the deformable surface of the insert. The distal end of the bar component is then partially embedded into the deformable surface. As a result, the insert cannot move relative to the body along the axis of rotation.

One particular embodiment of the present disclosure is a clamp system for a roof, comprising: a support that extends to a distal end (or head) having a larger width or diameter than a body of the support, the support comprising at least one recess between the distal end and the body; at least one roof panel portion positioned over the at least one recess; a clamp body having a first arm that extends to a first distal end and having a clamp recess that extends along an axis; and a clamp insert having a second arm that extends to a second distal end and having a protrusion that rotates within the clamp recess of the clamp body. The clamp insert can rotate relative to the clamp body about the axis from a first position to a second position where at least one of the distal ends of the clamp body and the clamp insert extends into the at least one recess to secure the clamp body and the clamp insert over the at least one roof panel portion without fixing a position of the at least one roof panel portion relative to the support.

In some embodiments, the at least one recess comprises a first recess and a second recess between the distal end and the body. Optionally, the first and second recesses are positioned on opposing sides of the support. In various embodiments, the at least one roof panel portion comprises a first roof panel portion positioned over the first recess and a second roof panel portion positioned over the second recess. Accordingly, when the clamp insert is in the second position, the first distal end of the first arm extends into the first recess, and the second distal end of the second arm extends into the second recess. In some embodiments, at least one of the distal ends of the clamp body and the clamp insert extends into the at least one recess and partially deforms the at least one roof panel portion.

In various embodiments, the clamp system further comprises an aperture that extends through the clamp body in a direction that is nonparallel with the axis of the clamp recess. A bar component can be positioned in the aperture to extend through the aperture to rotate the clamp insert from the first position to the second position. The aperture is formed through the clamp body such that a bar component advanced through the aperture will only contact the insert without entering a receiving space of the clamp or contacting the at least one roof panel portion.

In some embodiments, the clamp insert has a deformable surface that the bar component deforms to maintain a position of the clamp insert relative to the clamp body along the axis. In various embodiments, the deformable surface extends over a channel in the clamp insert, and the bar component deforms a portion of the deformable surface at least partially into the channel. In some embodiments, the protrusion of the insert has a width that is greater than a width of an opening of the clamp recess to secure the protrusion within the clamp recess.

Another particular embodiment of the present disclosure is a clamp, comprising: (1) a body having a first arm that extends to a first distal end and a recess that extends along an axis, the recess having an opening with a first width; (2) an insert having a second arm that extends to a second distal end and having a protrusion positionable within the recess of the body, the protrusion having a diameter that is greater than the first width of the opening to hold the protrusion within the recess, and such that the insert can rotate relative to the body about the axis from a first position to a second position to reduce a distance between the distal ends of the arms; and (3) an aperture that extends through the body to receive a bar component that can apply a force to the insert to rotate the insert from the first position to the second position.

In one configuration, the aperture is oriented along an axis that does not intersect a receiving space of the clamp. Alternatively, in another embodiment, the aperture is oriented at an angle that intersects the receiving space.

In one embodiment, the first arm has a first inner surface that is concave or arcuate. Additionally, or alternatively, the second arm can have a second inner surface that is concave or arcuate.

In some embodiments, the protrusion of the insert has a circular cross-sectional shape that complements a circular cross-sectional shape of the recess. In various embodiments, the first arm extends along a line that has a radius of curvature, and the second arm extends along a line that has a radius of curvature. In some embodiments, the first and second arms define a receiving space with a substantially circular cross-sectional shape. In various embodiments, the first distal end of the first arm extends into a receiving space defined by the first and second arms. Additionally, or alternatively, in another embodiment, the second distal end of the second arm optionally extends into the receiving space.

In some embodiments, the aperture extends through the body in a direction that is nonparallel to the axis of the recess. In various embodiments, the body comprises a substantially planar upper surface. In one embodiment, the upper surface is substantially perpendicular to a direction that the aperture extends through the body.

In some embodiments, the insert has an upper surface that defines an edge, wherein the protrusion extends from the upper surface and is offset from the edge by a predetermined distance. In various embodiments, the offset of the protrusion from the edge defines a stop portion that limits rotation of the insert relative to the body in one direction to the second position.

In one embodiment, the protrusion of the insert extends from a neck of the insert and has a circular cross-sectional shape that complements a circular cross-sectional shape of the recess. The neck has a second width that is less than the first width. Optionally, the neck extends from a shoulder of the second arm that has a third width that is greater than the protrusion diameter.

In one embodiment, the first inner surface of the first arm has a first radius of curvature. The second arm has a second inner surface which is concave with a second radius of curvature. Optionally, the first and second radii of curvature are approximately equal.

In one embodiment, the first and second arms define a receiving space with a substantially circular cross-sectional shape to extend around the bulb seam.

The body may further comprise a leg positioned opposite to the first arm. Accordingly, in one embodiment, the aperture extends through the leg and the aperture axis is approximately perpendicular to the rotation axis of the recess. The rotation axis may be about perpendicular to first and second ends of the body.

In one embodiment, the body comprises a substantially planar upper surface that is approximately parallel to the aperture axis. Optionally, a first portion of a lower surface of the body positioned between the leg and the recess opening is oriented at an oblique angle relative to the upper surface to facilitate rotation of the insert away from the first arm.

In some embodiments, the insert may further comprise: (a) a neck connecting the protrusion to the second arm; (b) an upper surface of the second arm extending from a first side of the neck; (c) an outer surface of the second arm extending from the upper surface to the second distal end; (d) a finger of the second arm extending from the second distal end; (e) a second inner surface of the second arm extending from the finger, the second inner surface being concave; and (f) a stop portion of the second arm extending from the second inner surface to a second side of the neck.

In one embodiment, the stop portion limits rotation of the insert relative to the body in one direction to the second position. The stop portion may be oriented at a non-parallel angle relative to the upper surface of the insert.

Yet another particular embodiment of the present disclosure is a clamp system, comprising: (1) a body with: (a) a first arm that extends from a first side of the body to a first distal end and which includes a first inner surface that is concave; (b) a leg that extends from a second side of the body; (c) an aperture that extends through the leg along an aperture axis; and (d) a recess positioned between the first inner surface and the leg and that extends along a rotation axis; (2) an insert with: (a) a protrusion that is configured to rotate within the recess of the body; and (b) a second arm that extends to a second distal end and which includes a second inner surface that is concave, the second inner surface positionable facing the first inner surface, the insert being rotatable relative to the body about the rotation axis from a first position to a second position to reduce a distance between the distal ends of the arms; and (3) a bar component extendable through the aperture to engage the insert and rotate the insert from the first position to the second position.

The insert may include a deformable portion. In various embodiments, the deformable portion comprises a channel that extends into the insert, and the bar component deforms at least one edge of the channel. In some embodiments, the deformable portion comprises a channel recess that extends into the insert from a center portion of the channel to a location underneath the at least one edge to facilitate deformation of the at least one edge.

In various embodiments, the aperture has an internal thread, the bar component has an outer thread that complements the internal thread of the aperture, and the bar component rotates relative to the body to pass through the aperture and rotate the insert from the first position to the second position.

In some embodiments, the protrusion has a width that is greater than a width of an opening of the recess to hold the protrusion within in the recess.

In one embodiment, the first arm has a first inner surface that is concave or arcuate. Additionally, or alternatively, in another embodiment, the second arm has a second inner surface that is concave or arcuate.

In one embodiment the body further comprises: (i) an inner surface of the leg that extends from an end of the leg toward an upper surface of the body; (ii) a first lower portion extending from the inner surface to a first side of an opening of the recess, the first lower portion oriented at an oblique angle relative to the upper surface and the inner surface; and (iii) a second lower portion extending away from a second side of the opening, the second lower portion oriented approximately parallel to the upper surface.

Additionally, or alternatively, the insert may further comprise: (i) a neck connecting the protrusion to the second arm; (ii) an upper surface of the second arm extending from a first side of the neck; and (iii) a stop portion of the second arm extending from a second side of the neck to the second inner surface, the stop portion configured to engage the second lower portion of the body to stop rotation of the insert toward the first arm.

A further particular embodiment of the present disclosure is a clamp configured to engage a bulb seam of a building surface, comprising: (1) a body having an upper surface, a lower surface, a first arm that projects from the lower surface and extends to a first distal end, and a recess extending into the lower surface and that extends along a rotation axis from a first end to a second end of the body; (2) an insert having a second arm that extends to a second distal end, a shoulder, a neck extending from the shoulder, and a protrusion extending from the neck, the protrusion rotatable within the recess of the body such that the insert is rotatable relative to the body about the rotation axis from a first position to a second position to reduce a distance between the distal ends of the arms, the shoulder having a first upper surface on a first side of the neck which defines a stop portion of the insert that limits rotation of the insert toward the first arm; and (3) an aperture that extends through the body to receive a bar component to engage the insert and rotate the insert from the first position to the second position.

In one embodiment, the stop portion limits rotation of the insert to the second position by contact with the lower surface of the body. Optionally, the stop portion defines a plane that is nonparallel to a second upper surface of the shoulder positioned on a second side of the neck.

The body may further comprise a leg that projects from the lower surface. In one embodiment, the aperture extends from an exterior surface of the leg to an inner surface of the leg.

The aperture may extend along an aperture axis that is oriented about perpendicular to the exterior surface of the leg.

In one embodiment, the insert comprises a deformable portion with a channel that extends into the insert, the deformable portion alignable with the aperture such that the bar component advanced through the aperture will contact the deformable portion.

The bar component may be advanced through the aperture to deform the deformable portion to maintain a position of the insert relative to the body along the axis. In various embodiments, the bar component deforms at least one edge of the channel. The channel may include a recess that extends under the at least one edge of the channel to define a flange. Accordingly, as the bar component is advanced through the body the bar component contacts the flange and deforms or pushes the flange into the recess of the channel.

In another embodiment, the first arm has a first inner surface that is concave and the second arm has a second inner surface that is concave, the first and second inner surfaces defining a receiving space that has a generally cylindrical shape with openings at first and second ends of the clamp.

In some embodiments, the stop portion limits rotation of the insert to the second position. In various embodiments, the protrusion has a width that is greater than a width of an opening of the recess to hold the protrusion within the recess.

In one embodiment, the aperture extends from an upper surface to a lower surface of the body. Alternatively, in another embodiment, the body includes a leg and the aperture extends from an exterior surface of the leg to an interior surface of the leg. In some embodiments, an upper surface of the body is substantially perpendicular to a direction that the aperture extends through the body.

In one embodiment, the first arm has a first inner surface that is concave or arcuate. Additionally, or alternatively, the second arm can have a second inner surface that is concave or arcuate.

Another aspect of the present disclosure is a method of securing a clamp to a roof joint, comprising: (1) positioning a body of the clamp proximate to the roof joint, the body having an upper surface, a lower surface, an aperture extending through the body, a first arm that projects from the lower surface and extends along a first side of the roof joint, and a recess formed in the lower surface that extends from a first end to a second end of the body; (2) positioning a protrusion of an insert within the recess such that a second arm of the insert extends proximate to a second side of the roof joint; and (3) advancing a bar component through the aperture into engagement with the insert such that the protrusion rotates within the recess and the second arm rotates from a first position to a second position to reduce a distance between a first distal end of the first arm and a second distal end of the second arm.

In one embodiment, the aperture extends through the upper surface and the lower surface of the body.

In another embodiment, the body further comprises a leg that projects from the lower surface. The aperture extends from an exterior surface of the leg to an inner surface of the leg.

Optionally, the insert includes a deformable portion. In one embodiment, the deformable portion extends into an outer surface of the insert.

In one embodiment, the first arm has a first inner surface that is concave or arcuate. Additionally, or alternatively, the second arm can have a second inner surface that is concave or arcuate.

The method optionally includes moving the insert to the first position before positioning the body of the clamp proximate to the roof joint. In this manner the distance between the first and second distal ends of the arms are separated by a first distance that is greater than a width of the bulb seam of the roof joint. In this manner, the body can be lowered downwardly directly onto the roof joint.

In one embodiment, the method includes positioning the protrusion of the insert within the recess before positioning the body of the clamp proximate to the roof joint. Alternatively, in another embodiment, the protrusion is positioned within the recess after the body of the clamp is positioned proximate to the roof joint.

One aspect of the present disclosure is a mounting device or clamp to engage a rib joint. The clamp includes an insert that can pivot relative to a body. The body has a slot to receive the rib joint. A bar component, such as a seam fastener, can be advanced through an aperture and into the slot to engage the insert. As the bar component is advanced against the insert, the insert pivots within the slot to engage a sidewall of the rib joint. The insert can be connected to the body with either a first projection or a second projection of the insert facing the sidewall of the rib joint. In one embodiment, when the bar component applies a force to the insert and presses the insert against the rib joint, the insert may bend or deform against an exterior surface of the sidewall.

One aspect of the present disclosure is to provide a clamp that comprises: (1) a body including: (a) a first end spaced from a second end in a longitudinal dimension; (b) a top and a bottom that are spaced from one another in a vertical dimension, the bottom including a first bottom surface and a second bottom surface; (c) a first side surface and a second side surface that are spaced from one another in a horizontal dimension; (d) a slot which extends between the first and second ends, is located between the first side surface and the second side surface, and extends into the bottom, the slot including: (i) a first slot sidewall that extends inwardly from the first bottom surface, (ii) a second slot sidewall that extends inwardly from the second bottom surface, (iii) a slot base that extends between the first slot sidewall and the second slot sidewall, and (iv) a nose that extends into the slot from the second slot sidewall, the second slot sidewall being fixed relative to the first slot sidewall and the slot base; (e) a recess that extends between the first and second ends along a rotation axis that is about parallel to the longitudinal dimension, the recess including an opening to the slot; and (f) an aperture that extends through the first side surface to the slot, the aperture extending along an axis that is oriented at a predetermined angle to the vertical dimension; (2) an insert including: (i) a first end spaced from a second end in the longitudinal dimension; (ii) an arm extending between a protrusion and a distal end of the insert; (iii) a first side surface of the arm with a first projection; and (iv) a second side surface of the arm with a second projection, the protrusion being positionable within the recess of the body such that one of the first side surface and the second side surface of the arm is facing the first slot sidewall; and (3) a bar component disposable in the aperture to engage the insert and pivot the distal end of the insert about the rotation axis from a first position proximate to the first slot sidewall to a second position spaced from the first slot sidewall.

In one embodiment, the protrusion of the insert has a circular cross-sectional shape that complements a circular cross-sectional shape of the recess.

In one embodiment, the recess opening intersects the first slot sidewall and the slot base.

In one embodiment, the first and second side surfaces of the arm are generally planar and approximately parallel.

In one embodiment, the rotation axis is about perpendicular to the first and second ends of the body.

In one embodiment, the protrusion of the insert is positioned in the recess of the body with the first side surface of the arm facing toward the first slot sidewall.

In one embodiment, the first side surface of the arm is positioned to face toward the first slot sidewall such that the second side surface of the arm is positioned to face toward a first rib joint.

In one embodiment, the protrusion of the insert is positioned in the recess of the body with the second side surface of the arm facing toward the first slot sidewall. Optionally, when the protrusion is positioned in the recess such that the second side surface is facing the first slot sidewall, the second side surface of the insert is positionable in a substantially parallel relation with a second section of first slot sidewall. Additionally, or alternatively, a second sidewall of the second projection of the of the insert is positionable in a substantially parallel relation with a first section of first slot sidewall. The second section is positioned between the first section and the slot base.

In one embodiment, the second side surface of the arm is positioned to face toward the first slot sidewall such that the first side surface of the arm is positioned to face toward a second rib joint, the second rib joint being of a different size or shape than the first rib joint.

In one embodiment, the first slot sidewall comprises a first section and a second section with the second section of the first slot sidewall being located between the first section and the slot base in the vertical dimension.

In one embodiment, the first and second sections of the first slot sidewall are each disposed in different orientations relative to the vertical dimension.

In one embodiment, the first side surface includes a first upper portion and a first lower portion.

In one embodiment, the first lower portion is about parallel to the second section of the first slot sidewall.

The first lower portion is optionally oriented at an oblique angle to the top. Additionally, or alternatively, the first upper portion is oriented approximately perpendicular to the top.

In one embodiment, the nose extends from a lower end of the second slot sidewall and into the slot.

In one embodiment, the second slot sidewall is generally planar between an upper portion of the nose and the slot base.

In one embodiment, the second slot sidewall is oriented at an oblique angle to the first slot sidewall and to the slot base.

In one embodiment, the second side surface is generally planar between the second bottom surface and the top. Alternatively, the second side surface may include a second upper portion and a second lower portion.

In one embodiment, the second slot sidewall is oriented at an oblique angle to the second upper and lower portions.

In one embodiment, the insert includes a dimple that is alignable with the aperture of the body.

In one embodiment, the aperture has an internal thread and the bar component has an outer thread that complements the internal thread of the aperture.

Optionally, the axis of the aperture is oriented at an oblique angle to the vertical dimension. Additionally, or alternatively, the axis may be approximately perpendicular to one or more of the first lower portion of the first side surface and the second portion of the first slot sidewall.

In one embodiment, the body further comprises an attachment aperture that extends into the top.

In one embodiment, the attachment aperture intersects the recess. Alternatively, the attachment aperture is offset from the recess.

In one embodiment, at least one of the first side surface and the second side surface of the arm includes a deformable portion with a recess, the deformable portion alignable with the aperture of the body.

In one embodiment, as the bar component is advanced through the aperture to press the insert against a rib joint of a nail strip, the arm of the insert may bend. More specifically, the arm of the insert may bend from a generally linear shape to a curved shape as the bar component presses the insert against a sidewall of the rib joint. In one embodiment, the arm may bend such that one of the first and second side surfaces has a concave shape. In this manner, the other one of the first and second side surfaces will have a convex shape facing the rib joint sidewall to avoid damage to the rib joint sidewall while improving the holding strength of the insert and the clamp.

In one embodiment, the body has only one recess to receive a protrusion of an insert.

In one embodiment, the clamp includes only one insert.

In one embodiment, the body is of a one-piece construction. Optionally, the body is formed to by an extrusion process.

In one embodiment, the insert is of a one-piece construction. The insert may optionally be formed by an extrusion process.

It is another aspect of the present disclosure to provide a method of securing a clamp to a rib joint. The method generally includes, but is not limited to: (1) positioning a body of the clamp proximate to the rib joint such that a nose of the body projects into a recess of the rib joint, the body including: (a) a first end spaced from a second end in a longitudinal dimension; (b) a top and a bottom that are spaced from one another in a vertical dimension, the bottom including a first bottom surface and a second bottom surface; (c) a first side surface and a second side surface that are spaced from one another in a horizontal dimension; (d) a slot which extends between the first and second ends, is located between the first side surface and the second side surface, and extends into the bottom, the slot including: (i) a first slot sidewall that extends inwardly from the first bottom surface, (ii) a second slot sidewall that extends inwardly from the second bottom surface, (iii) a slot base that extends between the first slot sidewall and the second slot sidewall, and (iv) the nose that extends into the slot from the second slot sidewall, the rib joint being positioned in the slot; (e) a recess that extends between the first and second ends along a rotation axis that is about parallel to the longitudinal dimension, the recess including an opening to the slot; and (f) an aperture that extends through the first side surface to the slot, the aperture extending along an axis that is oriented at a predetermined angle to the vertical dimension; (2) positioning a protrusion of an insert within the recess such that one of a first side surface and a second side surface of the insert is facing the first slot sidewall of the body; and (3) advancing a bar component through the aperture into engagement with the one of the first side surface and the second side surface of the insert that is facing the first slot sidewall of the body such that a distal end of the insert pivots from a first position to a second position to engage a sidewall of the rib joint.

In one embodiment, the protrusion of the insert has a circular cross-sectional shape that complements a circular cross-sectional shape of the recess.

In one embodiment, the recess opening intersects the first slot sidewall and the slot base.

In one embodiment, the first and second side surfaces of the arm are generally planar and approximately parallel.

In one embodiment, the rotation axis is about perpendicular to the first and second ends of the body.

In one embodiment, the protrusion of the insert is positioned in the recess of the body with the first side surface of the arm facing toward the first slot sidewall.

In one embodiment, the first side surface of the arm is positioned to face toward the first slot sidewall such that the second side surface of the arm is positioned to face toward a first rib joint.

In one embodiment, the protrusion of the insert is positioned in the recess of the body with the second side surface of the arm facing toward the first slot sidewall.

In one embodiment, the second side surface of the arm is positioned to face toward the first slot sidewall such that the first side surface of the arm is positioned to face toward a second rib joint, the second rib joint being of a different size or shape than the first rib joint.

In one embodiment, the first slot sidewall comprises a first section and a second section with the second section of the first slot sidewall being located between the first section and the slot base in the vertical dimension.

In one embodiment, the first and second sections of the first slot sidewall are each disposed in different orientations relative to the vertical dimension.

In one embodiment, the first side surface includes a first upper portion and a first lower portion.

In one embodiment, the first lower portion is about parallel to the second section of the first slot sidewall.

In one embodiment, the nose extends from a lower end of the second slot sidewall and into the slot.

In one embodiment, the second slot sidewall is generally planar between an upper portion of the nose and the slot base.

In one embodiment, the second slot sidewall is oriented at an oblique angle to the first slot sidewall and to the slot base.

In one embodiment, the second side surface is generally planar between the second bottom surface and the top. Alternatively, the second side surface may include a second upper portion and a second lower portion.

In one embodiment, the second slot sidewall is oriented at an oblique angle to the second upper and lower portions.

In one embodiment, the insert includes a dimple that is alignable with the aperture of the body.

In one embodiment, the aperture has an internal thread and the bar component has an outer thread that complements the internal thread of the aperture.

Optionally, the axis of the aperture is oriented at an oblique angle to the vertical dimension. Additionally, or alternatively, the axis may be approximately perpendicular to one or more of the first lower portion of the first side surface and the second portion of the first slot sidewall.

In one embodiment, the body further comprises an attachment aperture that extends into the top.

In one embodiment, the attachment aperture intersects the recess. Alternatively, the attachment aperture is offset from the recess.

In one embodiment, at least one of the first side surface and the second side surface of the arm includes a deformable portion with a recess, the deformable portion alignable with the aperture of the body.

Optionally, the method further comprises bending the arm of the insert with the bar component as it is advanced through the aperture. More specifically, the arm of the insert may bend from an initial shape that is generally linear to a second shape that is curved as the bar component presses the insert against a sidewall of the rib joint. In one embodiment, in the second shape of the arm, one of the first and second side surfaces facing the aperture has a concave shape. In this manner, the other one of the first and second side surfaces facing the rib joint sidewall will have a convex shape to avoid damage to the rib joint sidewall while improving the holding strength of the insert and the clamp.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

Unless otherwise indicated, all numbers expressing quantities, dimensions, conditions, ratios, ranges, and so forth used in the specification and claims are to be understood as being modified in all instances by the term "about" or "approximately". Accordingly, unless otherwise indicated, all numbers expressing quantities, dimensions, conditions, ratios, ranges, and so forth used in the specification and claims may be increased or decreased by approximately 5% to achieve satisfactory results. In addition, all ranges described herein may be reduced to any subrange or portion of the range.

Additionally, where the meaning of the terms "about" or "approximately" as used herein would not otherwise be apparent to one of ordinary skill in the art, the terms "about" and "approximately" should be interpreted as meaning within plus or minus 5% of the stated value.

All ranges described herein may be reduced to any sub-range or portion of the range, or to any value within the range without deviating from the invention. For example, the range "5 to 55" includes, but is not limited to, the sub-ranges "5 to 20" as well as "17 to 54."

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below.

As will be appreciated, other aspects, embodiments, and configurations of the disclosure are possible utilizing, alone or in combination, one or more of the features set forth above or described in detail below. As will be appreciated, other embodiments are possible using, alone or in combination, one or more of the features set forth above or described herein. For example, it is contemplated that various features and devices shown and/or described with respect to one embodiment may be combined with or substituted for features or devices of other embodiments regardless of whether or not such a combination or substitution is specifically shown or described herein.

BRIEF DESCRIPTION OF THE FIGURES

The accompanying drawings are incorporated into and form a part of the specification to illustrate several examples of the present disclosure. The drawings are not to be construed as limiting the disclosure to only the illustrated and described examples.

FIG. 11A is a perspective view of a clamp of another embodiment of the present disclosure with an insert of the clamp in a first position relative to a body of the clamp;

FIG. 11B is an end elevation view of the clamp of FIG. 11A positioned on a roof joint and with the insert in the first position relative to the body;

FIG. 14A is an end elevation view showing a first end of the insert according to the embodiment of FIG. 13B;

FIG. 14B is another end elevation view showing a second end of the insert of FIG. 14A;

FIG. 20 is a perspective view of still another clamp of the present disclosure; and FIG. 21 is an end elevation view of the clamp of FIG. 20.

DETAILED DESCRIPTION

Before any embodiments of the disclosure are explained in detail, it is to be understood that the disclosure is not limited in its application to the details of construction and the arrangement of components set forth in the following description or illustrated in the figures. The disclosure is capable of other embodiments and of being practiced or of being carried out in various ways. As will be appreciated, other embodiments are possible using, alone or in combination, one or more of the features set forth above or described herein. For example, it is contemplated that various features and devices shown and/or described with respect to one embodiment may be combined with or substituted for features or devices of other embodiments regardless of whether or not such a combination or substitution is specifically shown or described herein. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure. The use of "mounting device" and "clamp" can be interchangeable herein.

Figure 1A:
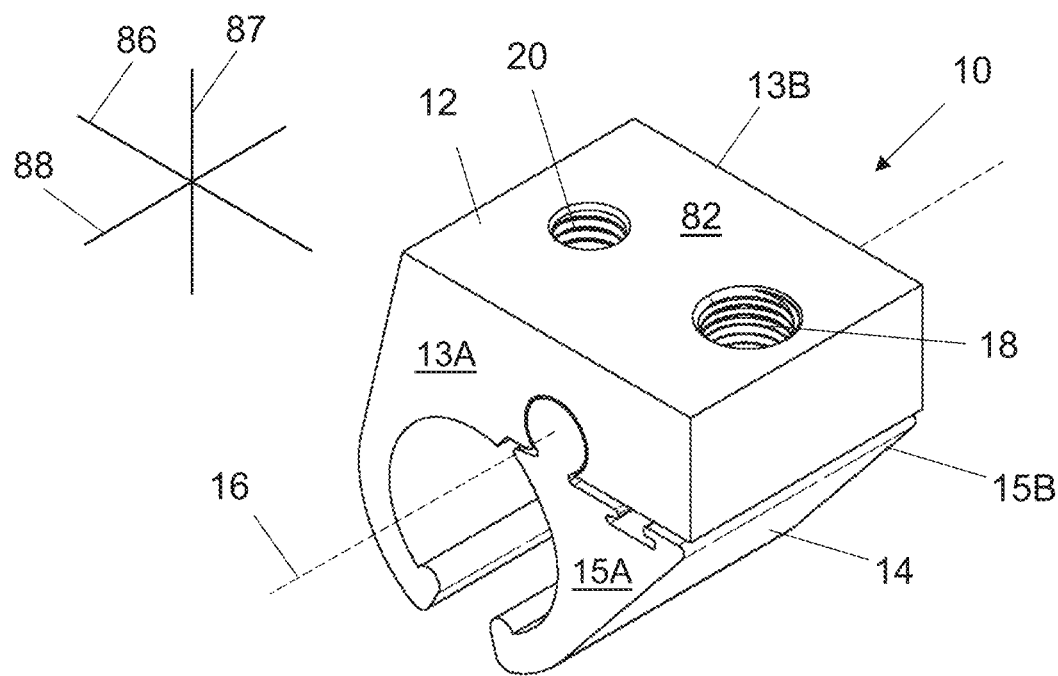
FIG. 1A is a perspective view of a clamp according to embodiments of the present disclosure.
Figure 1B:
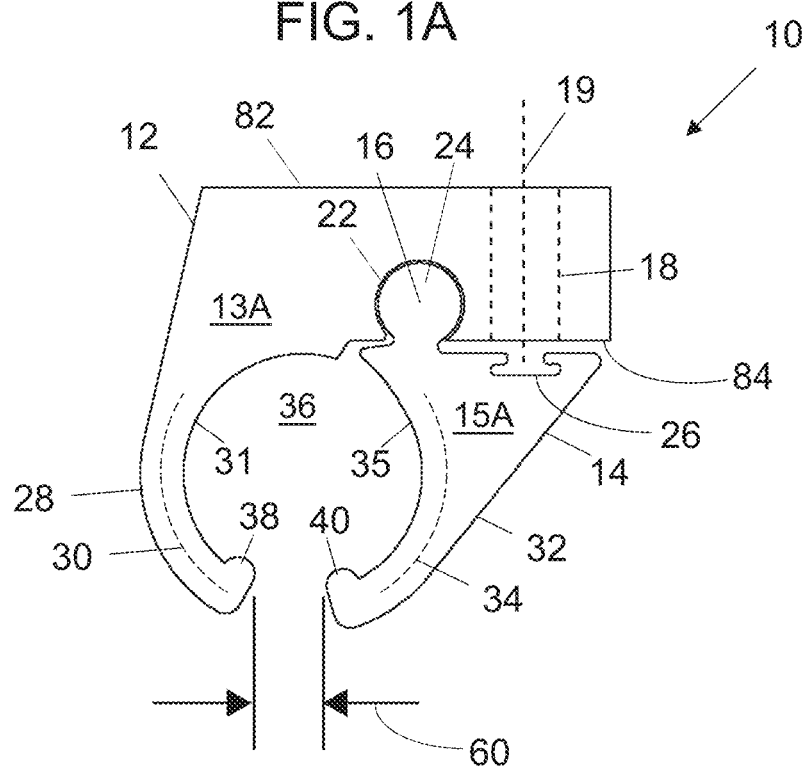
FIG. 1B is an end elevation view of the clamp in FIG. 1A according to embodiments of the present disclosure.

Referring to FIGS. 1A and 1B, a perspective view and an end elevation view of a clamp 10 are provided, respectively. The clamp 10 has an insert 14 that rotates relative to a body 12 about an axis 16. The insert 14 can rotate between a first position and a second position to secure the clamp 10 to a roof joint 56 without pinning or otherwise fixing the roof joint to an underlying support 42, such as a halter or clip, and without crushing or otherwise significantly deforming the roof joint (including in particular the bulb seam or other distal portion of the roof joint).

The clamp body 12 may be unitary or of one-piece construction. The clamp body may be an extrusion of a material that is appropriate for the desired application of the clamp 10, such as aluminum, stainless steel, zinc, copper or brass alloys. Other manufacturing techniques could also be utilized for making the clamp body, such as casting or machining. However, extruding the clamp body 12 provides a number of advantages, including ease of manufacture, reduced costs, and structural strength.

Additionally, or alternatively, the insert 14 may also be of a one-piece or unitary construction. The insert may be formed of any suitable material including, without limitation, aluminum, stainless steel, zinc, copper or brass. In one embodiment, the insert 14 is extruded. However, in other embodiments, the insert is produced by other manufacturing techniques, such as casting or machining.

The clamp 10 can be described relative to a horizontal dimension (or axis) 86, a vertical dimension or axis 87, and a longitudinal dimension or axis 88. The axes 86, 87, 88 are orthogonal to each other.

As also shown in FIG. 1A, the clamp 10 may optionally include one or more of a bar aperture 18 and a connection aperture 20. The bar aperture 18 can receive a bar component 58 that, when advanced through the bar aperture 18, causes the insert 14 to rotate about the axis 16 as described in further detail below.

The bar aperture 18 extends along an axis 19 that is oriented to engage an upper surface 68 of the insert 14. Notably, in this embodiment, the axis 19 is offset from a receiving space 36 of the clamp 10. More specifically, the axis 19 does not intersect the receiving space 36. Accordingly, a bar component 58 advanced through the bar aperture 18 will not contact a roof joint 56 positioned within the receiving space 36. This is beneficial because the bar component will not damage the roof joint or scratch a finish or coating of the roof joint. Moreover, the bar component will not bend or deform vertical sidewalls 53, 55 of the roof joint and squeeze a body of a roof support within the roof joint.

In one embodiment, the axis 19 is approximately perpendicular to the upper surface 82 of the body 12. In another embodiment, the axis 19 is approximately parallel to the vertical axis 87.

Optionally, the bar aperture 18 may initially be unthreaded prior to first advancing the bar component 58 through the aperture. The unthreaded bar aperture 18 reduces operations required to manufacture the body 12 and beneficially reduces the cost of producing the clamp 10. Alternatively, in one embodiment, the bar aperture 18 includes an interior thread.

The connection aperture 20 can be an aperture, a recess, or other similar connection feature that allows various structures to be connected to the clamp 10. For instance, the clamp 10 can be connected to a roof joint 56, and then a brace, a snow guard, a solar panel, or other similar structures can be connected to the connection aperture 20 of the clamp 10. The connection aperture 20 may or may not be threaded. In one embodiment, the connection aperture 20 is adapted to receive a threaded fastener, such as a set screw or a bolt. Optionally, the connection aperture 20 has a diameter that is different than a diameter of the bar aperture 18. For instance, in one embodiment, the diameter of the connection aperture is less than the diameter of the bar aperture.

Although only one connection aperture 20 is illustrated in FIG. 1A, clamps 10 of all embodiments of the present disclosure may have any number of connection apertures. Further, although the connection aperture 20 is illustrated oriented generally parallel to the vertical axis 87, other orientations and positions of the connection aperture are contemplated. In one embodiment, one or more connection apertures 20 are formed in the first end 13A or the second end 13B.

Optionally, in one configuration, the connection aperture 20 may extend through the body of the clamp. In another configuration, the connection aperture 20 intersects the receiving space 36.

In one embodiment, the connection aperture 20 is elongated in the longitudinal direction 88 to define a slot. The slot aperture 20 extends at least partially from the first end 13A to the second end 13B of the body 12. In one embodiment, the slot aperture 20 extends the length of the body from the first end 13A to the second end 13B. The slot aperture 20 has a first width to receive a shaft of a fastener.

Optionally, the body 12 includes a second slot that is below the slot aperture 20 in the vertical direction 87. The slot aperture 20 intersects the second slot. The second slot has a second width that is greater than the first width. More specifically, the second slot is sized to receive a nut to engage the fastener shaft or a head at an end of the fastener shaft. Examples of slots of a variety of sizes and configurations that can be formed in the body 12 of all embodiments of the present disclosure are described in U.S. Pat. Pub. 2019/0169856 which is incorporated herein by reference in its entirety.

In FIG. 1B, an end elevation view of the clamp 10 is provided. The insert 14 has a protrusion 24 that can be positioned within a recess 22 of the body 12. In one embodiment, the protrusion 24 has a generally circular cross-sectional shape that matches a generally circular cross-sectional shape of the recess 22 to promote rotation of the protrusion 24 within the recess 22. The recess 22 can have a shape that is generally cylindrical. Similarly, the protrusion 24 can have a generally cylindrical shape with a diameter that is about equal to, but not greater than, a diameter of the recess. Optionally, the recess 22 can extend from a first end 13A to an opposing second end 13B of the body 12.

Additionally, the protrusion 24 may extend from the first end 15A to the second end 15B of the insert 14. However, it will be appreciated that embodiments of the present disclosure encompass different configurations of the protrusion 24 and recess 22. For example, the recess 22 may extend only partially through the body 12 such that the protrusion 24 slides into an open end of the recess 22 until the protrusion 24 contacts a closed end of the recess 22.

In some embodiments, the material of the clamp 10 immediately adjacent to one end of the recess 22 may be peened or otherwise treated to create one or more protrusions extending into the recess 22. Such protrusions may beneficially prevent the insert 14, once inserted into the recess 22 from the opposite end of the recess 22, from sliding out of the end of the recess 22 adjacent the peening. In some embodiments, material of the clamp 10 immediately adjacent to one end of the recess 22 may be peened as described above either before or after an insert 14 has been inserted into the recess 22, and the opposite end of the recess 22 may be peened as described above after the insert 14 has been inserted into the recess 22, so as to prevent the insert 14 from sliding out of or otherwise being removed from the recess 22.

In addition, although the cross-sectional shapes of the protrusion 24 and the recess 22 are depicted as generally circular, embodiments of the present disclosure encompass non-circular shapes. For instance, one of the protrusion 24 and the recess 22 can have a surface with one or more detents, and the other one of the protrusion 24 and the recess 22 can have a surface with one or more depressions. Thus, the protrusion 24 can rotate within the recess 22 between discrete positions as the detents are received in the depressions rather than among an infinite number of positions as is possible with the circular cross sections. The discrete positions can improve the ability of the protrusion 24 and the recess 22, and thus of the insert 14 and the body 12, to hold relative to each other at a first position, a second position, etc.

The body 12 includes an upper surface 82 opposite a lower surface 84. In one embodiment, the upper surface 82 is generally planar. The lower surface 84 may optionally be generally planar. In one embodiment, the upper and lower surface 82, 84 are approximately parallel. Optionally, the lower surface 84 is approximately parallel to the horizontal axis 86.

Figure 4:
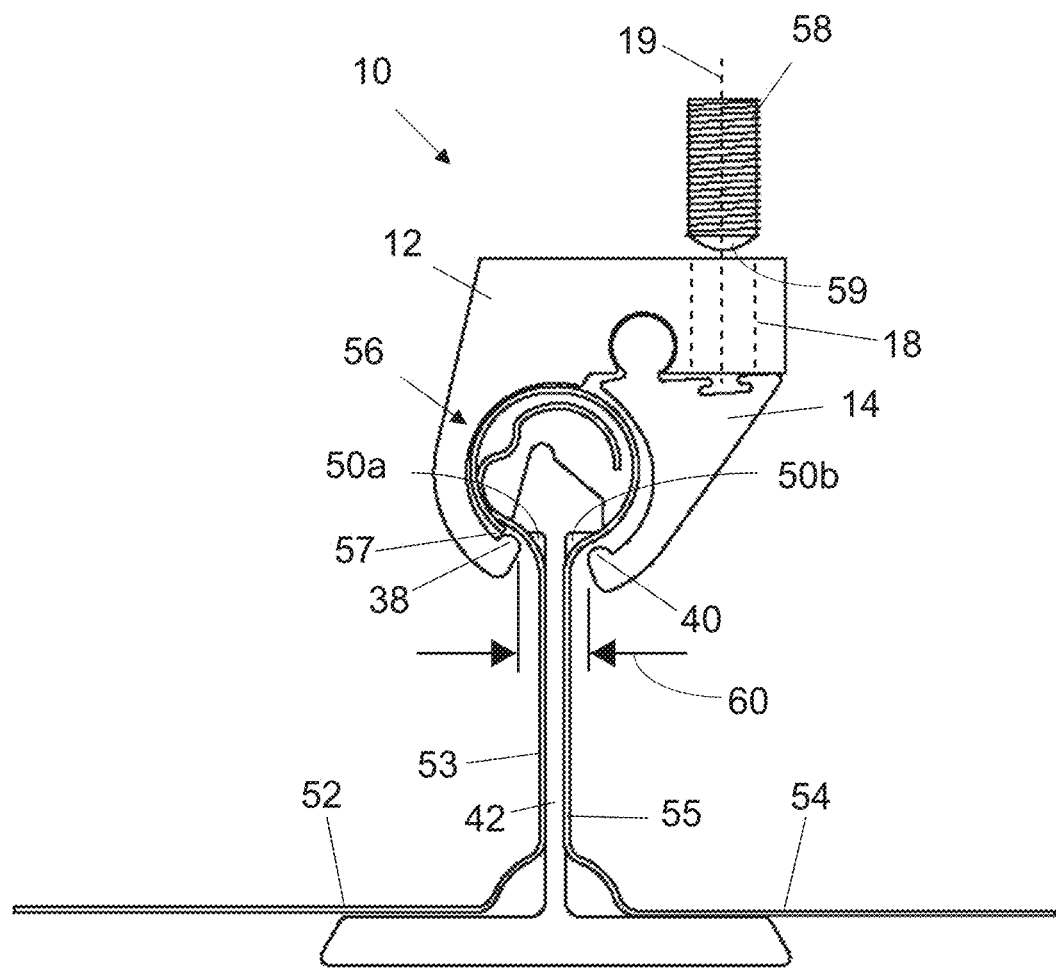
FIG. 4 is an end elevation view of a clamp around a roof joint and a roof support with an insert in a first position relative to a body of the clamp according to embodiments of the present disclosure.
Figure 5:
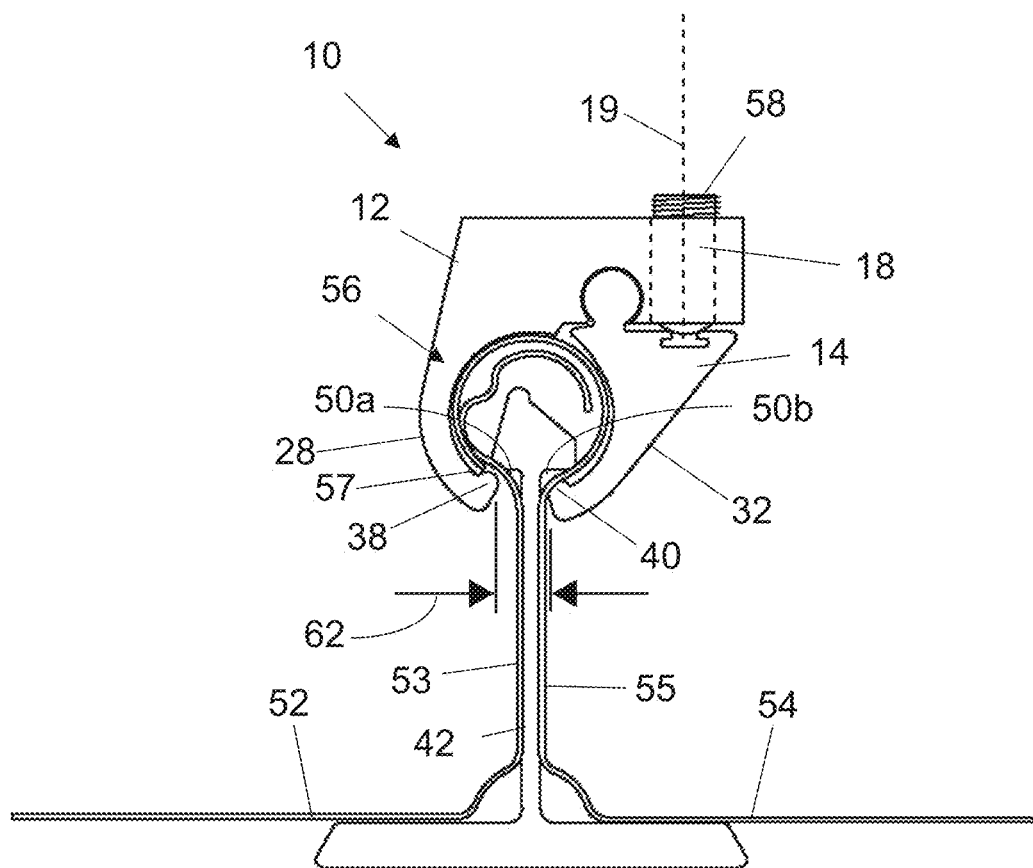
FIG. 5 is an end elevation view of the clamp, the roof joint, and the roof support of FIG. 4 with the insert in a second position relative to the body of the clamp according to embodiments of the present disclosure.

Next, the insert 14 optionally comprises a deformable portion 26, as generally shown in FIG. 1B. This deformable portion 26 can be aligned with the bar aperture 18. In this manner, the deformable portion receives a distal end of a bar component 58 extending through the bar aperture 18 of the body 12. The bar component 58 contacts and pushes the insert 14 from a first position (such as generally illustrated in FIG. 4) to a second position (which is generally shown in FIG. 5) relative to the body 12 and about the axis 16. The deformable portion 26 in this embodiment is deformable such that when the distal end 59 of the bar component 58 drives into the deformable portion 26, the bar component deforms the deformable portion 26. In one embodiment, the bar component 58 can become partially embedded within the deformable portion 26 and the insert 14. As a result, the bar component 58 prevents the protrusion 24 of the insert 14 from sliding out of the recess 22 of the body 12 along the direction of the axis 16. Moreover, when the bar component 58 is at least partially embedded in the deformable portion 26, inadvertent or unintended movement of the protrusion 24 relative to the recess 22 is prevented or reduced. Further features of the deformable portion 26 are described in detail below.

Figure 12A:
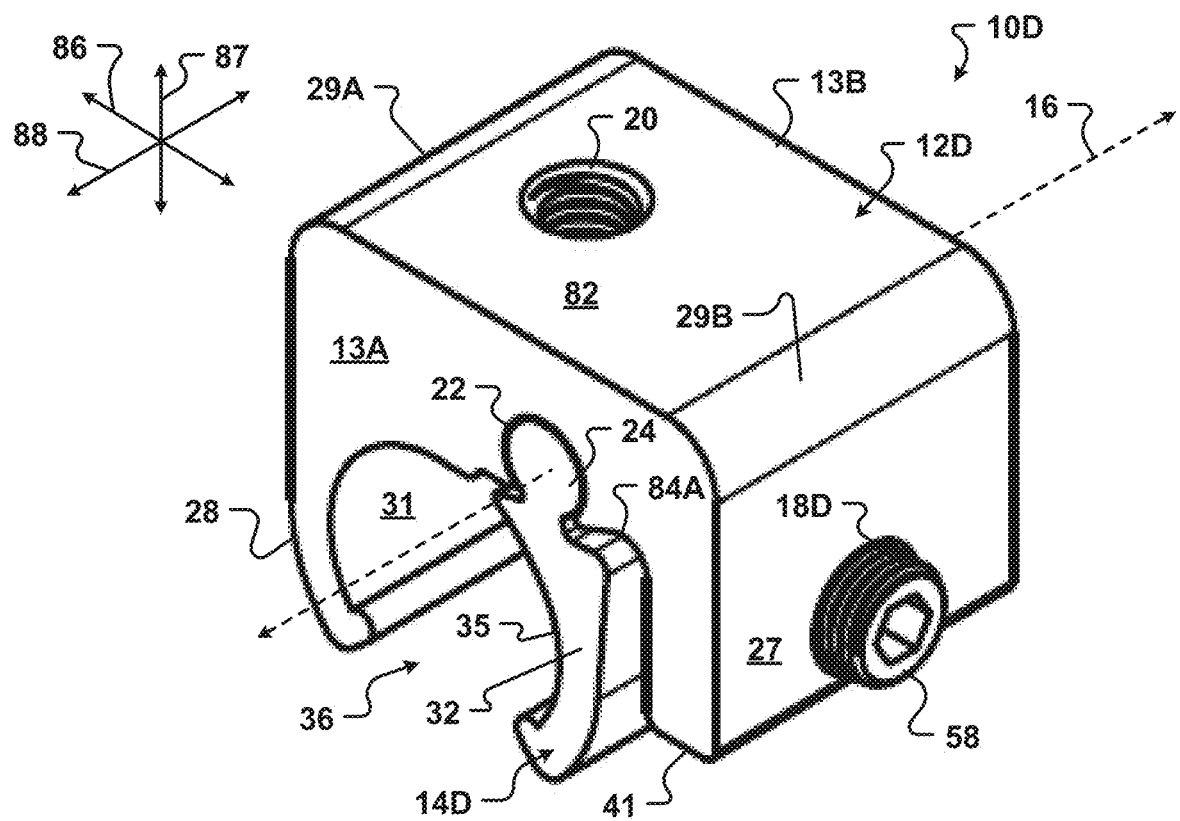
FIG. 12A is a perspective view of a clamp of yet another embodiment of the present disclosure with an insert.
Figure 12B:
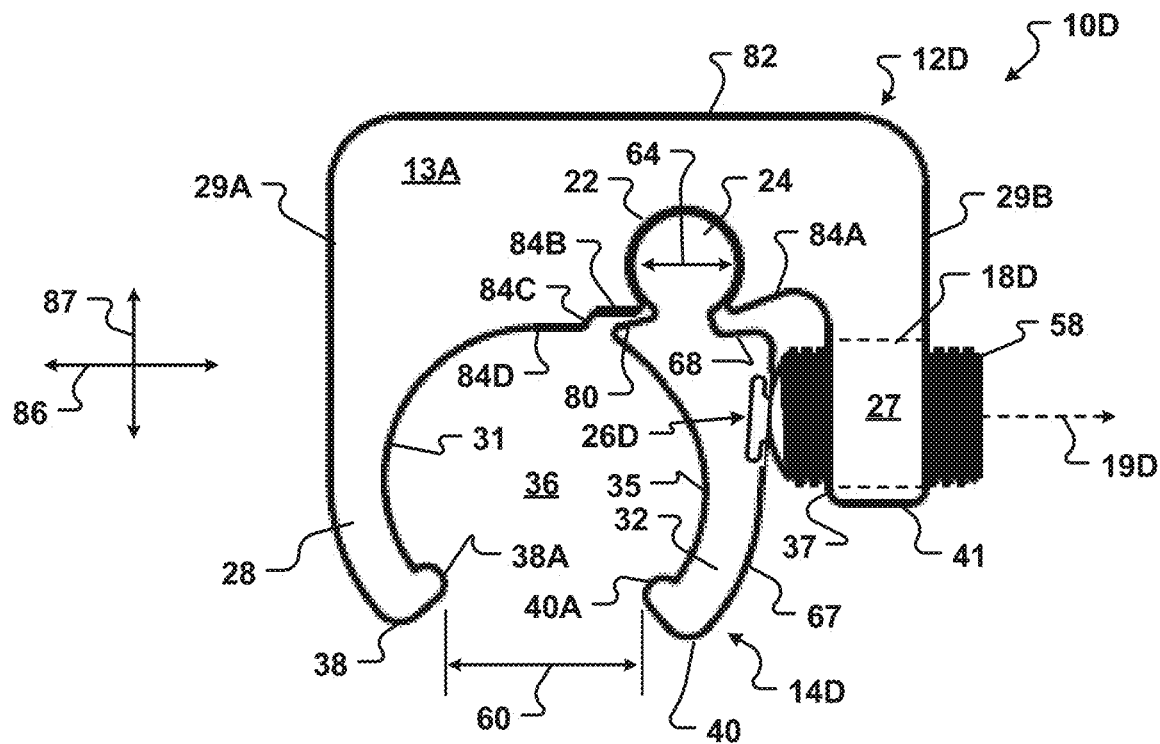
FIG. 12B is an end elevation view of the clamp of FIG. 12A in an open or first position.
Figure 12C:
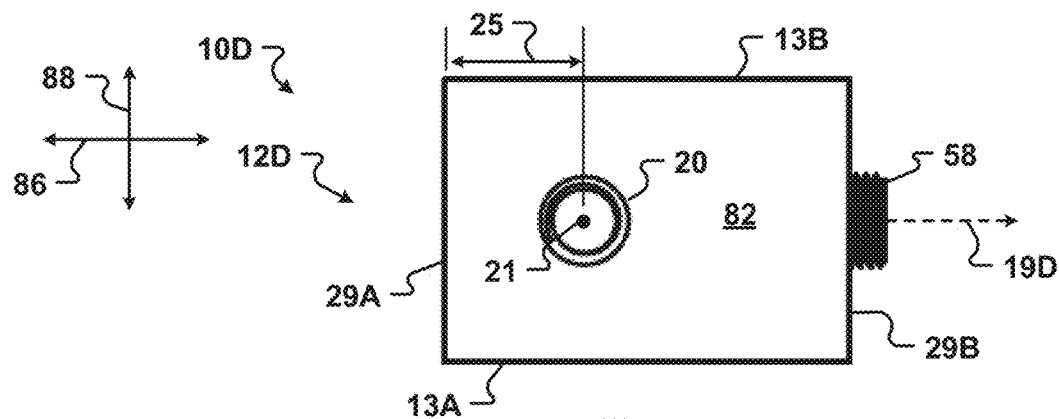
FIG. 12C is a top plan view of the clamp of FIG. 12A.
Figure 12D:
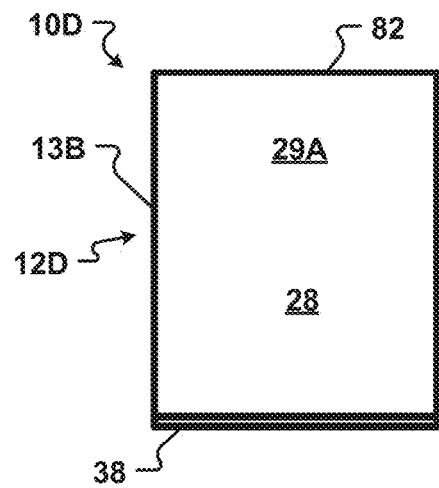
FIG. 12D is a first side elevation view of the clamp of FIG. 12A.
Figure 12E:
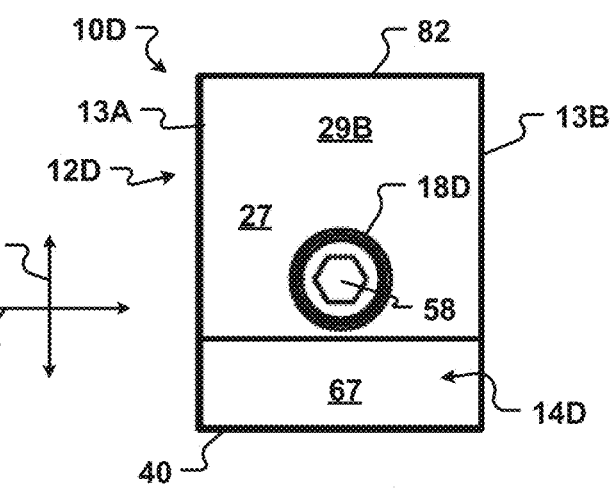
FIG. 12E is a second side elevation view of the clamp of FIG. 12A.

It will be appreciated that embodiments of the present disclosure encompass inserts 14 that do not comprise a deformable portion 26, but that still prevent sliding movement between the body 12 and the insert 14. For instance, the distal end 59 of the bar component 58 can contact a non-deformable surface of the insert 14 with varying shapes. The non-deformable surface can comprise a surface with a recess for receiving the distal end 59 of the bar component 58, a flat surface, or any other desired surface. As generally illustrated in FIG. 12H, the insert may optionally include one or more grooves 69 formed in the outer surface 67. The grooves 69 are positioned such that the distal end 59 of a bar component 58 may engage them when advanced through the bar aperture. Optionally, a first groove 69A is positioned about 0.1 inches from the insert upper surface 68. A second groove 69B is optionally positioned about 0.06 inches from the first groove 69A.

As further shown in FIG. 1B, the body 12 has a first arm 28 extending along a line 30 and the insert 14 has a second arm 32 extending along another line 34. As generally illustrated, the lines 30, 34 may be curved or arcuate. More specifically, the lines 30, 34 may have a predetermined radius of curvature.

The arms 28, 32 have respective first and second inner surfaces 31, 35. The inner surfaces 31, 35 of the arms have a round or curved shape. More specifically, in one embodiment, the first inner surface 31 and the second inner surface 35 are concave. Such concavity beneficially allows the clamp 10 to achieve a close fit around the roof joint seam 56, while also beneficially reducing the likelihood that the clamp 10 will deform or otherwise damage the roof joint seam 56.

The first and second inner surfaces 31, 35 define a receiving space 36 of the clamp 10. In one embodiment, the receiving space 36 has a cross-section that is generally circular. The receiving space 36 can be described as having a cylindrical shape with an axis extending about parallel to the longitudinal axis 88. When the clamp 10 is positioned about a portion of a roof or sidewall of a building, such as a roof joint seam 56, the arms 28, 32 extend around the roof joint seam such that it is positioned within the receiving space 36. The arms 28, 32 can be set off (or spaced) from the roof joint seam by a distance or can contact and generally conform to the roof joint seam. Then, the arms 28, 32 can move from a first position to a second position to secure the clamp 10 to the roof joint seam 56.

The lines 30, 34 can optionally have approximately the same radius of curvature in this embodiment, but it will be appreciated that the present disclosure encompasses embodiments where the lines 30, 34 have different radii of curvature. Optionally, the first and second inner surfaces have a radius of curvature of between about 0.40 inches and 0.46 inches, or about 0.43 inches. Alternatively, in one embodiment, the lines 30, 32 have no radius of curvature at all.

Next, each arm 28, 32 may have a respective protrusion or distal end 38, 40 that extends away from the lines 30, 34 and into the receiving space 36. The distal ends 38, 40 may be rounded to reduce a chance of the distal ends 38, 40 puncturing the roof panel portions that form the roof joint seam, and/or to reduce a chance of the distal ends 38, 40 damaging a finish on the roof panel portions that form the roof joint seam 56.

These distal ends 38, 40 can be positioned (when the clamp 10 is installed on a roof joint seam) below a maximum diameter or dimension of a roof joint seam to retain the clamp 10 to the roof joint seam without crushing or significantly deforming the roof joint seam, and without pinning the roof joint seam 56 to an underlying support 42. Further, in some embodiments, the distal ends 38, 40 can be positioned below a maximum diameter or dimension of a roof joint (e.g., below a bulb seam thereof) and slightly deform part of the roof joint (but not so much as to pin the roof joint to an underlying support) to secure the clamp 10 to the roof joint. Though depicted as distal ends 38, 40, these features 38, 40 can extend from the respective arms 28, 32 at a location that is offset from the distal ends of the arms 28, 32.

Although embodiments of the present disclosure illustrated in the Figures depict a clamp 10 comprising a first arm 28, and an insert 14 comprising a second arm 32, in some embodiments, the clamp 10 may comprise a first arm 28 and a second arm opposite the first arm, the second arm extending in the same direction as the first arm but from an opposite side of the clamp 10, such that an insert 14, when positioned in the recess, extends in between the first arm 28 and the second arm. In such embodiments, the bar aperture 18 may be positioned in the first or second arm, and the bar component 58 may extend through the bar aperture 18 to impact the insert 14.

Figure 2:
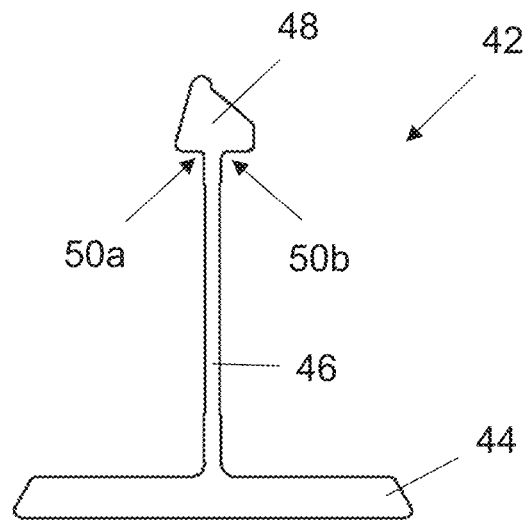
FIG. 2 is an end elevation view of a roof support according to embodiments of the present disclosure.

Referring to FIG. 2, an end elevation view of a roof support 42 is provided. The roof support 42 generally has a base 44, a body 46 that extends upward from the base 44, and a distal end 48. From the end elevation view, the distal end 48 has a larger width or diameter than the body 46, and the distal end 48 extends to the left and the right of the body 46 to define two recesses 50*a*, 50*b*. It will be appreciated that the distal end 48 may extend to only one side of the body 46 to define a single recess in some embodiments. In this embodiment, the support 42 is a roof halter that can extend upward from a roof subsurface, secure a material such as insulation, and provide a location to secure metal roof panels. In other embodiments, a support 42 within the scope of the present disclosure may be a clip, or any other structure or device over which a roof joint is installed in a floating configuration (e.g., where the roof joint is not fixedly secured to the support, but is free to expand, contract, and slide (at least to an extent) relative to the support).

Figure 3:
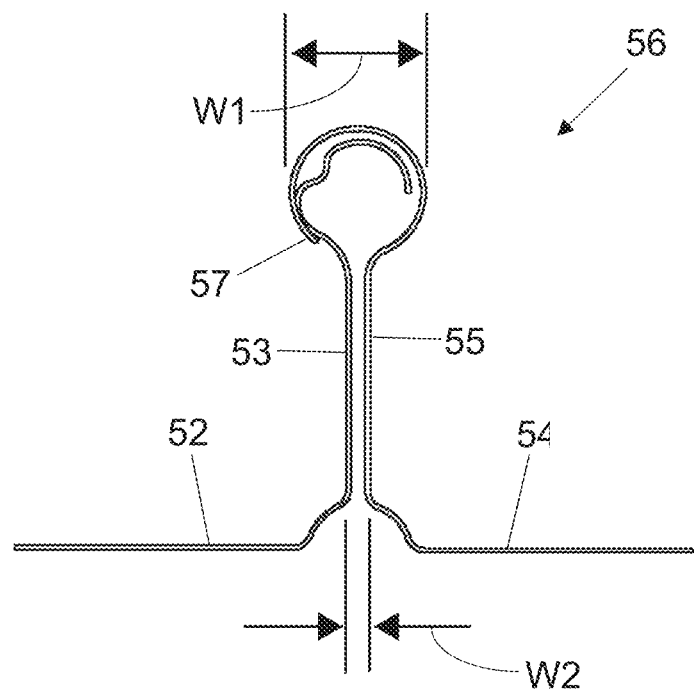
FIG. 3 is an end elevation view of a roof joint connecting two roof panels with a bulb seam according to embodiments of the present disclosure.

Referring to FIG. 3, an end elevation view of two roof panels 52, 54 that form a roof joint 56 is provided. The ends of the roof panels 52, 54 interleave with each other such that the first panel 52 can be placed on the support 42, and the second panel 54 can be positioned over the first panel 52 at an angle. Then, the second panel 54 can rotate into the position shown in FIG. 3 to form a roof joint 56, which in this instance comprises a bulb seam. This configuration allows for the quick and efficient assembly of roof panels 52, 54. When the two panels 52, 54 are joined, a distal or free end 57 of the second roof panel 54 is positioned outwardly relative to a curved portion of the first roof panel 52.

The roof joint 56 is spaced vertically above horizontal portions of the two roof panels 52, 54 by respective vertical portions 53, 55 of the panels. The roof joint 56 has a first width W1 that is greater than a second width W2 of the vertical portions 53, 55. One roof joint 56 has a first width W1 of approximately 0.875 inches. However, the clamps 10 of the present disclosure are adapted to be secured to roof joints 56 with other widths W1 and that are provided by various manufacturers.

Referring to FIG. 4, an end elevation view of a clamp 10, a bar component 58, a roof support 42, and roof panels 52, 54 is provided. Here, the first roof panel 52 and the second roof panel 54 are interleaved with each other over the distal end of the support 42. In addition, the insert 14 of the clamp 10 is in a first position relative to the body 12 to establish a first distance 60 between the distal ends 38, 40 of the arms of the body 12 and the insert 14. In one embodiment, the distal end 57 of the second roof panel 54 is proximate to (and may be engaged by) the protrusion 38 at the first end of the first arm 28.

In some embodiments, the first distance 60 is larger than the width W1 of the bulb seam of the roof joint 56 such that the clamp 10 can be directly placed on the roof joint 56 from above. In the depicted embodiment, the first distance 60 is smaller than the width W1 of the bulb seam of the roof joint 56, and the clamp 10 can slide into position from an end of the roof joint 56 to a desired point along the roof joint 56. Alternatively, the insert 14 can be separated from the body 12. The body 12 can then be positioned at a desired point along the roof joint 56. Thereafter, the insert 14 can be interconnected to the body 12 by aligning the insert protrusion 24 with the body recess 22. The installer can then move the protrusion 24 along the axis of rotation 16 within the recess 22 to form the clamp 10.

This method of installing the clamp on the roof joint is beneficial because the installer can lower the clamp 10 vertically onto the roof joint at the position where the clamp is needed on the roof joint. In contrast, some prior art roof clamps cannot be lowered directly onto the roof joint at the needed position, such as when the roof clamp cannot fit over bulb seam roof joint. Instead, these prior art roof clamps must be slid onto an end of the roof joint. The installer must then slide the roof clamp along the length of the roof joint to the needed position. This manner of positioning a prior art roof clamp on a roof joint is generally less efficient and is time consuming. For instance, the installer may need to slide the prior art roof clamp a considerable distance along the length of the roof joint to reach the position where the roof clamp is needed position. Moreover, there may be obstruction on the roof joint that prevents movement of the roof clamp along the length of the roof joint. For example, a previously installed roof clamp or other protrusion or structure on the roof joint may block the movement of the roof clamp.

When the clamp 10 is positioned on the roof joint, the distal ends 38, 40 of the arms 28, 32 are positioned proximate to the recesses 50*a*, 50*b* formed by the support 42 where, as explained in further detail below, the ends 38, 40 can partially extend into these recesses 50*a*, 50*b*. In one embodiment, the ends 38, 40 can optionally deform the panels 52, 54 into the recesses 50*a*, 50*b* (without pinning or otherwise fixedly securing the panels 52, 54 to the support 42). In this manner, the roof and one or more of the panels 52, 54 can still move at least slightly relative to the support 42 after the clamp 10 is secured to the roof joint 56.

One embodiment of the bar component 58 is generally shown in FIG. 4. Optionally, the bar component 58 in this embodiment is a set screw with a rounded distal end 59 that contacts the insert 14 to rotate the insert 14 relative to the body 12. In other embodiments, the bar component 58 may be or comprise a bolt, a screw, a threaded rod, or any other fastener suitable for engaging an aperture 18 of the clamp body 12. The bar component 58 may be generally cylindrical. In one embodiment, threads are formed on an exterior surface of the bar component 58 to engage interior threads of the bar aperture 18.

Referring to FIG. 5, another end elevation view of a clamp 10, a bar component 58, a support 42, and roof panels 52, 54 is provided. Here, the bar component 58 has contacted an upper surface 68 of the insert 14 to rotate the insert relative to the body 12 from the first position illustrated in FIG. 4 to a second position. As a result, a second distance 62 between the distal ends 38, 40 is smaller than the first distance 60. This causes the distal ends 38, 40 to at least retain the clamp 10 to the roof joint 56. This can be accomplished when the second distance 62 is less than a maximum diameter or dimension W1 of the roof joint 56. In addition, the second distance 62 can be less than a width of the distal end 48 of the support 42. Further still, the distal ends 38, 40 can extend into the recesses 50a, 50b to retain the clamp 10 to the roof joint 56. In some embodiments, the distal ends 38, 40 can deform part of the panels 52, 54 into the recesses 50a, 50b to provide an even more secure connection between the clamp 10 and the roof joint 56.

Notably, in one embodiment of the present disclosure, the arms 28, 32 engage the roof joint 56 when in the second position without contacting the vertical portions 53, 55 of the panels 52, 54. More specifically, in one embodiment, the distal ends 38, 40 of the arms contact a curved portion of the roof joint 56. In this manner, the vertical portions 53, 55 of the panels are not bent or deformed by engagement of the clamp 10 with the roof joint 56. Additionally, or alternatively, in one embodiment, the innermost portion of the protrusion 38 of the first arm is spaced from the roof joint 56 as generally illustrated in FIG. 5.

The protrusion 38 at the distal end of the first arm 28 is positioned proximate to the distal end 57 of the second roof panel 54. In one embodiment, the protrusion 38 at the distal end of the first arm 28 is engaged with the distal end 57 of the second roof panel 54. More specifically, the distal end 57 is positioned between the first inner surface 31 of the first arm and the inward protrusion 38 of the first arm. This arrangement is beneficial to prevent unintended or inadvertent rotation of the clamp 10 relative to the roof joint 56 in a clockwise direction when viewed from the perspective of FIG. 5.

It will be appreciated that in various embodiments the distal ends 38, 40 do not necessarily pinch the panels 52, 54 and/or the support 42, while in others they do. Beneficially, however, the distal ends 38, 40 do not pinch or otherwise deform the roof joint 56 to such an extent as to pin or otherwise fixedly secure the roof joint 56 to an underlying support 42. Moreover, the arms and the distal ends 38, 40 can accommodate different bulb seam sizes. With one seam size the distal ends 38, 40 secure the clamp 10 to the roof joint 56 in one manner as described herein, and with another seam size the distal ends 38, 40 secure the clamp 10 to the roof joint 56 in the same or a different manner.

Figure 6:
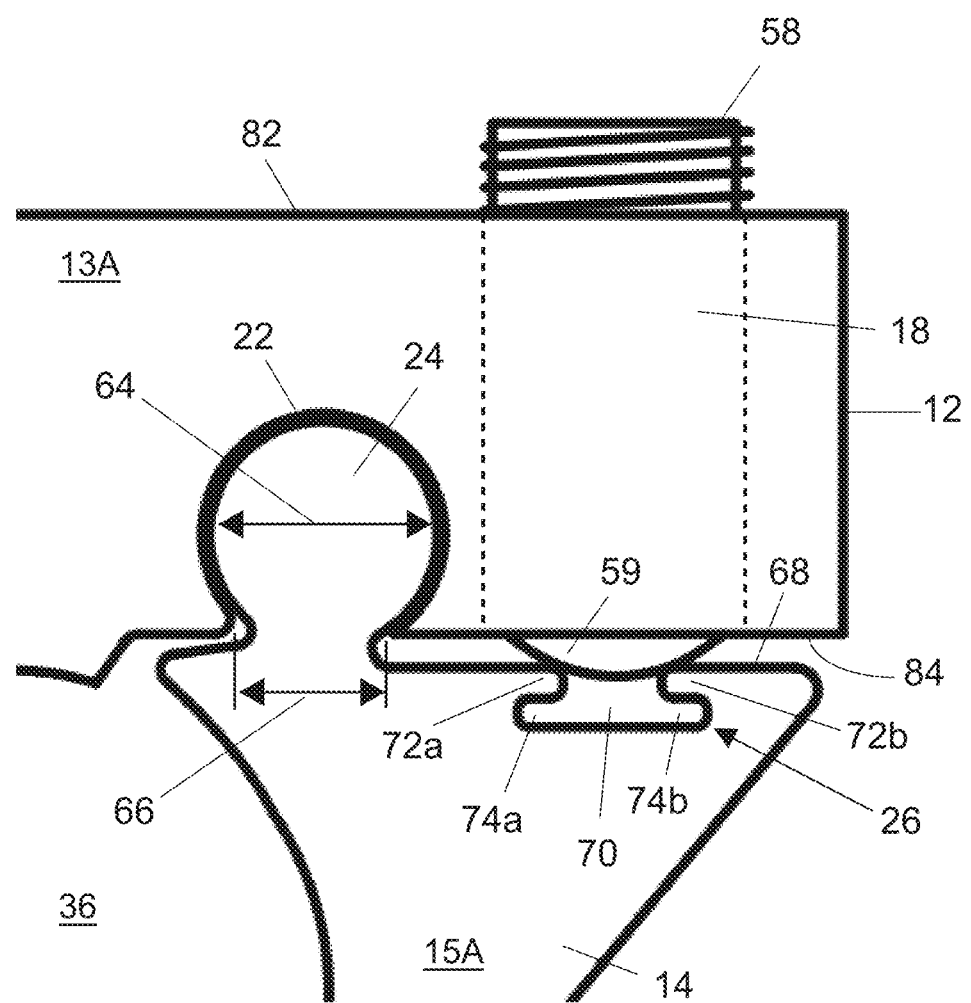
FIG. 6 is a partial detailed view of FIG. 5 showing the insert in the second position relative to the body of the clamp according to embodiments of the present disclosure.

Referring to FIG. 6, a detailed end elevation view of portions of the insert 14 and the body 12 is provided. Specifically, a detailed view of the relationship between the protrusion 24 of the insert 14 and the recess 22 of the body 12 as well as the optional deformable portion 26 are provided. The width or diameter 64 of the circular shape of the protrusion 24 is larger than the width 66 of an opening of the recess 22 such that the protrusion 24 is retained in the recess 22. More specifically, the protrusion 24 may not be pulled out of the recess 22 through the recess to opening. Accordingly, the protrusion 24 can be positioned within the recess 22 from an end 13A or 13B of the body 12 and the moved along the axis 16.

Next, the optional deformable portion 26 in this embodiment comprises a channel 70 that extends into an upper surface 68 of the insert 14. The channel 70 can extend into the insert 14 along a portion of or along the entirety of a length of the insert 14 (where the length of the insert 14 is generally parallel to an axis of the protrusion 24 of the insert 14). In the embodiment of FIG. 6, the channel 70 extends along an entirety of the length of the insert 14, while in other embodiments, the channel 70 extends only partially along the length of the insert 14. Two deformable flanges or edges 72a, 72b extend over the channel 70. The distal end 59 of the bar component 58 can drive into and at least partially deform one or both of these edges 72a, 72b.

In addition, the deformable portion 26 can comprise channel recesses 74a, 74b that extend outwardly into the insert 14 from a center portion of the channel 70. These recesses 74a, 74b can extend underneath the edges 72a, 72b of the deformable portion 26 to provide space into which the edges 72a, 72b can deflect, and thus promote the deformation of the edges 72a, 72b. Accordingly, the channel 70 has a first width between opposing edges 72a, 72b that is less than a second width of the channel between opposing recesses 74a, 74b.

Figure 7:
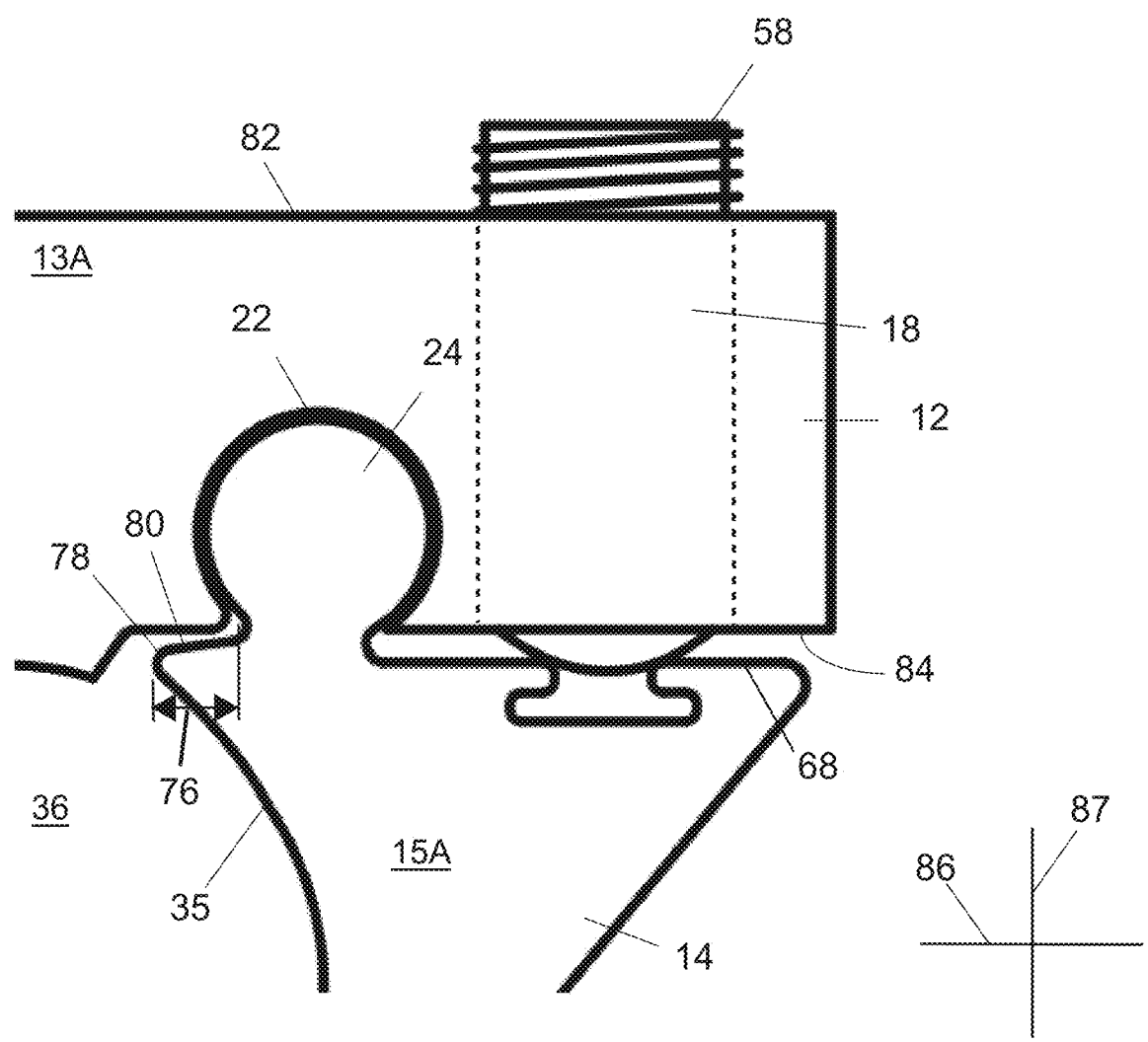
FIG. 7 is a further partial detailed view of FIG. 5 showing the insert in the second position relative to the body of the clamp according to embodiments of the present disclosure.

Referring to FIG. 7, a further detailed end elevation view of portions of the insert 14 and the body 12 is provided. Specifically, an offset 76 between the protrusion 24 of the insert 14 and an edge 78 of the second inner surface 35 of the insert 14 is shown. This offset 76 establishes a stop portion 80 of the insert 14 that can contact the body 12 as the insert 14 rotates relative to the body 12. The stop portion 80 is positioned on an inward portion of the insert between the insert protrusion 24 and the receiving space 36 of the clamp 10. In this embodiment, in the view shown in FIG. 7, the stop portion 80 is the left-most portion of the insert 14, and if the insert 14 rotates too far in the clockwise direction, the stop portion 80 will contact the body 12 to limit rotation of the insert 14. This limit can be the second position as described herein or another position. Regardless, this limit can be useful to prevent the arms of the insert 14 and the body 12 from moving too close to each other and pinning a roof joint to an underlying support and/or crushing a roof joint seam. For example, in one embodiment the stop portion 80 is configured to stop rotation of the insert 14 relative to the body 12 before the second distal end 40 of the second arm contacts the first distal end 38 of the first arm.

The stop portion 80 can have a variety of configurations. In one embodiment, which is generally illustrated in FIG. 7, the stop portion 80 is angled relative to a plane defined by the upper surface 68 of the insert 14. Accordingly, the stop portion 80 can be described as starting at the protrusion 24 and extending downwardly relative to a horizontal axis 86 to the edge 78 when the insert upper surface 68 is parallel to the horizontal axis. In one embodiment, the stop portion 80 is oriented at an angle of between about 1° and about 20° relative to the insert upper surface 68. In another embodiment, the angle of the stop portion 80 is between about 7° and about 11° relative to the insert upper surface 68.

In one embodiment, the protrusion is closer to the left edge 78 than to a right or outer edge of the insert 14. While the insert protrusion 24 in FIG. 7 is offset from both the left edge 78 and the right edge of the top surface 68 of the insert 14, it will be appreciated that the protrusion 24 can be located at one edge and would therefore be offset from only the opposing edge.

Figure 8A:
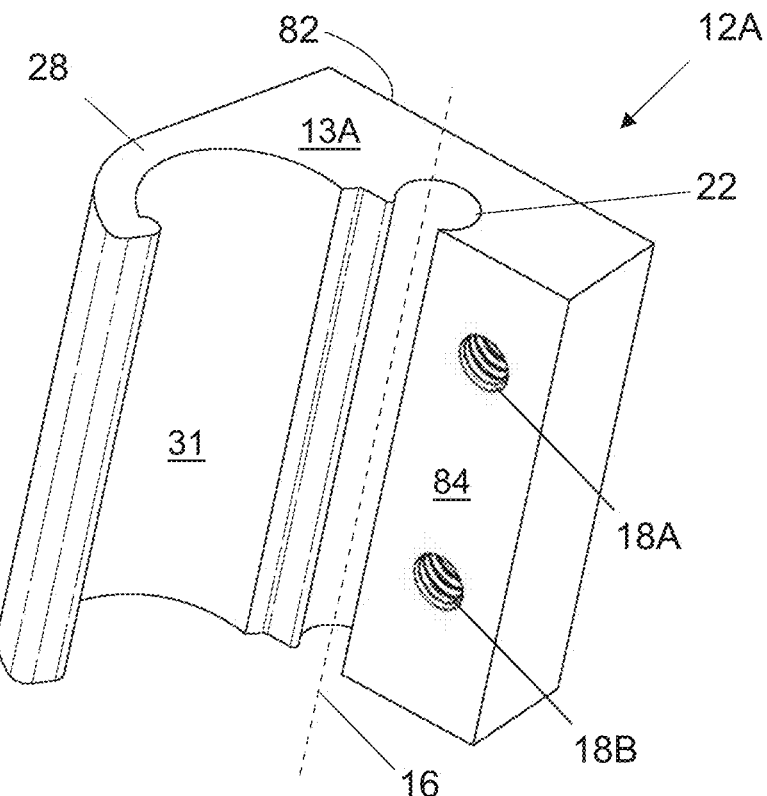
FIG. 8A is a perspective view of a body of a clamp according to embodiments of the present disclosure.
Figure 8B:
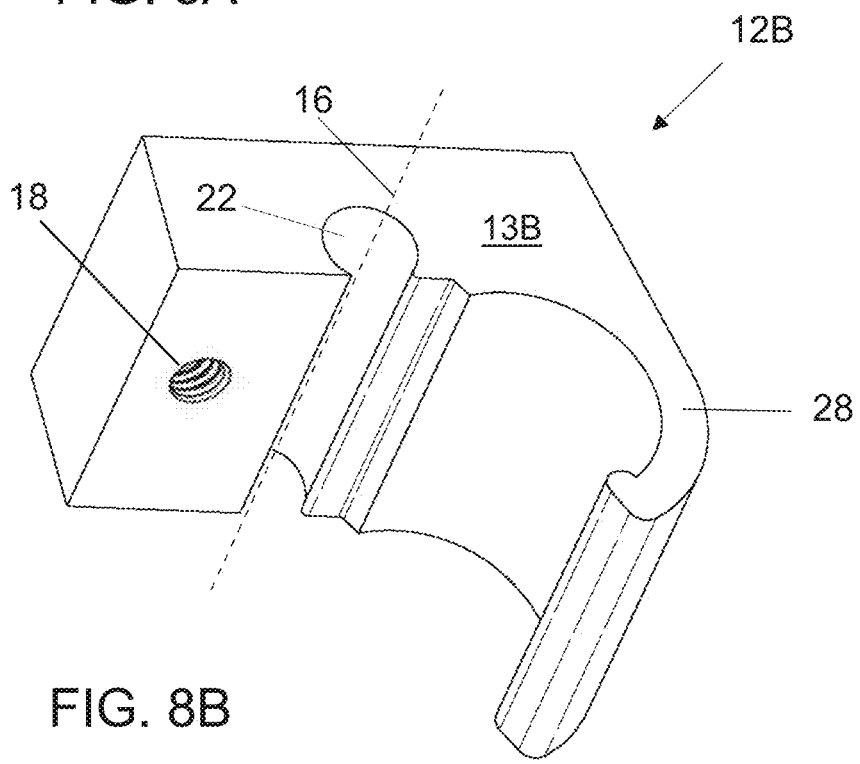
FIG. 8B is a further perspective view of a body of a clamp, with a length that is shorter than the length of the clamp in FIG. 8A, according to embodiments of the present disclosure.

Referring to FIGS. 8A and 8B, further perspective views of bodies 12A, 12B of embodiments of the present disclosure are provided. As shown, the first arm 28 and the recess 22 extend completely along a length of the body 12, but in other embodiments, these features 28, 22 may extend only partially along the body 12. A length of the body 12A (in a direction parallel to an axis 16 of the recess 22) may be relatively longer, as shown in FIG. 8A, or the body 12B may have a relatively shorter length, as shown in FIG. 8B, depending on factors such as, for example, an amount of available space on a roof joint, and/or a size and/or weight of a structure, appliance, or other object to be attached to the clamp 10 of which the body 12 forms a part.

Figure 9A:
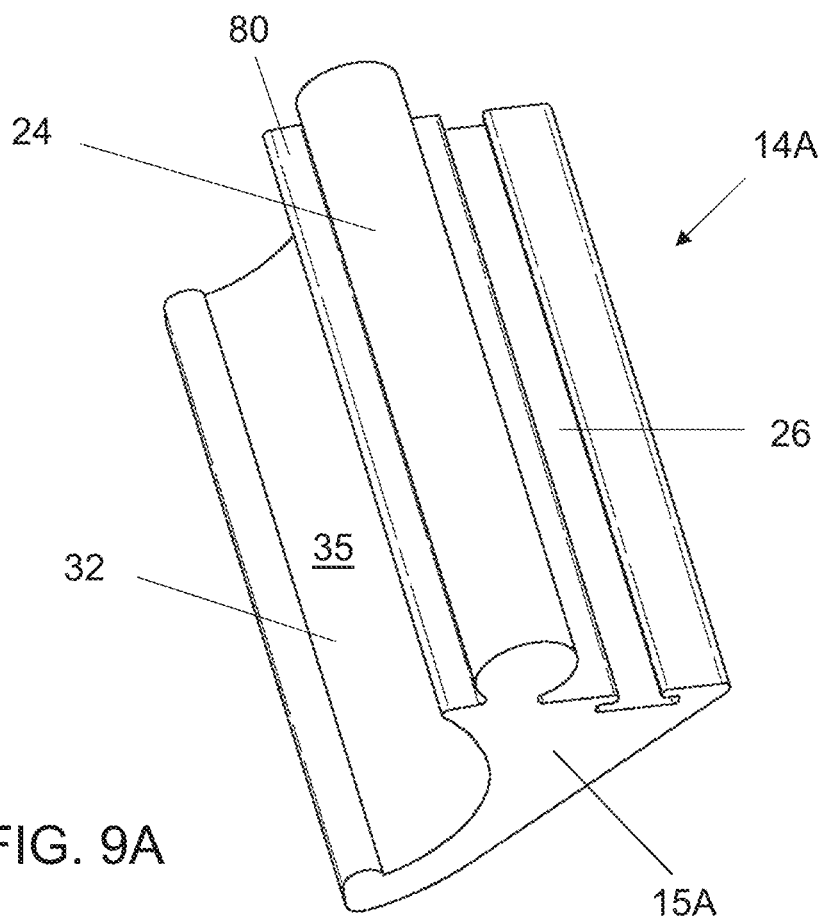
FIG. 9A is a perspective view of an insert of a clamp according to embodiments of the present disclosure, the insert having a length to fit in the body of FIG. 8A.
Figure 9B:
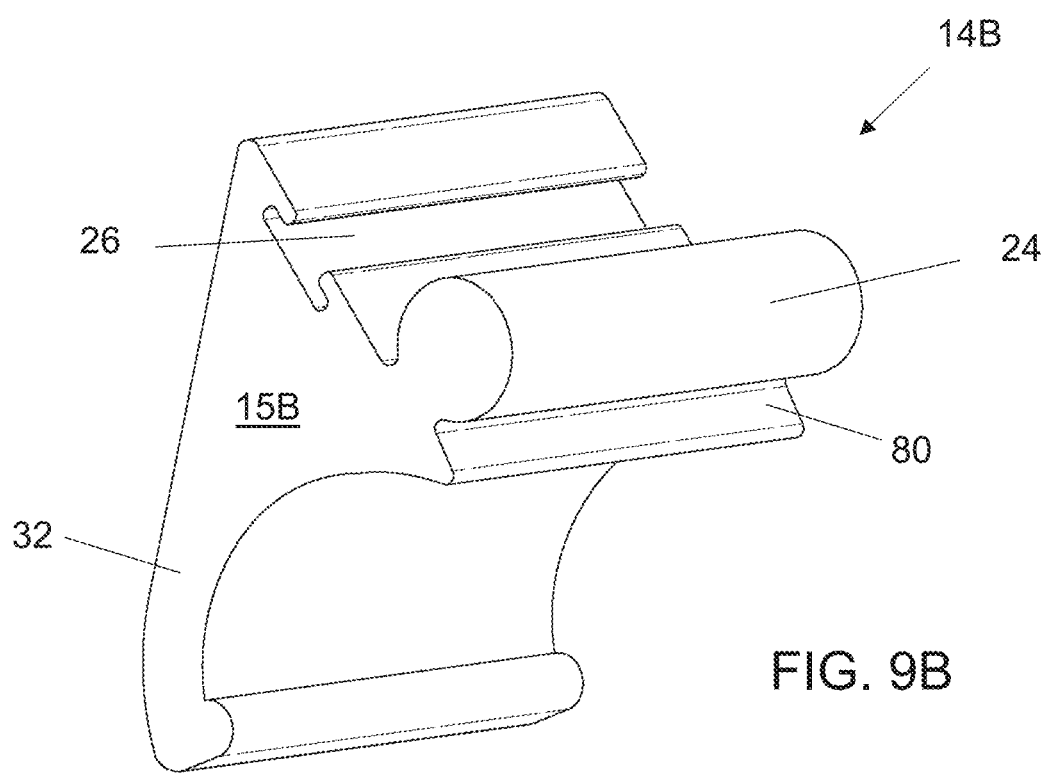
FIG. 9B is another perspective view of an insert with a length to fit in the body of FIG. 8B, the length being less than the length of the insert in FIG. 9A, according to embodiments of the present disclosure.

Referring to FIGS. 9A and 9B, perspective views of embodiments of the insert 14A, 14B of different lengths are provided. As shown, the second arm 32, the protrusion 24, and the optional deformable portion 26 may extend completely along the length of the insert 14 from a first end 15A to a second end 15B. Alternatively, in other embodiments, these features 32, 24, 26 may extend only partially along the body 12. A length of the insert 14 may be selected to match a length of the corresponding body 12. More specifically, an insert 14A may have a length approximately equal to the length of the body 12A. Similarly, an insert 14B can have a shorter length sized to substantially match the length of the body 12B. The lengths of the body and insert are measured in the longitudinal dimension 88 (shown in FIG. 1A).

Figure 10A:
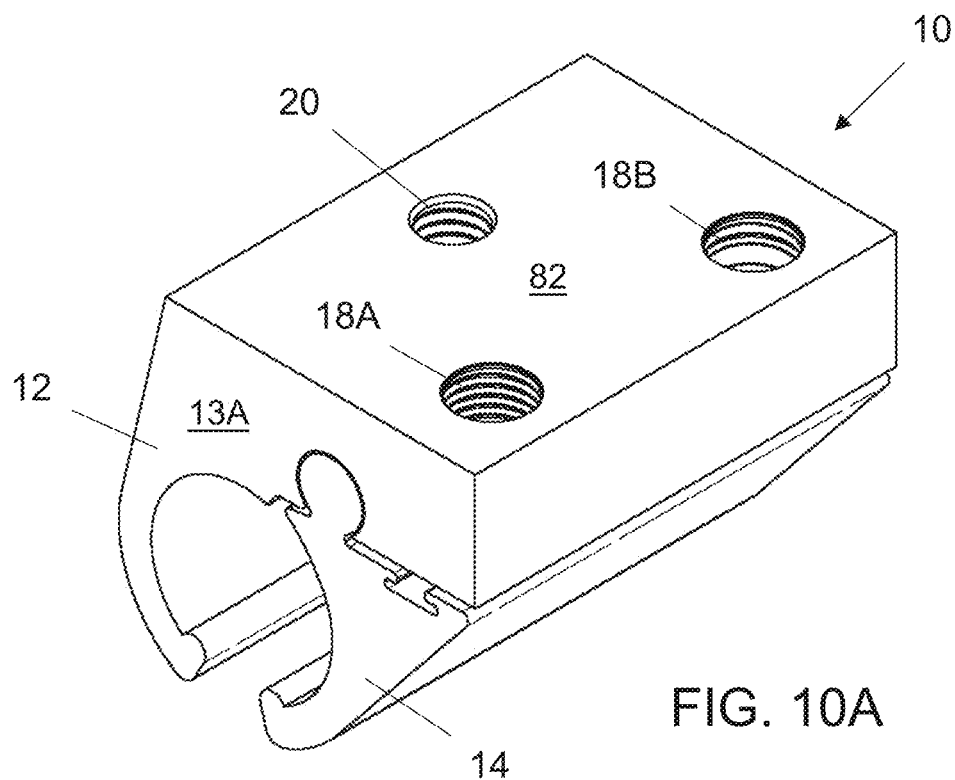
FIG. 10A is a perspective view of a further clamp according to embodiments of the present disclosure.
Figure 10B:
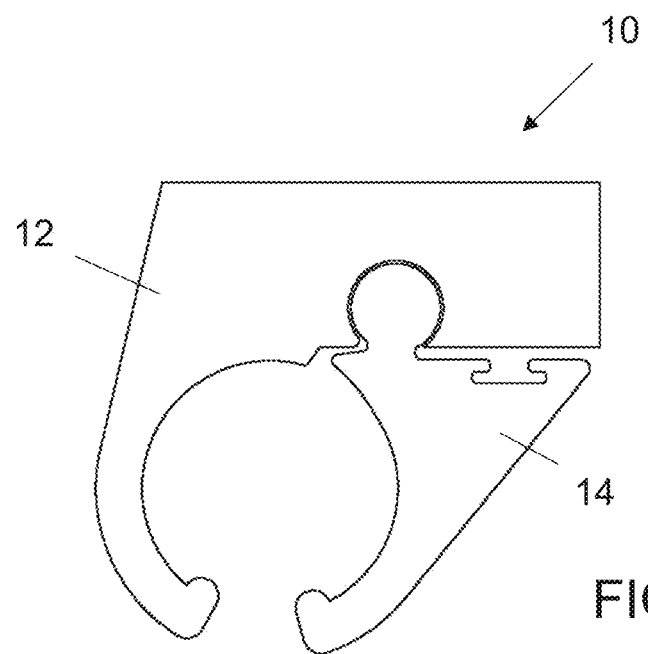
FIG. 10B is an end elevation view of the clamp in FIG. 10A according to embodiments of the present disclosure.

Referring to FIGS. 10A and 10B, a perspective view and an end elevation view of a further embodiment of a clamp 10 are provided, respectively. The clamp 10 can have any number of bar apertures 18A, 18B, whether two bar apertures 18A, 18B as shown in FIG. 10A, or more. The bar apertures 18A, 18B may be threaded as shown in FIG. 10A, or not threaded. In some embodiments, each of the bar apertures 18A, 18B may be aligned with an optional deformable portion of the attached insert 14, while in other embodiments, the deformable portion may be positioned underneath fewer than all of the bar apertures 18A, 18B.

The connection aperture 20 may have internal threads. Additionally, although only one connection aperture 20 is shown, the clamp 10 may include two or more connection apertures 20.

Figure 11D:
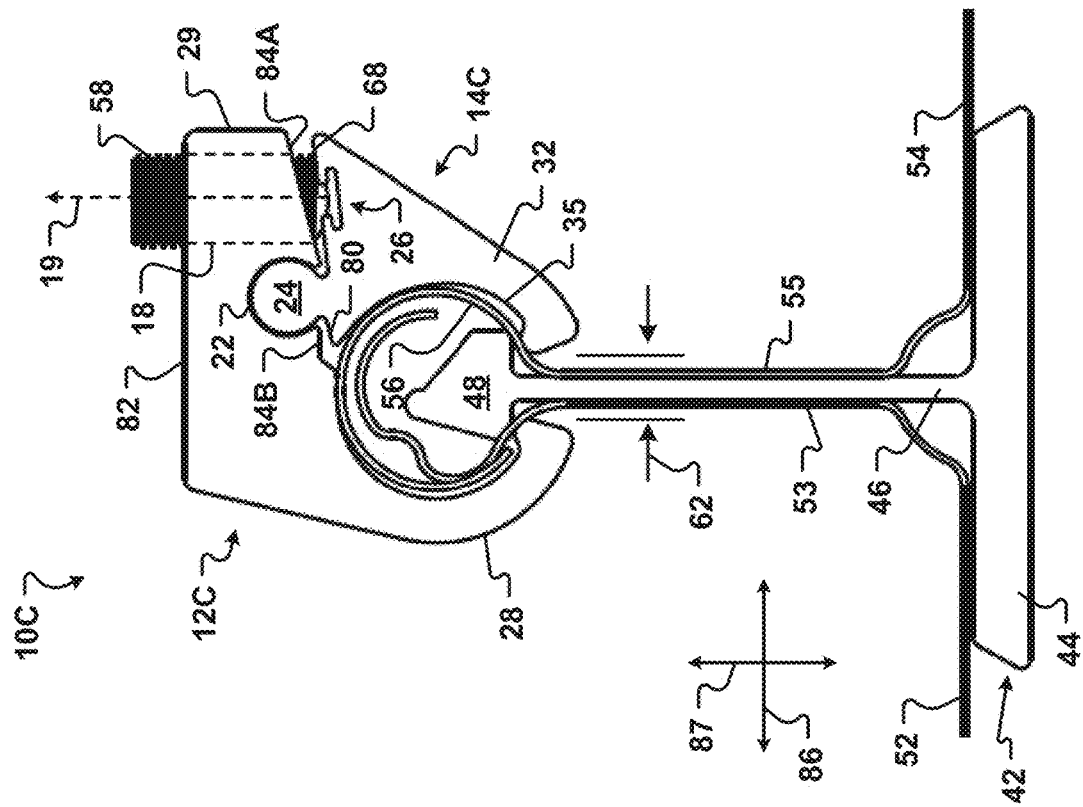
FIG. 11D is another end elevation view of the clamp of FIG. 11C engaged to the roof joint and with the insert in the second position relative to the body.

Referring now to FIGS. 11A-11D, still another embodiment of a clamp 10C of the present disclosure is generally illustrated. The clamp 10C includes many of the same, or similar features as clamps of other embodiments described herein. Notably, the clamp 10C includes a body 12C with a first portion of the lower surface 84A that is not parallel to an upper surface 82. More specifically, as generally illustrated in FIG. 11B, the lower surface 84A is angled upwardly toward the upper surface as the lower surface extends away from the recess 22 toward a side 29 of the body 12C. The lower surface 84A is optionally oriented at an angle of between about 10° and about 20° relative to the upper surface 82 (and the horizontal axis 86), or about 16°. Other angles of the lower surface 84A with respect to the upper surface are contemplated. Optionally, a second portion of the lower surface 84B that is positioned opposite to the insert stop portion 80 is oriented approximately parallel to the upper surface 82. However, in other embodiments, the second portion of the lower surface 84B is angled relative to the upper surface.

Figure 11C:
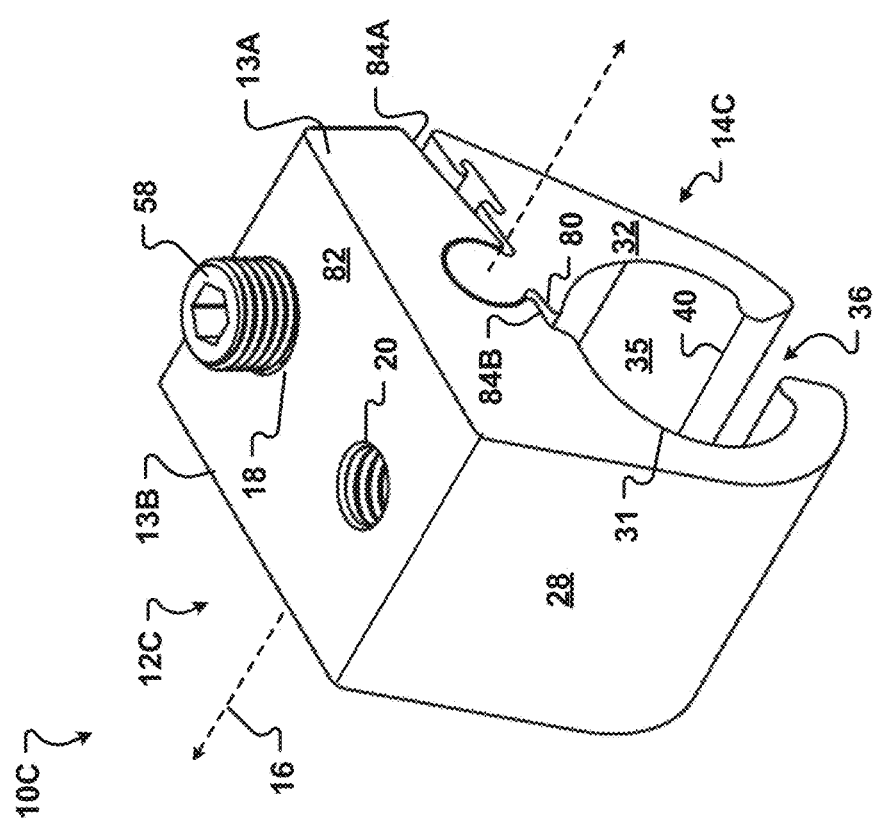
FIG. 11C is another perspective view of the clamp of FIG. 11A with the insert in a second position relative to the body.

In one embodiment, the second portion 84B is about parallel to the first portion 84A. The angled lower surface 84A beneficially provides more space for the insert 14C to rotate counterclockwise around the axis of rotation 16 and away from the first arm 28. Accordingly, the first distance 60 when the insert is in the first position (as illustrated in FIGS. 11C-11D) may be greater than the first distance 60 of the clamp 10 shown in FIG. 1B. In one embodiment, the first distance 60 of clamp 10C may be greater than the width W1 of a roof joint 56. In another embodiment, the first distance 60 is at least about 0.30 inches. Optionally, the first distance 60 is less than about 0.90 inches. In one embodiment, the first distance is between about 0.2 inches and about 1.0 inch, or about 0.813 inches.

Optionally, the stop portion 80 of the insert is angled relative to the insert upper surface 68. In one embodiment, generally illustrated in FIG. 11B, the stop portion 80 is oriented at an angle of between about 3° and about 10° relative to the upper surface 68.

As shown in FIG. 11B, the protrusion 24 has a diameter or width 64. In one embodiment, the width 64 is at least about 0.25 inches. In another embodiment, the width is between about 0.2 inches and about 0.4 inches. The protrusion width 64 of the inset 14C optionally is greater than the protrusion width of the insert described in conjunction with FIG. 6. As will be appreciated by one of skill in the art, increasing the protrusion width 64 provides greater strength and decreases the chance that the clamp will fail due to fracture of the protrusion.

Referring now to FIGS. 12A-12I, still another embodiment of a clamp 10D of the present disclosure is generally illustrated. The clamp 10D includes many of the same, or similar, features as clamps of other embodiments described herein. More specifically, the clamp 10D has a body 12D with a first arm 28, and a recess 22 to receive a protrusion 24 of an insert 14D such that the insert can rotate around an axis 16 from a first position to a second position to secure the clamp 10D to a roof joint 56.

Notably, the clamp 10D includes a leg 27 extending downwardly from the body 12D. A bar aperture 18D extends through the leg 27. In one embodiment, the bar aperture 18D has a diameter of about 3/8 inch. Optionally, the bar aperture 18D is threaded. A bar component 58, such as set screw, advanced through the bar aperture 18D applies a force to the insert 14D to rotate the insert about axis 16 in a manner similar to the clamps 10A-10C described herein.

The leg 27 is positioned in an opposing relationship to the first arm 28. More specifically, the leg 27 extends downwardly from a second side 29B of the body. The leg 27 is optionally oriented approximately parallel to the vertical axis 87. In one embodiment, the leg 27 forms at least a portion of the second side 29B of the body. Optionally, an exterior surface of the second side 29B is approximately parallel to an exterior surface of the first side 29A of the body.

An inner surface 37 of the leg 27 faces the first inner surface 31 of the first arm 28. In one configuration, the inner surface 37 is generally planar. Additionally, the inner surface 37 is optionally oriented approximately parallel to the vertical axis 87.

In one configuration, the leg 27 does not extend downwardly in the vertical dimension 87 as far as the first arm 28. Accordingly, an end 41 of the leg 27 is closer to the upper surface 82 of the body 12D than the distal end 38 of the first arm 28. In one embodiment, as generally illustrated in FIG. 12G, the leg end 41 is spaced a distance 90 of between about 0.9 inches and 1.4 inches, or about 1.16 inches from the upper surface 82. In contrast, the distal end 38 is a distance 91 of between about 1.1 inches and about 1.7 inches, or about 1.43 inches from the upper surface.

The bar aperture 18D extends along an axis 19D through the leg 27 through an exterior surface of the body second side 29B and through the leg inner surface 37. The axis 19D is oriented to engage an outer surface 67 of the insert 14D. The axis 19D is optionally approximately parallel to the horizontal axis 86. In one embodiment, the axis 19D is approximately perpendicular to the second side 29B. Additionally, or alternatively, the axis 19D may be approximately parallel to the upper surface 82. However, in other embodiments, the axis 19D is oriented at an oblique angle to the horizontal axis and/or to the upper surface 82.

Unlike the bar apertures 18 of the clamps 10A-10C of other embodiments of the present disclosure, the axis 19D is oriented at an angle that will intersect the receiving space 36 of the clamp. However, a bar component 58 advanced through the bar aperture 18 will contact the insert 14D and will not contact a roofjoint 56 positioned within the receiving space 36. This is beneficial because the bar component will not damage the roof joint or scratch a finish or coating of the roof joint. Moreover, the bar component will not bend or deform vertical sidewalls 53, 55 of the roof joint (shown in FIG. 12I) or squeeze a body of a roof support within the roof joint.

The insert 14D generally has the same size and geometry as other inserts 14 of the present disclosure. In one embodiment, as generally shown in FIG. 12B, the insert 14D includes an optional deformable portion 26D positioned to be engaged by a bar component 58 advanced through the bar aperture 18D. Accordingly, when present, the deformable portion 26D is formed in the outer surface 67 of the insert rather than in the insert upper surface 68. When the protrusion 24 of the insert 14D is positioned within the recess 22 of the clamp body, the deformable portion 26D can be aligned with the bar aperture 18D such that a bar component advanced through the bar aperture will contact at least a portion of the deformable portion. The deformable portion 26D generally includes a channel with edges and recesses such as illustrated in FIG. 6 of insert 14.

Similar to the body of clamp 10C, the clamp body 12D can optionally include a first portion of the lower surface 84A that is not parallel to an upper surface 82. More specifically, as generally illustrated in FIG. 12G, the lower surface first portion 84A is oriented at a predetermined angle 85A relative to the upper surface. In one embodiment, the first portion 84A is oriented at an oblique angle relative to the upper surface 82. More specifically, the first portion 84A may be angled upwardly toward the upper surface as the lower surface extends away from the recess 22 toward the second side 29B of the body 12D. The first portion 84A is optionally oriented at an angle 85A of between about 10° and about 35° relative to the upper surface 82 (and the horizontal axis 86), or about 20° or 21°. Other angles of the first portion 84A with respect to the upper surface are contemplated.

The first portion 84A of the lower surface extends between the recess 22 and the inner surface 37 of the leg 27. In one embodiment, the first portion 84A intersects the leg inner surface 37 at a rounded portion 51 with a predetermined radius of curvature. Optionally, the radius of curvature of the rounded portion 51 is about 0.10 inch.

The angled lower surface 84A beneficially provides more space for the insert 14D to rotate counterclockwise around the axis of rotation 16 (when viewed from the perspective of FIG. 12B) and away from the first arm 28. Accordingly, a first distance 60 between the first distal end 38 of the first arm and the second distal end 40 of the second arm when the insert 14D is in the "open" or first position may be greater than the first distance 60 of the clamp 10 shown in FIG. 1B. In one embodiment, the first distance 60 of clamp 10D is greater than the width W1 of a roof joint 56. In another embodiment, the first distance 60 is at least about 0.30 inches. In one embodiment, the first distance is between about 0.2 inches and about 1.0 inch. Optionally, the first distance 60 is about 0.813 inches.

Figure 12F:
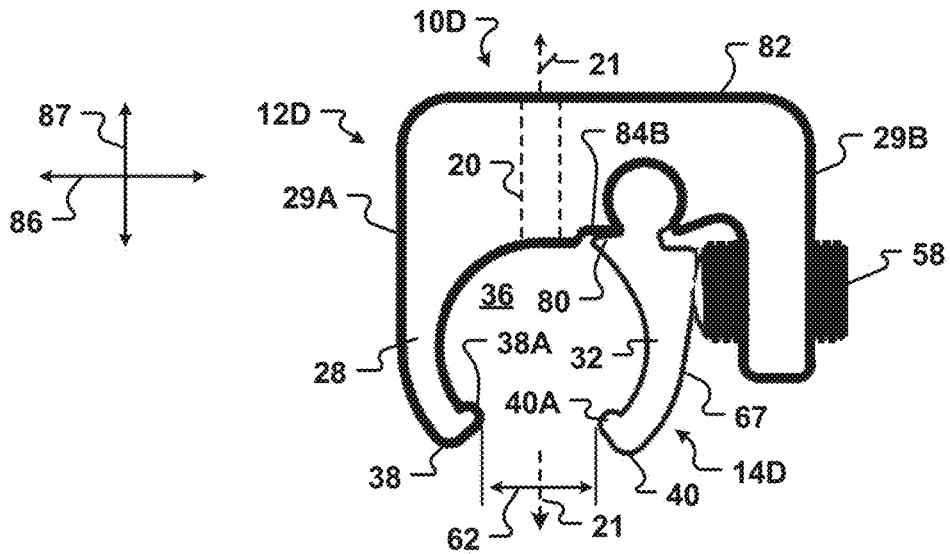
FIG. 12F is another end elevation view of the clamp of FIG. 12A in a closed or second position.
Figure 12G:
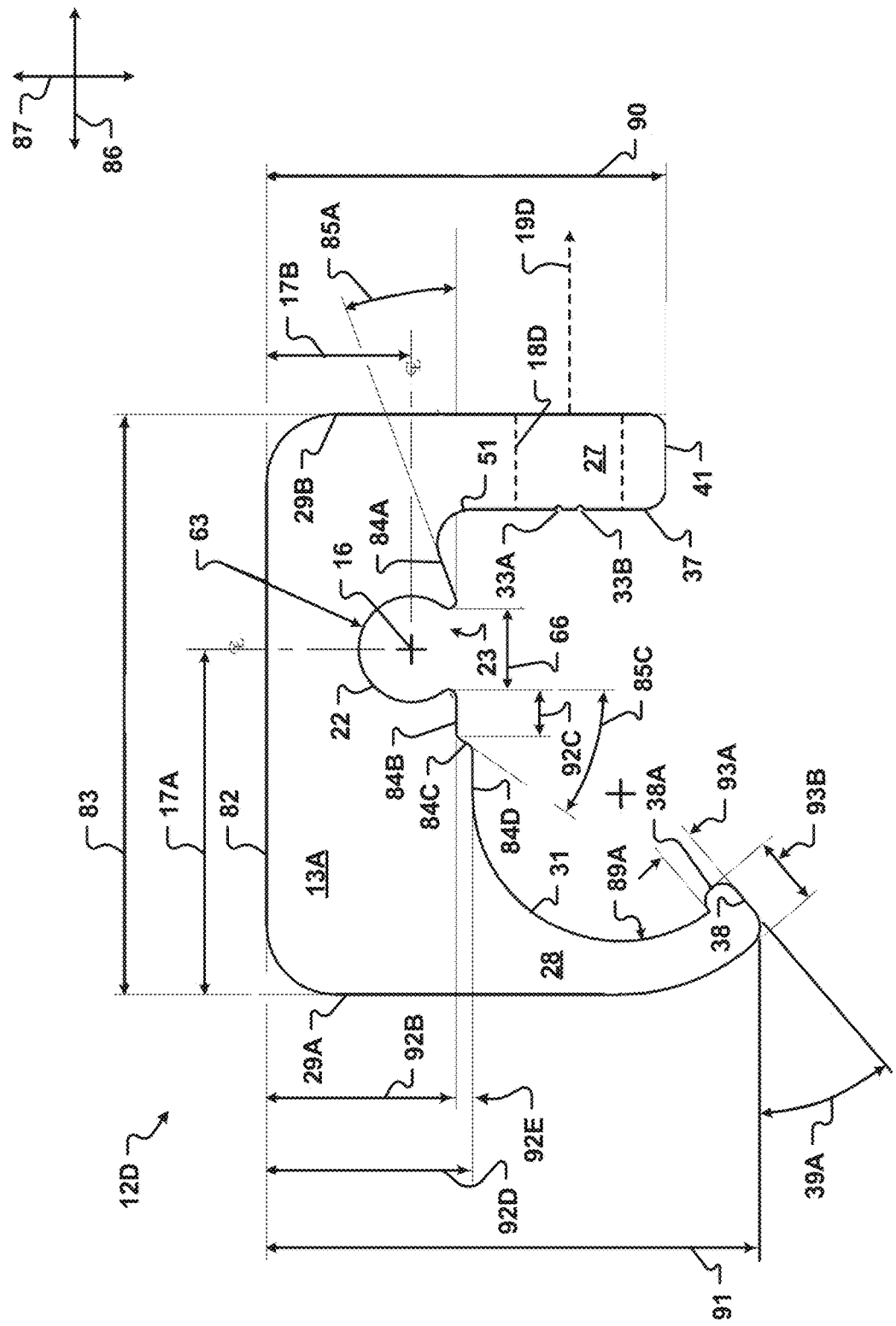
FIG. 12G is a front elevation view of the body of the clamp of FIG. 12A.
Figure 12H:
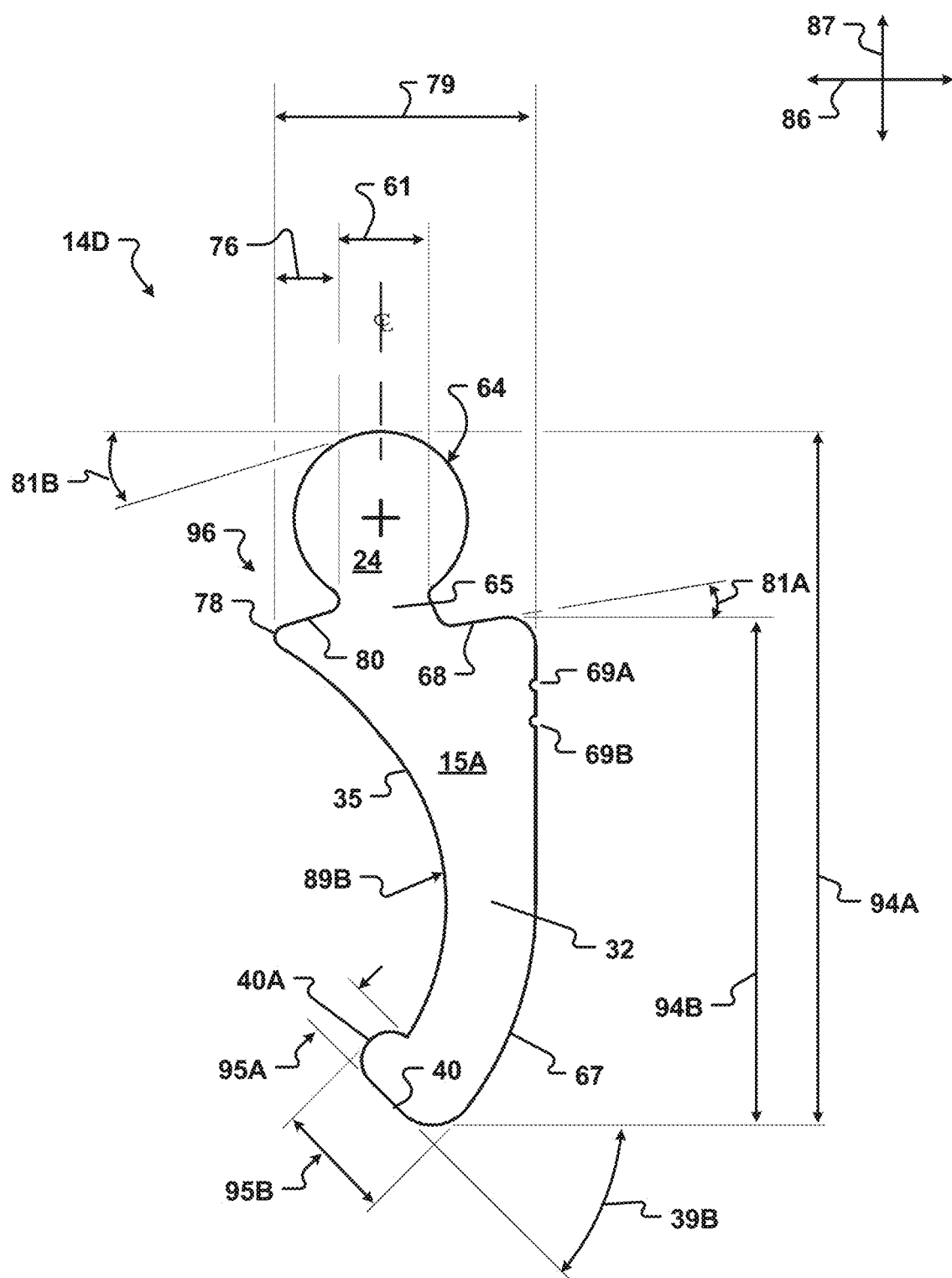
FIG. 12H is a front elevation view of the insert of the clamp of FIG. 12A.
Figure 12I:
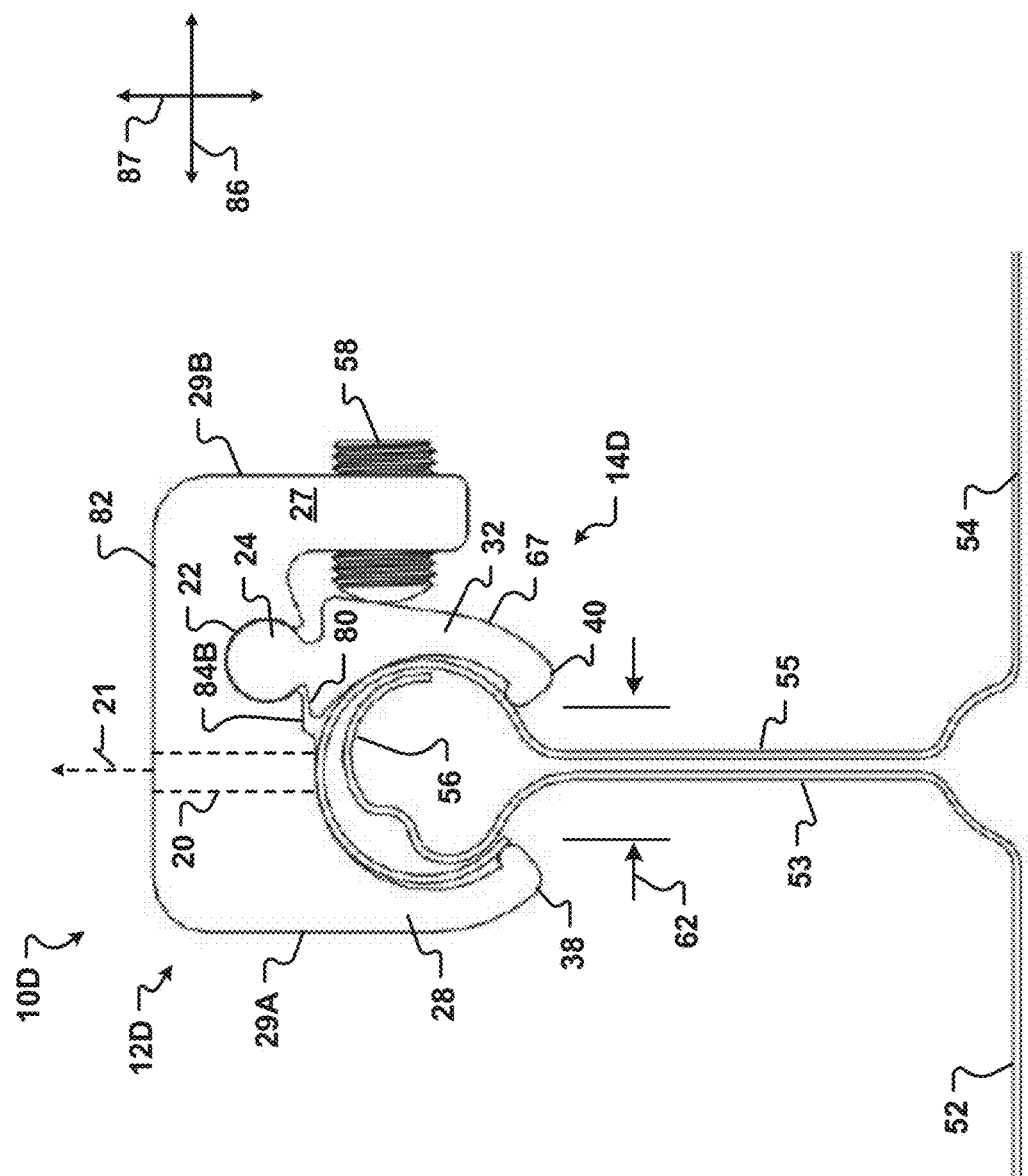
FIG. 12I is a front elevation view of the clamp of FIG. 11C engaged to the roof joint and with the insert in the second position.

Referring now to FIG. 12F, as the bar component 58 is advanced through the bar aperture 18D, the bar component will contact the outer surface 67 of the insert 14D which rotates to the second position. In the second position, a second distance 62 between the first distal end 38 of the first arm 28 and the second distal end 40 of the second arm 32 is less than the first distance 60 (illustrated in FIG. 12B). In on embodiment, second distance 62 is between about 0.1 inches and 0.5 inches, or about 0.31 inches.

As generally illustrated in FIG. 12F, rotation of the insert 14D is limited or stopped by contact of the stop portion 80 of the insert with a second portion 84B of the lower surface of the clamp body 12D. The interaction of the stop portion 80 and the body second portion 84B are beneficially configured to limit rotation of the insert such that the second distance 62 is no less than a predetermined amount. In this manner, damage to a roofjoint 56, such as a bulb seam joint, is prevented.

Referring to FIG. 12C, an axis 21 of the connection aperture 20 is spaced a predetermined distance 25 from the body first side 29A. In one embodiment, the distance 25 is between about 0.50 inches and about 0.70 inches, or about 0.59 inches. In this manner, when the insert is in the second position, the aperture axis 21 is approximately centered between the first and second ends 38, 40 as generally illustrated in FIG. 12F. This is beneficial because other objects, such as a brace, a snow guard, a solar panel, or other structures connected to the clamp 10D by an attachment fastener in the connection aperture 20 can be centered over a roof joint 56 and its vertical portions 53, 55.

In one embodiment, the connection aperture 20 is threaded. Optionally, the connection aperture 20 extends through the body from the upper surface 82 to the receiving space 36. The aperture axis 21 is optionally oriented substantially perpendicular to the upper surface.

Referring again to FIG. 12G, the second portion 84B of the lower surface is positioned on an opposite side of the recess 22 from the first portion 84A. In one embodiment, the bottom second portion 84B is oriented approximately parallel to the upper surface 82. However, in other embodiments, the second portion of the lower surface 84B is angled relative to the upper surface. In one embodiment, the second portion 84B is about parallel to the first portion 84A. Alternatively, the second portion 84B is angled upwardly toward an intersection of the first side surface 29A with the top surface 82. In this manner, the insert 14D can rotate closer to the first arm 28 before the insert stop portion 80 will contact the second portion 84B of the lower surface.

The second portion 84B of the lower surface is a distance 92B of between about 0.45 inches and about 0.65 inches, or about 0.55 inches from the upper surface 82. In one embodiment, the second portion 84B has a width 92C of between about 0.10 inches and about 0.20 inches, or about 0.14 inches.

The second portion 84B of the lower surface is optionally recessed toward the upper surface 82. For example, in one embodiment, a third portion 84C of the lower surface extends upwardly from a fourth portion 84D of the lower surface 84D to the second portion 84B. In this manner, the second portion 84B is spaced away from the receiving space 36 to make a space for the stop portion 80 of the insert 14D. In this manner, when the insert 14D is in the second position, the stop portion 80 fits into the recess formed to create a substantially circular receiving space 36 between the first and second arms 28, 32 as generally illustrated in FIG. 12F.

In one embodiment, the third portion 84C is oriented at an angle 85C relative to a vertical axis 87. The angle 85C is optionally between about 30° and about 39°, or about 34.8° from the vertical axis. The third portion 84C is spaced from the recess 22 by the width 92C of the second portion 84B.

In one embodiment, the fourth portion 84D of the lower surface is approximately parallel to the second portion 84B and to the upper surface 82. The fourth portion 84D extends in the horizontal dimension 86 away from the recess 22 and the third portion 84C to an intersection with the first inner surface 31 of the first arm 28.

The fourth portion 84D of the lower surface is a distance 92D of between about 0.50 inches and about 0.70 inches, or about 0.60 inches from the upper surface 82. Accordingly, in one embodiment, the fourth portion 84D is a distance 92E of between about 0.04 inches and about 0.06 inches below the second portion 84B in the vertical dimension 87.

The recess 22 has a diameter 63 of between about 0.30 inches and about 0.32 inches, or about 0.31 inches. In one embodiment, a lower opening or throat 23 of the recess 22 has a width 66 of between about 0.22 inches and about 0.26 inches, or about 0.24 inches.

The axis of rotation 16 of the recess 22 is positioned a distance 17A of between about 0.90 inch and about 1.10 inches, or about 1.0 inch from the first side 29A of the body 12D. The axis 16 is also a distance 17B of between about 0.30 inches and 0.50 inches, or about 0.40 inches from the upper surface 82. In one embodiment, the body 12D has a width 83 in the horizontal dimension 86 of between about 1.5 inches and about 1.9 inches, or about 1.7 inches.

The inner surface 31 of the first arm 28 has a predetermined radius of curvature 89A. Optionally, the radius of curvature 89A is approximately equal to the radius of a bulb of a roof joint 56 the clamp 10D is configured to engage. In one embodiment the radius of curvature 89A is between about 0.41 inches and about 0.45 inches, or about 0.43 inches.

In one embodiment, a finger 38A projects inwardly from the first inner surface 31 of the first arm. The finger 38A has a blunt or rounded exterior surface to limit or prevent damage to panels of a roof joint 56. In one embodiment, the finger 38A a radius of curvature of about 0.05 inches. In one embodiment, the finger 38A has a width 93A of about 0.1 inches.

Optionally, an end 38 of the first arm 28 is oriented at an angle 39A of between about 38° and about 42°, or about 40° to the horizontal axis 86. The end 38 has a width 93B of between about 0.15 inches and about 0.25 inches, or about 0.21 inches.

Optionally, one or more grooves 33 are formed in the inner surface 37 of the leg 27.

Referring now to FIG. 12H, an expanded view of an insert 14D is provided. The insert 14D generally includes the protrusion 24 connected to the second arm 32 by a neck 65. An upper surface 68 extends from a first side of the neck 65 to an outer surface 67 of the insert. A stop portion 80 extends from a second side of the neck to the second inner surface 35 of the insert. The upper surface 68 and the stop portion 80 collectively define a shoulder 96 of the insert 14D.

The neck 65 has a width 61 that is less than the diameter 64 of the protrusion and less than a width 79 of the shoulder 96. In one embodiment, the neck width 61 is between about 0.13 inches and about 0.18 inches, or about 0.155 inches. In contrast, the shoulder width 79 is between about 0.35 inches and about 0.55 inches, or about 0.45 inches.

Optionally, the upper surface 68 of the insert is oriented at angle 81A that is not parallel to the horizontal axis. In one embodiment, the angle 81A is between about 7° and about 11°, or about 9° relative to the horizontal axis 86.

The stop portion 80 of the insert 14D is angled relative to the horizontal axis 86. In one embodiment, generally illustrated in FIG. 12H, the stop portion 80 is oriented at an angle 81B of between about 3° and about 25°, or about 17° relative to the horizontal axis 86.

The protrusion 24 has a diameter or width 64. In one embodiment, the diameter 64 is at least about 0.25 inches. In another embodiment, the diameter 64 is between about 0.25 inches and about 0.35 inches, or about 0.30 inches. The protrusion diameter 64 of the inset 14D optionally is greater than the protrusion diameter of the insert described in conjunction with FIG. 6. As will be appreciated by one of skill in the art, increasing the protrusion width 64 provides greater strength and decreases the chance that the clamp will fail due to fracture of the protrusion.

The second inner surface 35 of the second arm 32 has a predetermined radius of curvature 89B. The radius of curvature may be the same as, or different from, the radius of curvature 89A of the first arm 28. In one embodiment the radius of curvature 89B is between about 0.41 inches and about 0.45 inches, or about 0.43 inches.

In one embodiment, a finger 40A projects inwardly from the second inner surface 35. The finger 40A has a shape adapted to limit or prevent damage to panels of a roof joint 56. In one embodiment, the finger 40A has a rounded or convex shape with a radius of curvature of about 0.05 inches. In one embodiment, the finger 40A has a width 95A of about 0.1 inches.

Optionally, an end 40 of the second arm 32 is oriented at an angle 39B of between about 43° and about 47°, or about 45° to the horizontal axis 86. In one embodiment, the end 40 of the second arm 32 is a distance 94A of between about 1.0 inch and about 1.4 inches, or about 1.2 inches from a tangent point at an upper end of the protrusion 24. Additionally, the end 40 is a distance 94B from a point tangent to the upper surface 68. Optionally, the distance 94B is between about 0.80 inches and 1.0 inch, or about 0.90 inches.

The end 40 has a predetermined width 95B. In one embodiment, the width 95B is between about 0.15 inches and about 0.25 inches, or about 0.21 inches.

The clamps 10 of all embodiments of the present disclosure may be formed from materials such as various metals, ceramics or plastics based upon, for instance, the particular application. In this regard, the illustrated clamp may be formed from an aluminum which provides sufficient load-bearing capability and is also non-corrodible, thus enhancing durability and appearance. As can be appreciated, the aluminum can be anodized to further enhance the appearance of the roof assembly. Other metals for forming the clamp 10 are stainless steel, zinc, copper or brass alloys. The clamp 10 may also be formed from a combination of any of the foregoing materials and/or of or including other materials.

The clamp may also be formed by a variety and/or a combination of methods, one of which is extrusion. The apertures 18 and 20 may be, for example, drilled and then tapped. The body of the clamp 10 generally has a cross-section defined by a slot which receives the roof joint therein. The edges of the body may be chamfered or rounded if desired to reduce material requirements and enhance the appearance of the roof assembly.

The body 12 and the insert 14 of the clamp 10 can be formed separately. In one embodiment, the clamp body 12 is of a one-piece construction. Similarly, the insert 14 can be formed from one piece of material. Accordingly, the clamp body 12 and/or the insert 14 can be characterized as lacking joints of any kind. Specifically, in one embodiment, the clamp body 12 and/or the insert 14 are configured so as to have no separable parts.

Figure 15:
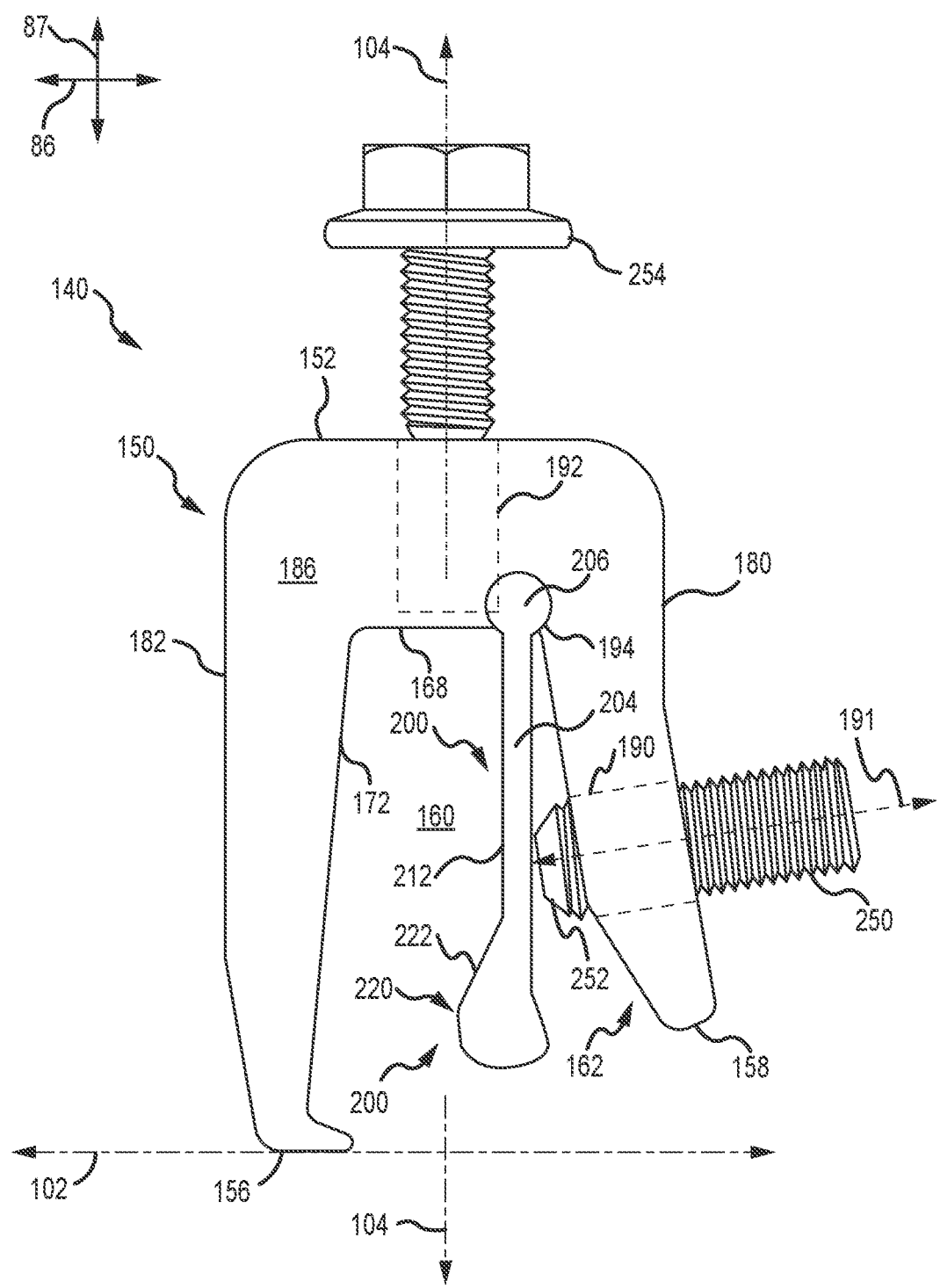
FIG. 15 is an end elevation view showing the second end of the clamp of FIGS. 13A and 13B with the insert engaged with the clamp body.
Figure 16:
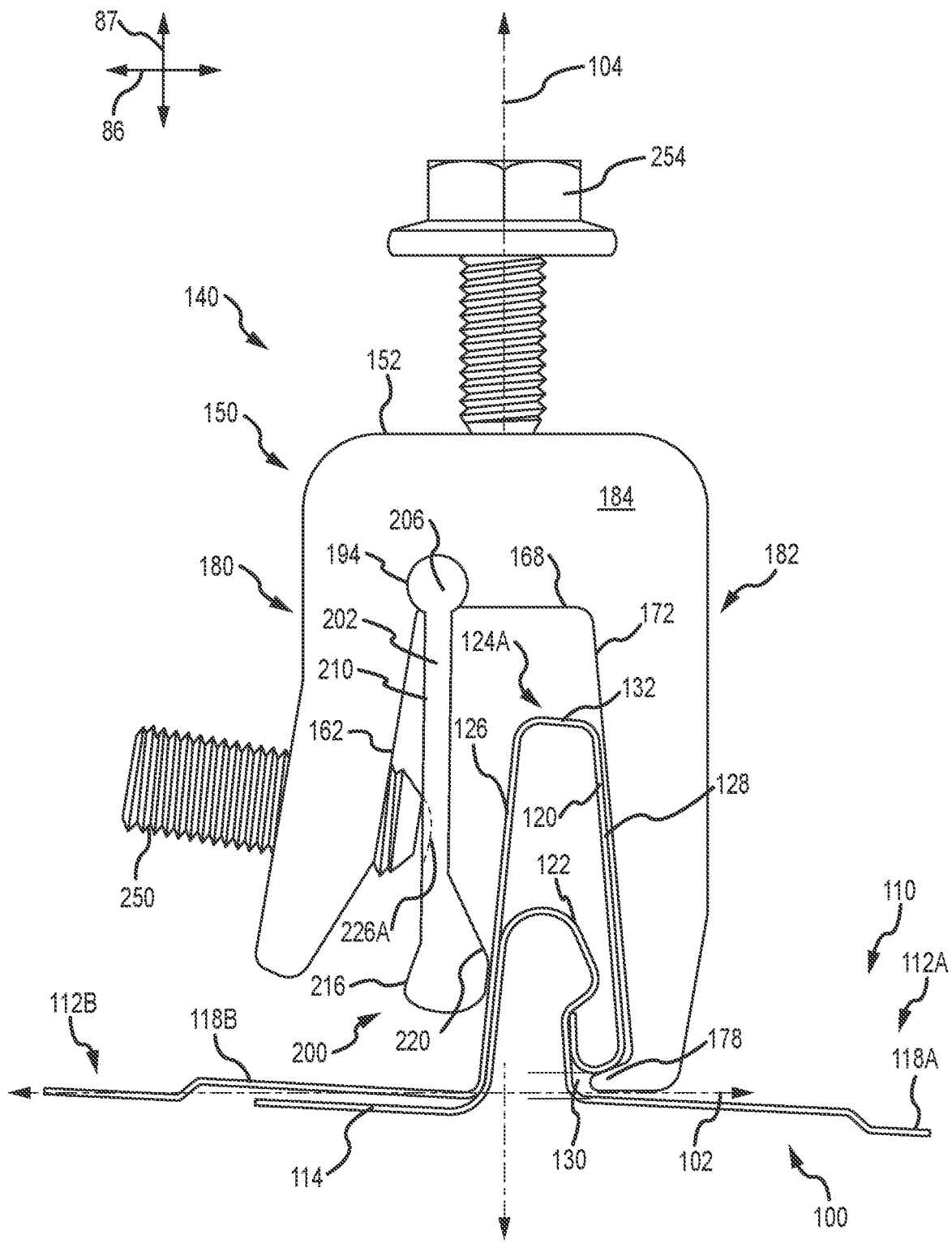
FIG. 16 is an end elevation view showing the first end of the clamp of FIG. 15 engaged to a first rib joint.

Referring now to FIGS. 13-17, a mounting assembly or clamp 140 according to another aspect of the present disclosure is generally illustrated. The clamp 140 includes an insert 200 that is pivotably connected to a body 150. The clamp 140 is illustrated in an upright position for installation on a panel assembly 110 of a building surface 100 (as generally illustrated in FIGS. 16-17). The upright position of the clamp and its components is described herein in relation to a first reference plane 102 and a second reference plane 104. The first reference plane is defined by a horizontal axis 86 and a longitudinal axis 88. This longitudinal axis 88 is illustrated in FIG. 20 and is perpendicular to a plane defined by the horizontal axis 86 and a vertical axis 87. The second reference plane 104 is perpendicular to the first reference plane 102 and is defined by the vertical axis 87 and the longitudinal axis 88.

The body 150 of the clamp is of a one-piece or integral construction in one embodiment. For example, the body can be formed as an extrusion from a single piece of an appropriate material, such as a metal or a metal alloy.

Figure 13A:
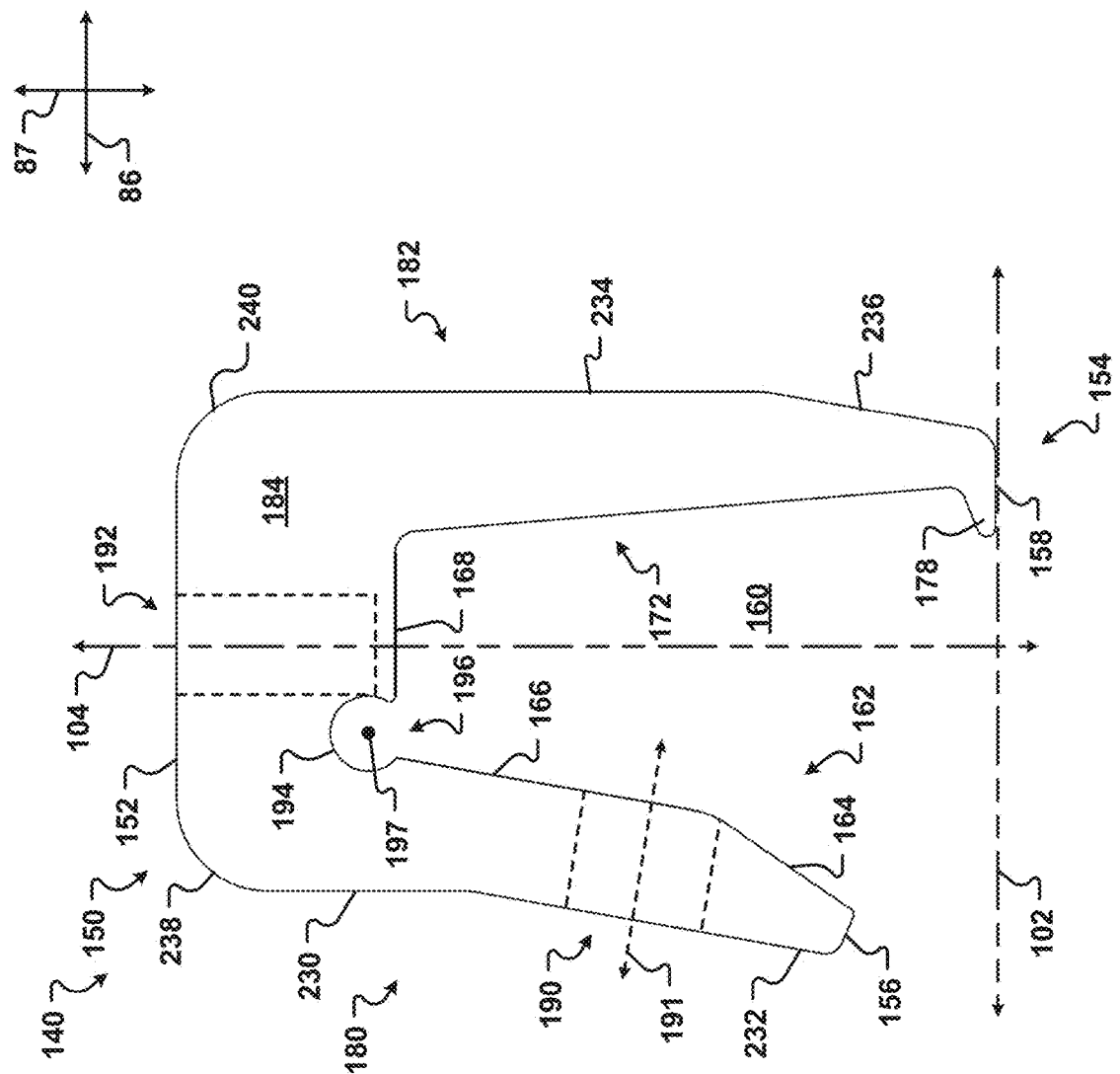
FIG. 13A is an end elevation view of a clamp body of a clamp of another embodiment of the present disclosure.
Figure 13B:
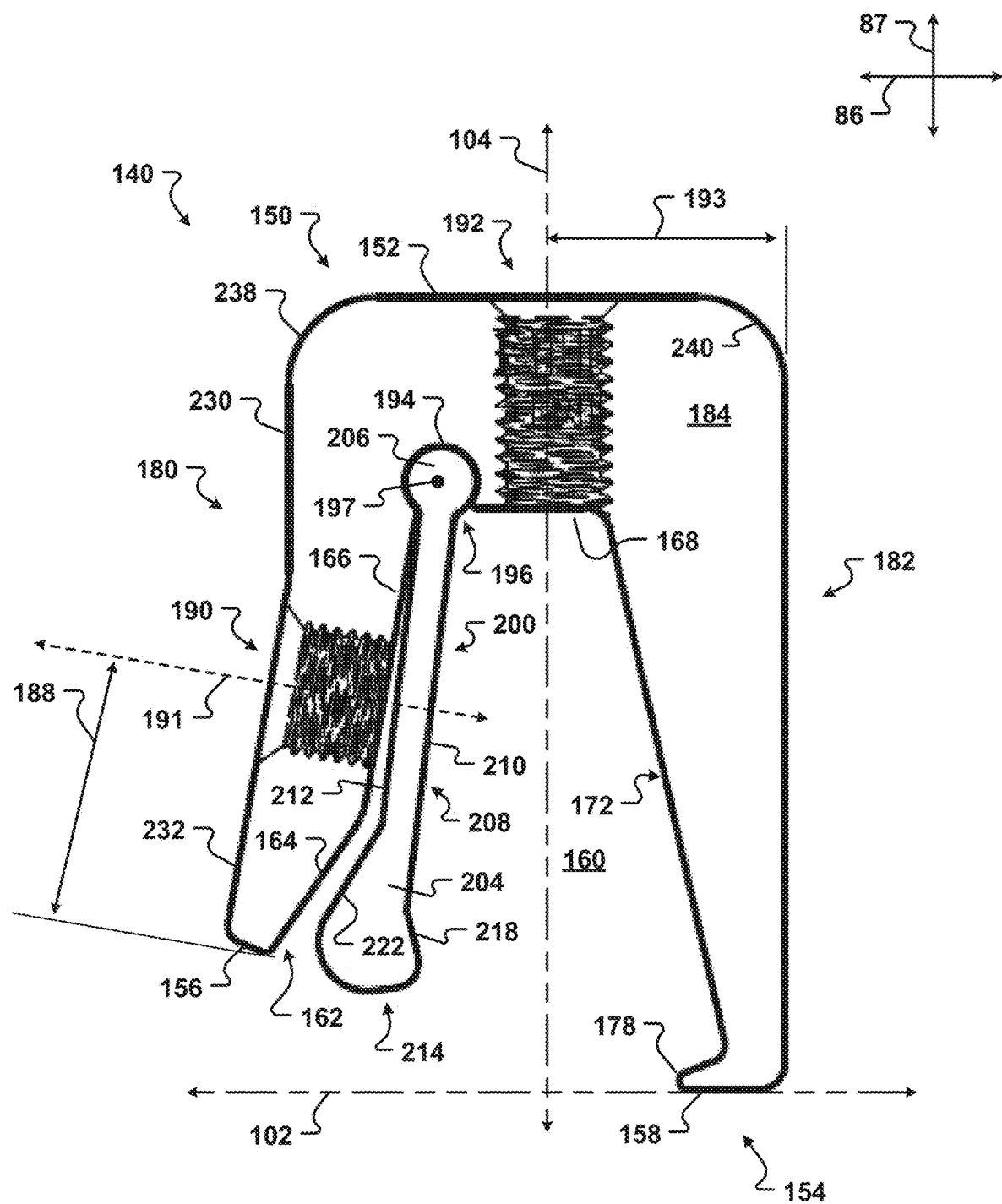
FIG. 13B is an end elevation view of the clamp including the clamp body of FIG. 13A with an insert according to one embodiment of the present disclosure.
Figure 13D:
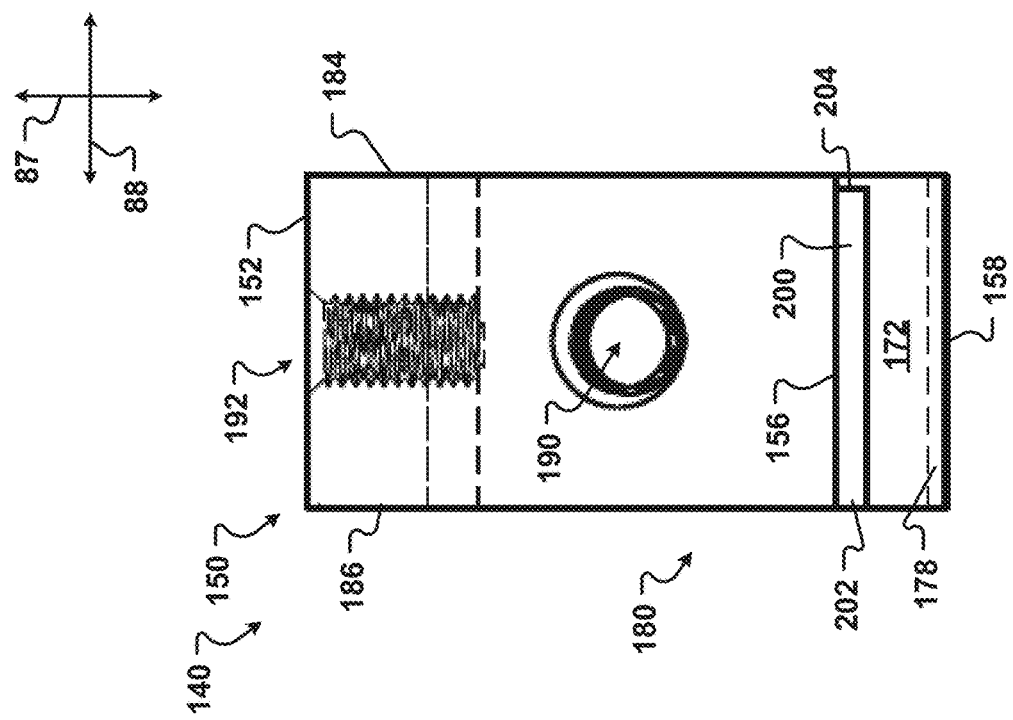
FIG. 13D is a first side elevation view of the clamp of FIG. 13B.
Figure 13C:
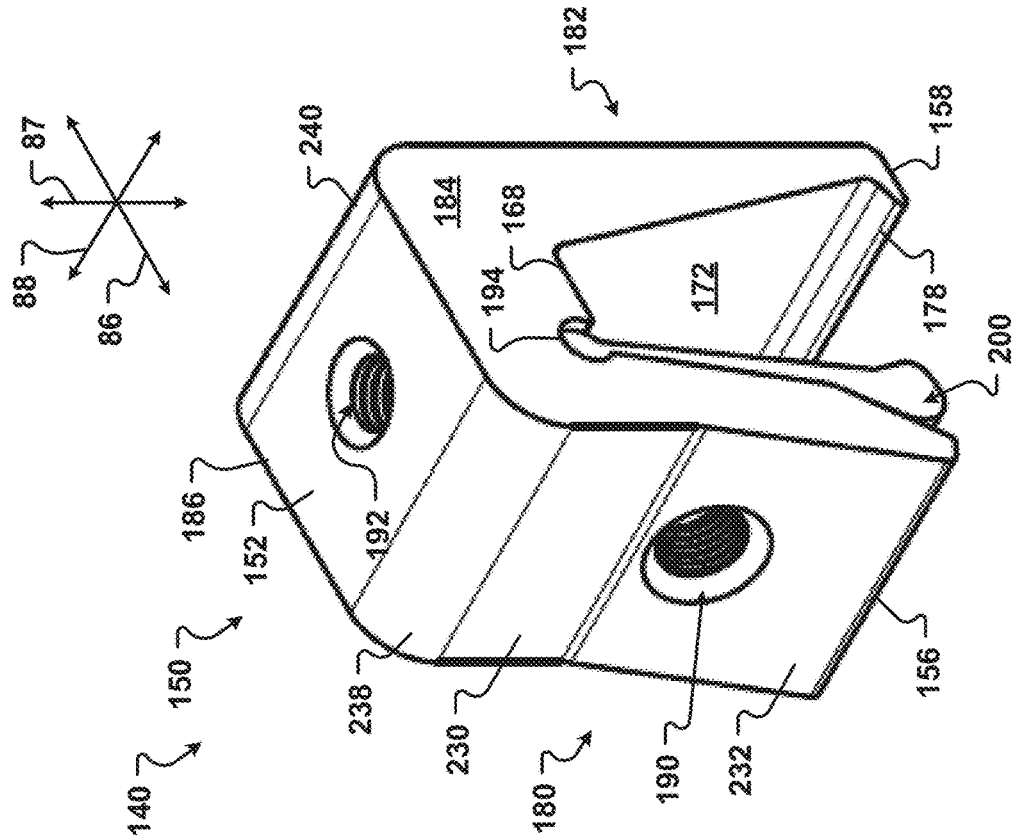
FIG. 13C is a perspective view of the clamp of FIG. 13B.
Figure 13E:
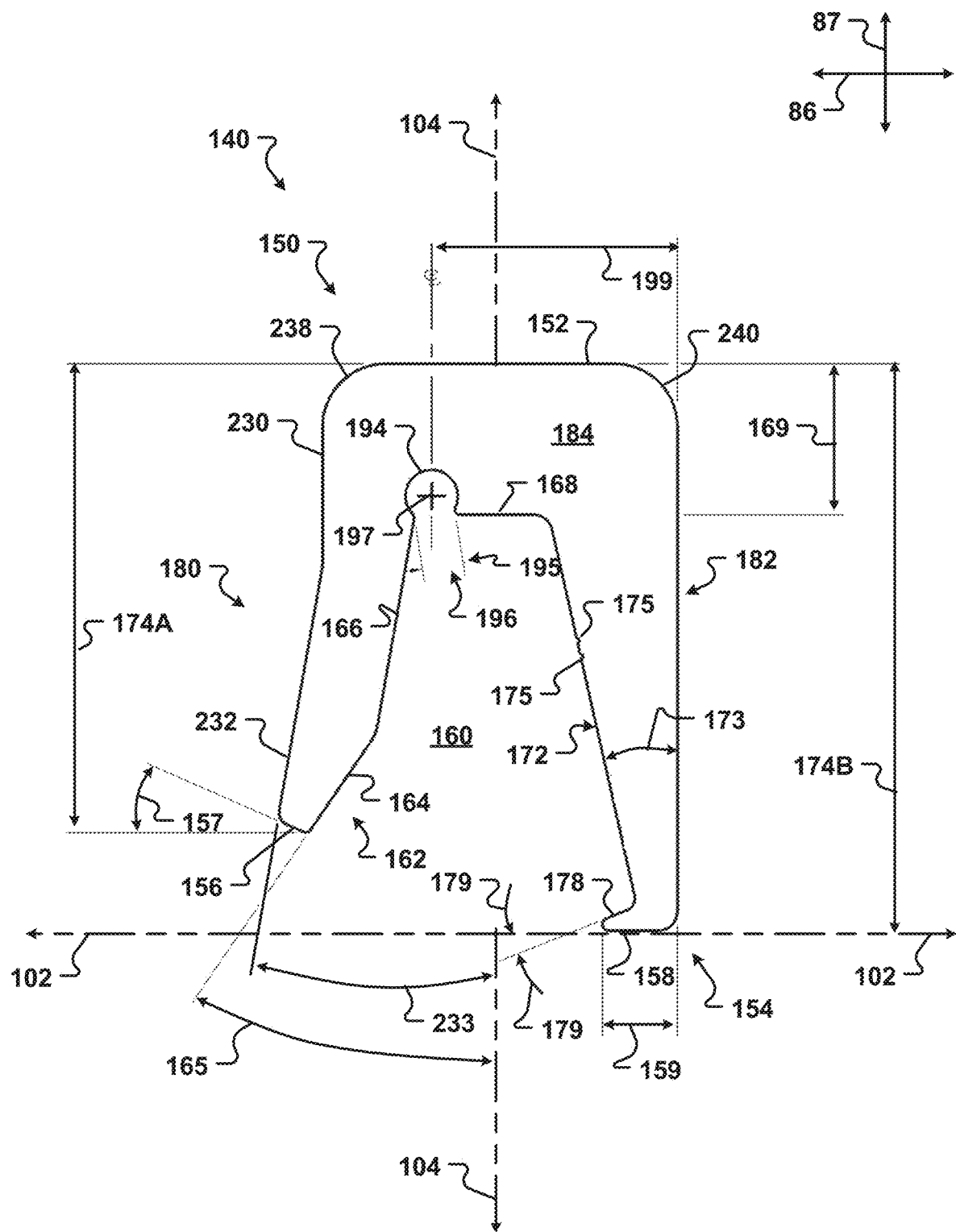
FIG. 13E is an end elevation view of the clamp of FIG. 13B.

Referring to FIG. 13E, the body 150 includes a top 152 and a bottom 154 that are oppositely disposed and spaced from one another in the vertical dimension 87. A first side surface 180 of the body is positioned opposite to a second side surface 182. A first end 184 is spaced from an opposite second end 186 (shown in FIG. 13D) in the longitudinal dimension 88 to define a length of the body 150.

The first side surface 180 generally includes a first upper part 230 and a first lower part 232. The first upper part is positioned between the top 152 and the first lower part. In one embodiment, the first upper part 230 is oriented approximately parallel to the second reference plane 104. The first lower part 232 extends downwardly from first upper part 230. In one configuration, the first lower part 232 is angled outwardly away from the second reference plane 104. Optionally, an angle 233 between the first lower part 232 and the second reference plane 104 is between about 5° and about 15°, or about 10°.

The second side surface 182 generally includes a second upper part 234 and an optional second lower part 236 (generally illustrated in FIG. 13A). The second upper part is positioned between the top 152 and the second lower part (when present). Optionally, the second upper part 234 is parallel to one or more of the second reference plane 104 and the first upper part 230.

The optional second lower part extends downwardly from second upper part. In one configuration, the second lower part 236 is angled inwardly toward the second reference plane 104. Optionally, the second lower part 236 is about parallel to the first lower part 232. In one embodiment, an angle between the second lower part 236 and the second reference plane 104 is between about 5° and about 15°, or about 10°. The second lower part 236 is configured to provide relief for a nail strip panel 112 of the building section 100 which may bend toward the second lower part when the clamp 140 is installed on a rib joint 124.

Referring again to FIG. 13E, in one embodiment, the body 150 has a first curved portion 238 with a predetermined first radius of curvature between the first upper part 230 and the top 152. Additionally, or alternatively, the body can have a second curved portion 240 with a predetermined second radius of curvature between the second upper part 234 and the top. Optionally, the first and second radii of curvature are approximately 0.25 inches.

The rounded edges 238, 240 formed by the first and second radii of curvature reduce material required to produce the body 150 and thus reduce the weight of the body. This is beneficial to save costs, and also because the reduced weight of the clamp body transfers less force to a rib joint 124, thus reducing the potential to damage the building section when a plurality of clamps 140 are positioned on rib joints of the building surface. Additionally, reducing the weight of the body 150 reduces transportation costs associated with shipping or when moving clamps 140 to a work site.

The bottom 154 of the body 150 includes a slot 160. In one configuration, the slot 160 extends the entire length of the body between its first end 184 and its second end 186. The slot 160 may be characterized as being at least generally concave. In one embodiment, the slot 160 has a shape that is constant from the first end 184 to the second end 186 of the body.

The bottom 154 of the body further includes a first bottom surface 156 that is disposed on one side of the slot 160 and a second bottom surface 158 that is disposed on an opposite side of the slot 160. Accordingly, the first bottom surface 156 and second bottom surface 158 are spaced apart in the horizontal dimension 86. In one embodiment, the first bottom surface 156 is generally rounded or convex. Optionally, the first bottom surface 156 may be generally planar.

In one embodiment, the second bottom surface 158 may optionally be flat or generally planar. The second bottom surface has a predetermined width 159 of between about 0.25 inches and about 0.35 inches, or about 0.30 inches.

Notably, the first bottom surface 156 is spaced further from the first reference plane 102 than the second bottom surface 158. More specifically, the second bottom surface 158 may be disposed within the first reference plane 102. In contrast, in one configuration, the first bottom surface 156 is spaced above the second bottom surface 158 in the vertical dimension 87 such that the first bottom surface 156 is disposed at a higher elevation than the second bottom surface 158 in the installed configuration.

In one embodiment, the first bottom surface 156 is spaced a distance 174A of between about 1.6 inches and about 2.0 inches, or about 1.86 inches from the top 152. The second bottom surface 158 may be spaced a distance 174B of between about 2.1 inches and about 2.4 inches, or about 2.25 inches from the top 152.

The first bottom surface 156 is oriented at a predetermined angle 157 to the first reference plane 102. Optionally, the first bottom surface 156 is oriented at an oblique angle to the first reference plane 102. For example, the first bottom surface 156 may be oriented at an angle 157 of between approximately 20° and approximately 28°, or about 24° to the first reference plane. In one embodiment, the second bottom surface 158 is approximately parallel to the first reference plane 102.

Both the size and shape of the slot 160 are configured to accommodate installation of the body 150 on rib joints 124 of a variety of different profiles produced by various manufacturers. The slot 160 is defined by a first slot sidewall 162 and a second slot sidewall 172 that are spaced from one another in the horizontal dimension 86, and a slot base 168 that is spaced from the bottom 154 in the vertical dimension 87. An opening 196 for a recess 194 intersects the slot 160.

The first slot sidewall 162 is positioned on a first side of the second reference plane 104. The first slot sidewall may be characterized as proceeding from an intersection with the first bottom surface 156 to an intersection with the recess opening 196. In one configuration, the first slot sidewall 162 includes a first section 164 and a second section 166, with the second section 166 being disposed between the first section 164 and the recess 194. Optionally, different orientations relative to the second reference plane 104 are used for the first section 164 and the second section 166 of the first slot sidewall 162.

In one configuration, the first section 164 of the first slot sidewall 162 is disposed in converging relation to the second reference plane 104 proceeding from an intersection with the first bottom surface 156 to an intersection with the second section 166. In one configuration, the first section 164 is oriented at an angle 165 of between about 30° and about 40°, or about 34°, relative to the second refence plane. Angling the first section 164 away from the second reference plane is beneficial to provide a space for the distal end 214 of the insert 200. More specifically, to position the clamp 140 on a rib joint, the insert is pivoted into a first position proximate to the first slot sidewall 162 to maximize a width of the slot 160 as generally illustrated in FIG. 17.

The second section 166 of the first slot sidewall 162 can be angled relative to the first section 164. In one embodiment, an angle between the first section 164 and the second section 166 is between about 20° and about 30°, or about 24°. Moreover, the second section 166 can be oriented at an angle of about 5° and about 15°, or about 10° relative to the second reference plane. In one embodiment, the second section 166 is approximately parallel to the first lower part 232 of the first side surface. Optionally, both the first section 164 and the second section 166 of the first slot sidewall 162 have a flat or generally planar surface.

The recess 194 extends along a rotation axis 197 from the first end 184 to the second end 186 of the body. The rotation axis is substantially parallel to the longitudinal dimension 88. Optionally, the axis 197 is positioned a distance 199 of between about 0.88 inches and about 1.08 inches, or about 0.98 inches from the second side surface 182.

In one configuration, the recess has a generally circular cross section and defines a cylindrical opening through the body. The recess 194 has a diameter of between about 0.15 inches and about 0.26 inches, or about 0.21 inches.

Optionally, the recess can include one or more flat or faceted surfaces to engage the insert 200. In one embodiment, a detent extends into the recess 194 from the body 150 to retain the insert 200 within the recess or at a predetermined angle relative to the body. Additionally, or alternatively, the recess can include a dimple to receive a detent extending from a protrusion 206 of an insert 200.

In some embodiments, the material of the clamp 140 immediately adjacent to one or both ends of the recess 194 may be peened or otherwise treated to create one or more protrusions extending into the recess 194. Such protrusions may beneficially prevent the insert 200, once positioned in the recess 194 from sliding out of the end of the recess 194 adjacent the peening.

The recess opening 196 has a predetermined width 195. Optionally, the width 195 is between about 0.15 inches and about 0.17 inches, or about 0.163 inches.

In one configuration, the recess opening 196 is positioned between the first slot sidewall 162 and the slot base 168. However, other positions for the recess opening are contemplated. For instance, in some embodiments, the recess opening 196 is formed in the slot base 168 at a position that is spaced from the first slot sidewall as well as the second slot sidewall. In another example, the recess opening 196 may be formed in the first slot sidewall.

The slot base 168 generally extends between the first and second slot sidewalls. In one configuration, the slot base interconnects the recess opening 196 to the second slot sidewall 172. The slot base 168 is optionally oriented about parallel to the first reference plane 102. Moreover, the slot base 168 can be oriented about parallel to the top 152 of the body. In one embodiment, the slot base 168 is generally planar. Additionally, or alternatively, the slot base 168 may be spaced a distance 169 of between about 0.55 inches and about 0.65 inches, or about 0.60 inches from the stop 152 to define a thickness of the body 150.

The second slot sidewall 172 is positioned on a second side of the second reference plane 104 opposite to the first slot sidewall. The second slot sidewall can be characterized as proceeding from an intersection with the second bottom surface 158 to an intersection with the slot base 168. In one embodiment, the second slot sidewall 172 is a flat or a generally planar surface. The second slot sidewall is in a fixed position relative to the first slot sidewall 162 and the slot base 168. Accordingly, the width and cross-sectional shape of the slot are not adjustable by altering the orientations of the first and second slot sidewalls.

Optionally, one or more grooves 175 are formed in the second slot sidewall 172. An upper groove 175 may be positioned about 1.1 inch from the top 152. In one embodiment, a lower groove 175 is space about 0.06 inches from the upper groove.

The second slot sidewall is oriented in converging relation to the second reference plane 104 proceeding from an intersection with the second bottom surface 158 to an intersection with the slot base 168. Optionally, the second slot sidewall is oriented at an angle 173 of between about 2° and about 25°, or about 13°, relative to the second reference plane 104. In one configuration, the second slot sidewall is generally planar such that the second slot sidewall is approximately parallel to a sidewall 128 of a rib joint 124 when the body 150 is positioned on the rib joint as generally illustrated in FIG. 16. In this manner, the surface area of the second slot sidewall 172 in contact with the rib joint 124 is maximized to improve stability of the clamp 140. The engagement of the sidewall 128 of a rib joint with the second slot sidewall 172 prevents unintended or inadvertent rotation or movement of the clamp 140 relative to the rib joint.

Optionally a nose 178 projects into the slot 160 from the second slot sidewall 172. The nose 178 is configured to fit within a recess 130 of a rib joint 124 when the clamp 140 is installed over the rib joint as generally illustrated in FIGS. 16-17. While rib joints come in many different configurations, almost all rib joints have a recess such as the recess 130 on one side thereof. The nose 178 fits into such recesses and prevents the clamp 140, and in particular the body 150, from lifting up and over the rib joint upon insertion and tightening of a bar component 250, such as a threaded fastener described herein. In some embodiments, the way that the nose 178 engages an underside of an outer (or female) portion of the rib join 124 dramatically increases the strength of the clamp 140.

Referring again to FIG. 13E, the nose 178 is defined by a portion of the second bottom surface 158 and an oppositely disposed upper surface of the nose 178. The upper surface of the nose is in a converging relation to the first reference plane 102 proceeding from an intersection with the second slot sidewall 172 and in the direction that the first slot sidewall 162 is spaced from the second slot sidewall 172. In one embodiment, the upper surface of the nose 178 is oriented at an angle 179 of between about 10° and about 30° (or about 22°) relative to the first reference plane 102.

A free end of the nose 178 is spaced from the second slot sidewall 172 to define a width of between approximately 0.05 inches to approximately 0.3 inches, or approximately 0.13 inches. In one configuration, a cross section of the nose has a generally triangular shape.

Referring now to FIG. 13B, the top 152 includes at least one surface that is substantially flat and that is generally parallel to the first reference plane 102 (e.g., for interfacing with a structure being attached to the mounting body 150 such as generally illustrated in FIG. 17). A connection aperture 192 is formed in the top 152. The connection aperture 192 is adapted to receive an attachment fastener 254, such as a bolt or other fastener. In one embodiment, the connection aperture includes internal threads to engage threads of the attachment fastener 254. Alternatively, the connection aperture 192 is unthreaded. In this manner, the connection aperture can receive a self-tapping attachment fastener 254 with a variety of thread geometries. Moreover, leaving the connection aperture unthreaded reduces manufacturing operations and costs.

Optionally, the connection aperture 192 can extend through the top 152 and through the slot base 168. In this manner, an end of the attachment fastener 254 may project at least partially into the slot 160. Alternatively, the connection aperture 192 may have a depth that is less than the thickness of the slot base 168 such that the connection aperture 192 does not extend through the slot base 168.

In one embodiment, the connection aperture 192 extends into the top 152 in a direction that is about parallel to the vertical dimension 87. Additionally, or alternatively, the connection aperture 192 may be oriented approximately perpendicular to the top 152. Alternatively, in another embodiment, the connection aperture 192 is not parallel to the vertical dimension 87. In one configuration, two or more connection apertures 192 are formed in the top 152.

The connection aperture 192 may be offset from the recess 194 in one embodiment. For example, in the embodiment illustrated in FIG. 13B, an axis of the connection aperture 192 lies in the reference plane 104. The axis is spaced a distance 193 of between about 0.55 inches and 0.75 inches, or about 0.65 inches from the second side surface 182. Alternatively, in another embodiment, at least a portion of the connection aperture 192 intersects the recess 194 as generally illustrated in FIG. 15. An attachment fastener 254 advanced into the connection aperture 192 can then contact a protrusion 206 of an insert 200 received in the recess. In this manner, after the insert 200 is engaged with a rib joint 124 (as shown in FIG. 16), an attachment fastener can be advanced into the connection aperture 192 to contact the protrusion 206 and lock the insert 200 in position to prevent unintended or inadvertent movement of the insert.

Referring again to FIG. 13B, a bar aperture 190 extends through the first side surface 180 of the body 150 and through the first slot sidewall 162 to the slot 160. The bar aperture 190 is configured to receive a bar component 250 which can be advanced through the bar aperture 190 to secure the body 150 to a rib joint 124 as generally illustrated in FIGS. 16-17. The bar aperture 190 directs the bar component 250 to engage the insert 200. In this manner, the bar component will not contact a rib joint of the panel assembly 110 and cannot penetrate or damage the rib joint. In contrast, some prior art clamps include an aperture which directs a fastener or set screw into direct engagement with a rib joint. As will be appreciated by one of skill in the art, the contact from the fastener can damage the rib joint by denting the rib joint or scratching a surface or coating of the rib joint. This is not desirable because the damage may accelerate rusting or corrosion of the rib joint and void warranties provided by manufacturers.

The bar aperture 190 extends along an aperture axis 191. Optionally, the aperture axis 191 is about perpendicular to a portion of the first side surface 180. In one configuration, the aperture axis 191 is spaced a distance 188 of between about 0.66 inches and about 0.86 inches, or about 0.76 inches from the first bottom surface 156.

The aperture axis 191 is oriented at a predetermined angle relative to the first reference plane 102. More specifically, the aperture axis 191 can be disposed in converging relation to the first reference plane 102 proceeding from the first side surface 180 of the body 150 to the first slot sidewall 162. As such, when advanced in the direction of the aperture axis 190, the bar component 250 proceeds both horizontally (in the horizontal dimension 86) and downwardly (in the vertical dimension 87) to engage the insert 200 when securing the clamp 140 to a rib joint 124. The angled orientation of the aperture axis 191 in the body 150 beneficially allows a drill, screwdriver, or other device used to advance the bar component 250 (such as a threaded fastener) in the bar aperture 190 to be held at an obtuse angle relative to the building surface 100 from which the rib joint 124 extends. The angled orientation of the aperture axis 191 thus increases the clearance between the drill, screwdriver, or other device and thus facilitates use of the drill, screwdriver, or other device to advance the bar component 250 in the bar aperture 190.

The aperture axis 191 may be oriented at an angle of between about 5° and about 25° relative to the first reference plane 102. Optionally, the angle of the aperture axis 191 is about 10° relative to the first reference place. In one configuration, the aperture axis 191 is approximately perpendicular to the second section 166 of the first slot sidewall 162.

The insert 200 is used in conjunction with the body 150 to allow the clamp 140 to be installed on a variety of rib joints 124 with different profiles. More specifically, the insert 200 beneficially adjusts the width of the slot 160 to fit and rib joints of various profiles and sizes. The insert 200 is of a one-piece construction. In one embodiment, the insert is an extrusion. Alternatively, the insert may be formed as a casting, by machining, or other methods known to those of skill in the art. The insert may be formed of any suitable metal, such as aluminum, stainless steel, zinc, copper or brass alloys and combinations thereof.

The insert 200 is adapted to pivot or rotate in response to a force received from a bar component 250 advanced through the bar aperture 190. The bar component presses the insert into engagement with a sidewall 126 of a rib joint 124 to affix the clamp 140 to the rib joint as generally illustrated in FIGS. 16-17. The insert 200 of embodiments of the present disclosure generates a clamping pressure against the sidewall 126 that is continuous and evenly distributed along the entire length of the insert. By spreading the load along the length of the insert, damage to the rib joint is avoided and inadvertent or unintended movement of the clamp 140 relative to the rib joint is reduced.

Referring now to FIGS. 14A-14B, the insert 200 generally comprises a first end 202 and an opposing second end 204, a protrusion 206, and an arm 208 extending downwardly from the protrusion to a distal end 214. The insert 200 has a height 215 of between about 1.45 inches and about 1.65 inches, or about 1.56 inches.

A length of the insert is defined by the distance between the first and second ends 202, 204. Optionally, the insert length is about equal to the length of the body 150. However, in one configuration, the insert length is less than the body length as generally illustrated in FIG. 13D.

The protrusion 206 is configured to be received within the recess 194 of the body 150 with the arm 208 extending out of the recess opening 196. The insert 200 can be pivotally interconnected to the body 150 by aligning the protrusion 206 with an open end of the recess at either the first end 184 or the second end 186 of the body and then sliding the insert protrusion along the rotation axis 197 into the recess.

In one embodiment, the protrusion 206 has a cross-sectional profile that is about circular. Accordingly, the protrusion 206 can be characterized as having a shape that is generally cylindrical. In one embodiment, a vertical cross-section of the protrusion is generally symmetric relative to the second reference plane 104 when aligned as shown in FIG. 14A. Other shapes of the protrusion are contemplated. In one embodiment, a diameter 207 of the protrusion is between about 0.15 inches and about 0.25 inches, or about 0.20 inches.

Optionally, the protrusion 206 includes a detent (not illustrated) which projects outwardly. The detent can engage a corresponding surface within the recess to maintain the insert 200 in one or more positions relative to the body 150. Additionally, or alternatively, the protrusion 206 can include a flat surface or a recess to engage a detent extending into the recess 194 from the body 150.

In another embodiment, a depression or groove is formed in the protrusion. The groove may extend around the rotation axis 197. In this manner, an optional detent of the body 150 may be biased into the recess 194 to engage the groove of the protrusion 206.

The arm 208 has a first side surface 210 and a second side surface 212. In one configuration, the arm 208 is generally linear between the protrusion 206 and the distal end 214. Accordingly, the first and second side surfaces 210, 212 are generally planar in one embodiment. Moreover, the first and second side surfaces 210, 212 are optionally approximately parallel.

The arm 208 has a predetermined thickness 209. Optionally, the thickness is between about 0.09 inches and about 0.11 inches, or about 0.10 inches. In one embodiment, the first side surface 210 includes one or more groves 211 which are generally illustrated in FIG. 14A.

The distal end 214 of the arm 208 is optionally asymmetric about the second reference plane 104. In one embodiment, the distal end 214 includes a first projection 216 and an opposing second projection 220.

A cross-sectional shape of the first projection is different than the cross-sectional shape of the second projection. The first projection 216 includes a first sidewall 218 which extends away from the second reference plane 104 in the horizontal dimension 86. The first projection 216 extends a predetermined distance from the first side surface 210 to define a width 217 of the first projection. The width 217 is optionally between about 0.050 inches and 0.060 inches, or about 0.054 inches. In one embodiment, an angle 219 between the first sidewall 218 and the first side surface 210 (and the second reference plane 104) is between about 15° and about 25°, or about 21°.

The second projection 220 has a second sidewall 222 that extends away from the second reference plane 104 in the horizontal dimension. Optionally, an angle 223 between the second sidewall 222 and the second side surface 212 is from about 20° to about 30°, or about 24°.

The first sidewall 218 and the second sidewall 222 may have different lengths. In one embodiment, the first sidewall has a first length that is less than a second length of the second sidewall.

An end portion 224 of the distal end 214 connects the first sidewall 218 to the second sidewall 222. In one embodiment, the end portion 224 in approximately planar. The end portion 224 is oriented at a predetermined angle 225 to the horizontal axis 86. Optionally, the angle 225 is between about 10° and about 18°, or about 14°.

In one embodiment, a first curved portion 228A extends between the first sidewall 218 and the end portion 224. Additionally, or alternatively, a second curved portion 228B may extend between the second sidewall 222 and the end portion 224. The curved portions 228 generally provide a smooth surface to contact a sidewall 126 of a rib joint 124 without scratching or damaging the rib joint.

In one embodiment, the first curved portion 228A has a radius of curvature of about 0.07 inches. The second curved portion 228B has a radius of curvature of about 0.14 inches.

When the first projection 216 or the second projection 220 are moved into engagement with a sidewall 126 of a rib joint 124 as described herein, the rounded or curved surfaces of the distal end 214 prevent damage to the rib joint. More specifically, the surfaces of the distal end 214 are configured to prevent scratching of the material of (or a coating on) the rib joint 124. In contrast, some clamps are known with inserts that have corners or other surfaces that can scratch and cause damage to a rib joint.

In one embodiment, one or more of the first side surface 210 and the second side surface 212 of the insert 200 includes an optional dimple 226 that is alignable with the bar aperture 190. Dimples 226A, 226B of embodiments of the present disclosure are generally illustrated in FIGS. 16-17. As illustrated, when a bar component 250 is advanced in the bar aperture 190, a distal end 252 of the bar component will engage the dimple. In this manner, the bar component locks the insert relative to the recess 194 and prevents unintended movement of the insert protrusion 206 along the rotation axis 197 and/or toward the first or second ends 184, 186 of the body.

Referring now to FIG. 16, the clamp 140 of FIGS. 13-15 is illustrated engaged to a rib joint 124 of a building section 100. The building section includes an adjacent pair of nail strip panels 112 which are interconnected to form the rib joint 124. The rib joint includes at least one interior space and may be characterized as "hollow".

A first nail strip panel 112A is positioned on an appropriate support structure (e.g., a deck or decking) and a plurality of fasteners may be directed through a nail strip flange 114 to secure the nail strip panel 112A to the underlying support structure.

A second nail strip panel 112B is then positioned such that its rib joint section 120 is positioned over a rib joint section 122 of the first nail strip panel 112A that is already secured to the underlying support structure to form a rib joint 124. As such, a base section 118B of the second-installed nail strip panel 112B is disposed over the nail strip flange 114 of the first nail strip panel 112A.

Each rib joint 124 of the panel assembly 110 includes a first or left rib sidewall 126, a second (right) rib sidewall 128, and an upper end 132 (e.g., an uppermost end of the nail strip seam rib 124). The left rib sidewall 126 and the right rib sidewall 128 are spaced from one another at least generally in the horizontal dimension 86, while the upper end 132 is spaced from the base sections 118 of the corresponding nail strip panels 112 at least generally in the vertical dimension 87. The right rib sidewall 128 includes a recess 130 that is disposed adjacent to an adjacent base section 118A. In the illustrated embodiment, the recess 130 is defined by a space between the first seam rib section 120 of the second nail strip panel 112B and the base section 118A of the first nail strip panel 112A.

There are many different configurations and profiles of nail strip panels that may be used to define the panel assembly 110 for the building section 100. It should be appreciated that a profile of a given nail strip panel may be different compared to a profile of another nail strip panel with regard to geometry, dimensions, or both. As such, the left rib sidewall 126, the right rib sidewall 128, or both may be disposed in different orientations from that shown in FIG. 16. However, the clamp 140 includes a body 150 and an insert 200 configured to accommodate panel assemblies 110 utilizing a variety of profiles defined by nail strip panels 112 from various manufactures.

To accommodate rib joints 124 of different shapes and sizes, the insert 200 is adapted to be reversable. Specifically, the insert protrusion 206 can be positioned in the body recess 194 such that either the first side surface 210 or the second side surface 212 is proximate to the first slot sidewall 162. A user can interconnect the insert 200 to the body 150 with the first side surface 210 proximate to the first slot sidewall 162 based on the geometry of a first rib joint 124A and as generally illustrated in FIG. 16. In this manner, the second projection 220 of the insert 200 will engage the left sidewall 126 of the rib joint 124A. As the bar component 250 is advanced into the bar aperture 190, the insert 200 rotates away from the first slot sidewall 162 and against the left sidewall 126 of the rib joint and forces the right sidewall 128 of the rib joint against the second slot sidewall 172.

The bar component 250 used by the clamp 140 exerts a force on the insert 200 such that the rib joint 124 is compressed between the insert 200 and the second slot sidewall 172 of the body 150. In contrast, a drawback of clamps that do not include an insert such as the insert 200 is that set screws or other fasteners used therewith may puncture or scratch the rib joint 124 as the set screws or other fasteners are tightened, and before sufficient clamping force is achieved. In addition to reducing the effectiveness of such clamps, unnecessary holes in the building surface are undesirable both for functional and aesthetic reasons. For example, a puncture or scratch may allow water to corrode the building surface and/or infiltrate into the rib joint 124. The insert 200 of the present disclosure beneficially distributes the force exerted by the bar component 250 across a greater area of the rib joint 124, thus greatly reducing the risk of puncturing a hole in the rib joint 124. The insert 200 achieves the desired amount of clamping force through increased friction resulting from the pressure of the insert 200 against the rib joint 124, and thus enables the clamp 140 to remain in place while reducing or eliminating any need to achieve a mechanical interlock between the mounting assembly 140 and the rib joint 124 (i.e. by deforming the rib joint 124) to hold the clamp 140 in place. In at least some embodiments, the insert 200 will be spaced from the first slot sidewall 162 of the mounting body 150 when the clamp 140 is in its installed configuration.

Figure 17A:
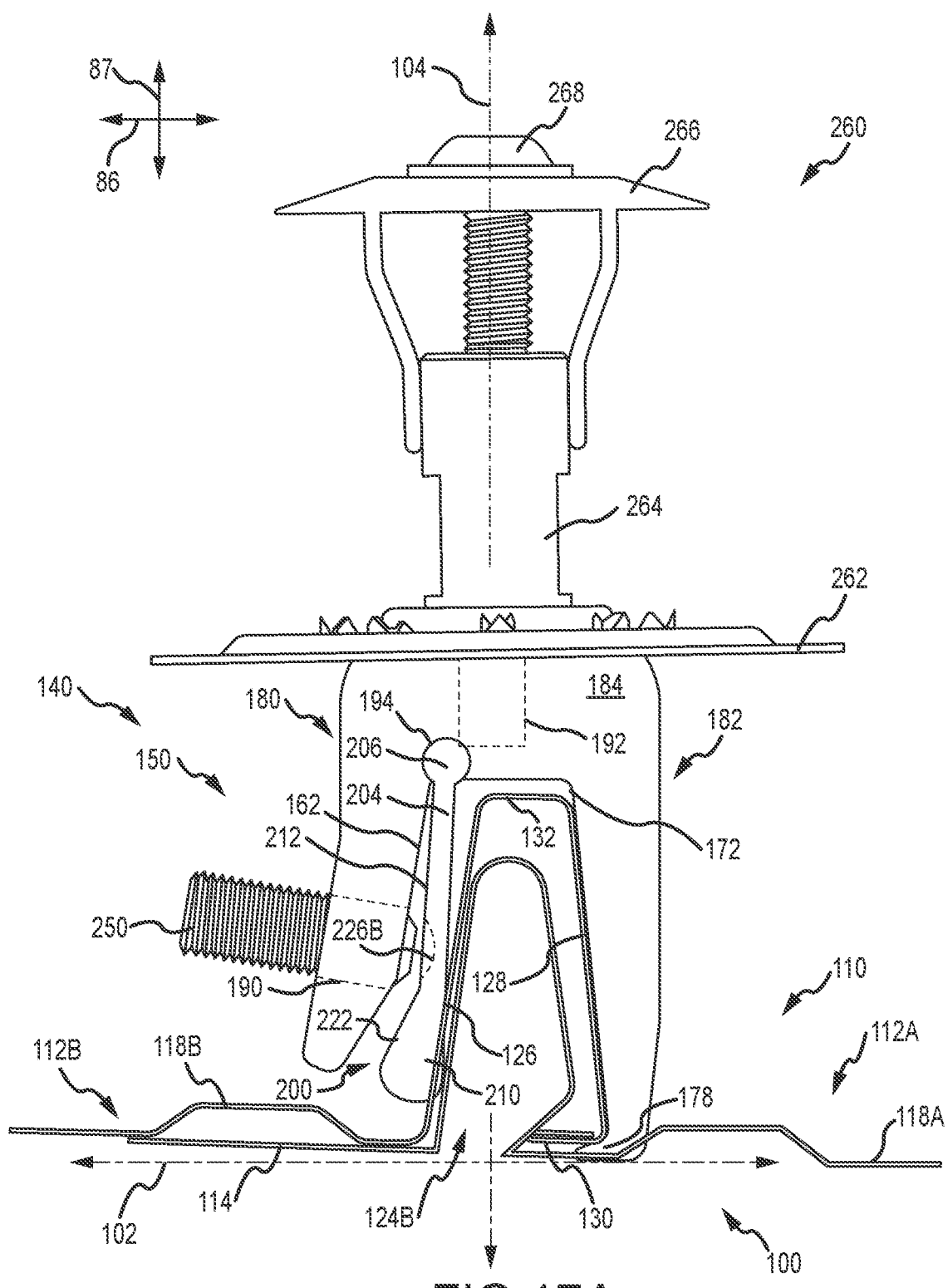
FIG. 17A is another end elevation view of the clamp of FIG. 16 engaged to a second rib joint.
Figure 17B:
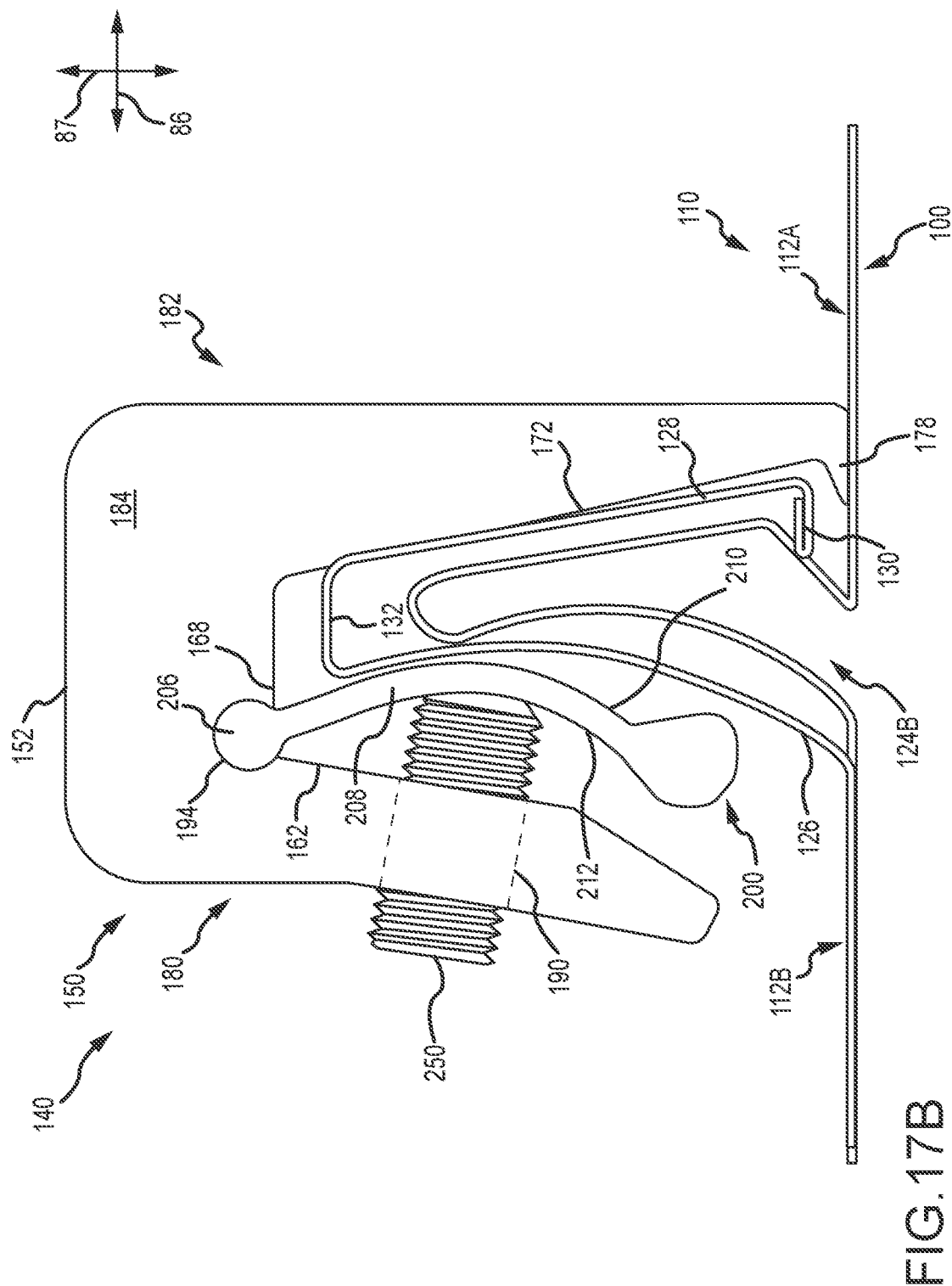
FIG. 17B is an end elevation view of the clamp of FIG. 17A engaged to the second rib joint and illustrating the insert bent by a bar component advanced through an aperture of the clamp to engage the second rib joint.

Referring now to FIGS. 17A-17B, the clamp 140 of FIGS. 13-15 is shown positioned on a second rib joint 124B with a profile that is different than the profile of the first rib joint 124A. Notably, the insert 200 is positioned in the body recess 194 opposite to the orientation shown in FIG. 16 and such that the second side surface 212 is proximate to the first slot sidewall 162. Accordingly, when a bar component 250 is advanced through the bar aperture 190, the first projection 216 of the insert will engage a left sidewall 126 of the rib joint 124B. The force from the insert 200 presses a right sidewall 128 of the rib joint against the second slot sidewall 172.

As shown in FIG. 17A, in one embodiment, the second side surface 212 and the second sidewall 222 of the insert have shapes that generally correspond to the shapes of the respective first and second sections 164, 166 of the first slot sidewall 162. More specifically, before the bar component 250 is advanced through the bar aperture, the second side surface 212 of the insert may be positioned in a substantially parallel relation with the second section 166 of first slot sidewall 162. Additionally, or alternatively, the second sidewall 222 of the insert second projection 220 can be positioned in a substantially parallel relation with the first section 164 of first slot sidewall 162.

FIG. 17A also illustrates a mounting assembly 260 interconnected to the clamp 140. The mounting assembly 260 generally includes a mounting plate 262 connected to the body 150 by a threaded shaft (not illustrated) extending from a stanchion 264 that engages the connection aperture 192. A clamp 266 is interconnected to the stanchion 264 by a fastener 268. Other objects and mounting assemblies of different configurations may be interconnected to the clamp 140. Examples of mounting assemblies that may be used with the clamp of all embodiments of the present disclosure are described in U.S. Pat. No. 10,903,785 which is incorporated herein by reference.

As illustrated in FIG. 17B, in some embodiments, the arm 208 of the insert 200 may bend as the bar component 250 is advanced through the bar aperture 190 and applies a force to the insert. As the arm is bent by the force from the bar component 250, one of the side surfaces facing the aperture 190 (the second side surface 212 in the example of FIG. 17B) changes from a first shape that is generally linear to a second shape that is concave. The other side surface (the first side surface 210) changes from the first shape to a convex shape. In this manner, the side surface facing the sidewall 126 of the rib joint 124 generally forms to the shape of the sidewall to prevent damage to the sidewall.

Moreover, as generally illustrated in FIG. 17B, the rib joint sidewall 126 facing the insert 200 may also change from an initial shape that is generally planar (as illustrated in FIG. 17A) to an engaged shape that is concave as shown in FIG. 17B. The convex side surface 210 of the insert 200 can fit into the concave sidewall 126 to increase the holding strength of the clamp 140. For example, engagement between the concave sidewall 126 and the convex side surface 210 may increase the force required to lift the clamp 140 off of the rib joint 124B.

Figure 18:
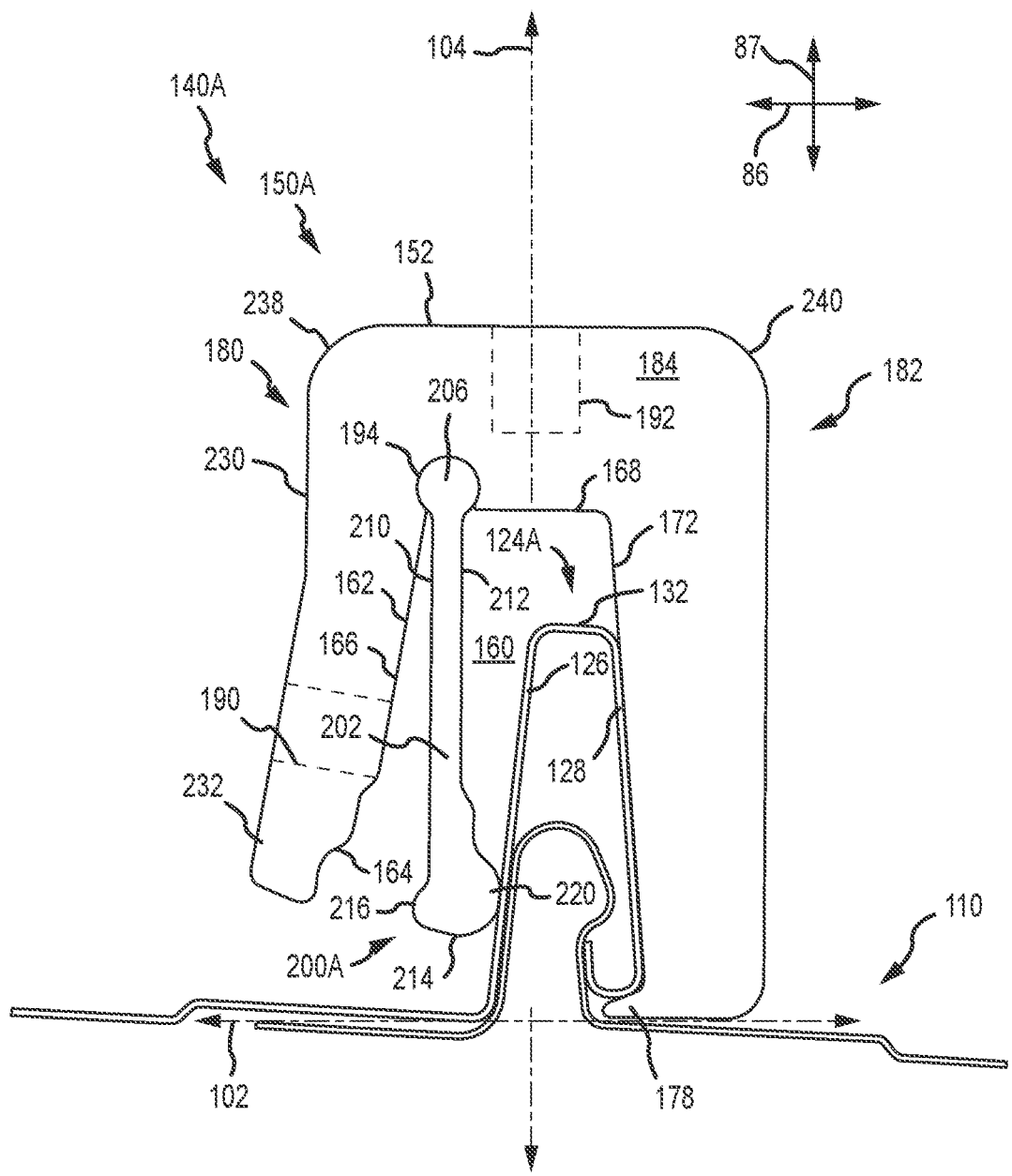
FIG. 18 is an end elevation view of another clamp of the present disclosure engaged to the first rib joint.
Figure 19:
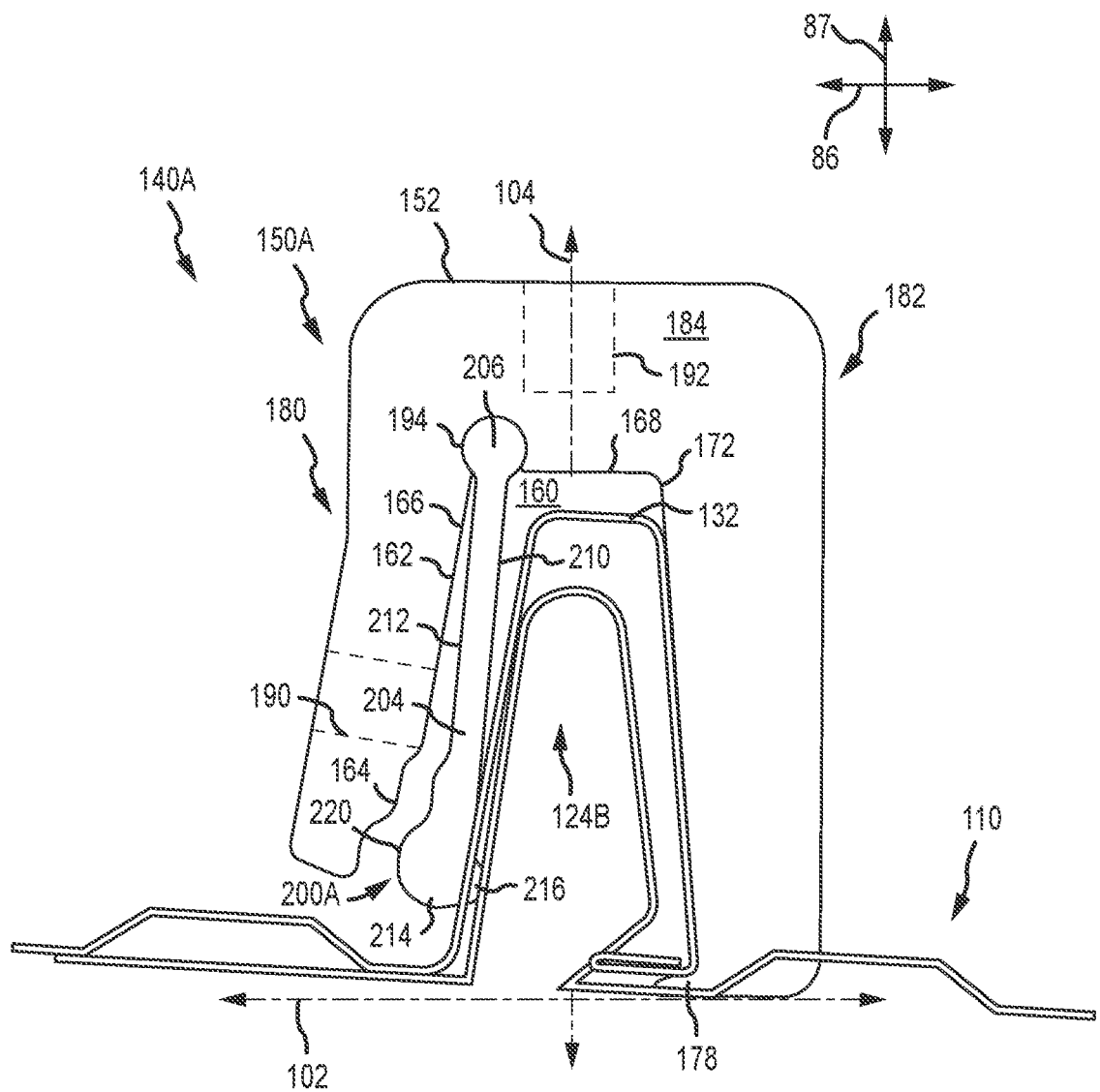
FIG. 19 is another end elevation view of the clamp of FIG. 18 engaged to the second rib joint.

Referring now to FIGS. 18-19, a clamp 140A of another embodiment of the present disclosure is generally illustrated. The clamp 140A is similar to the clamp 140 described in conjunction with FIGS. 13-17 and has many of the same or similar features. For example, the insert 200A can be interconnected to the body 150A such that either the first side surface 210 or the second side surface 212 is proximate to the first slot sidewall 162.

Notably, the insert 200A has a distal end 214 with a different shape compared to the insert of FIG. 14. In one embodiment, the first side surface 210 extends to a first projection 216. However, the first side surface 210 does not include a first sidewall as in the insert 200 of FIG. 14. In addition, the first projection 216 has a cross sectional shape of a semicircle.

The protrusion 206 of the insert 200A can be positioned in the body recess 194 with the first side surface 210 proximate to the first slot sidewall 162 (as generally illustrated in FIG. 18). Alternatively, to engage a rib joint 124B with a different size or geometry, the insert is positioned in the body recess 194 with the second side surface 212 proximate to the first slot sidewall 162 as shown in FIG. 19. The first section 164 of the first slot sidewall 162 has a shape that generally corresponds to the second side surface 212 of the insert (as generally shown in FIG. 19).

Yet another embodiment of a clamp 140B of the present disclosure is generally illustrated in FIGS. 20-21. The clamp includes a body 150B and an insert 200B which are similar to the bodies and inserts of the clamps described in conjunction with FIGS. 13-19. Moreover, the clamp 140B may include any of the elements as well as the geometry of the clamps of other embodiments described herein.

The first bottom surface 156 is closer to the first reference plane 102 than the second bottom surface 158. In one embodiment, the first slot sidewall 162 defines a plane between the first bottom surface 156 and the slot base 168.

In another embodiment, the slot base 168 is not parallel to the first reference plane. More specifically, the slot base 168 extends from the first slot sidewall 162 upwardly away from the first reference plane to an intersection with the second slot sidewall 172.

Optionally, the recess opening 196 includes at least one stop 198. The stop 198 projects into the slot 160 from the slot base 168. The stop 198 is configured to engage the arm 208 of the insert 200B to limit rotation of the insert to a predetermined amount. In one embodiment, the body 150B includes one or more of a first stop 198A proximate to the first slot sidewall and a second stop 198B proximate to the second slot sidewall 172.

The insert 200B includes a first projection 216 and a second projection 220. In one embodiment, the arm 208 of the insert has a length that is greater than a height of the first slot sidewall 162. Accordingly, before the insert 200 pivots toward the second slot sidewall, the first projection 216 can extend past the first bottom surface 156 as generally shown in FIG. 21.

In one embodiment, a recess or dimple 226 is formed in the arm 208 of the insert. The dimple is formed at a position of the arm that aligns with the bar aperture 190 when the protrusion 206 of the insert is positioned in the body recess 190. In this manner, a bar component 250 advanced through the bar aperture 190 will engage the dimple 226 and prevent movement of the protrusion along the axis of rotation 197 of the recess 194.

Clamps according to embodiments of the present disclosure may be used to help strengthen a raised roof joint between two roof panels against forces imposed on the joint as a result of wind blowing upward against the roof panels.

To provide additional background, context, and to further satisfy the written description requirements of 35 U.S.C. § 112, the following references are incorporated by reference herein in their entireties: U.S. Pat. Nos. 6,718,718; 7,758,011; 8,844,234; 8,910,928; 9,611,652; 9,920,958; 10,077,562; U.S. Pat. App. Pub. 2018/0128295, and U.S. Pat. App. Pub. 2020/0191180.

Ranges have been discussed and used within the forgoing description. One skilled in the art would understand that any sub-range within the stated range would be suitable, as would any number or value within the broad range, without deviating from the disclosure. Additionally, where the meaning of the term "about" as used herein would not otherwise be apparent to one of ordinary skill in the art, the term "about" should be interpreted as meaning within plus or minus five percent of the stated value.

Throughout the present disclosure, various embodiments have been disclosed. Components described in connection with one embodiment are the same as or similar to like-numbered components described in connection with another embodiment.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Any of the steps, functions, and operations discussed herein can be performed continuously and automatically.

What is claimed is:

1. A clamp selectively securable to a joint connecting two metal panels of a building surface, comprising:
    a body including:
        a slot to receive the joint, the slot including:
            a first slot sidewall;
            a second slot sidewall; and
            a slot base between the first slot sidewall and the second slot sidewall;
        a recess that extends through the body along a rotation axis that is oriented approximately perpendicular to a first end of the body, the recess including an opening to the slot; and
        an aperture that extends through the first slot sidewall to the slot, the aperture extending along an aperture axis that intersects the second slot sidewall at an oblique angle;
    an insert including:
        a protrusion positionable within the recess;
        an arm extending from the protrusion to a distal end of the insert;
        a first side surface of the arm;
        a first projection extending away from the first side surface; and
        a second side surface of the arm, wherein the protrusion is positionable within the recess of the body such that one of the first side surface and the second side surface of the arm is facing the first slot sidewall; and
    a bar component disposable in the aperture to engage the insert and pivot the distal end of the insert about the rotation axis from a first position proximate to the first slot sidewall to a second position spaced from the first slot sidewall.

2. The clamp of claim 1, wherein the protrusion of the insert has a circular cross-sectional shape that complements a circular cross-sectional shape of the recess, and wherein the recess opening intersects the first slot sidewall and the slot base.

3. The clamp of claim 1, wherein the first and second side surfaces of the arm are generally planar.

4. The clamp of claim 1, wherein the rotation axis does not intersect the aperture axis.

5. The clamp of claim 1, wherein the protrusion of the insert is positioned in the recess of the body with the first side surface of the arm facing toward the first slot sidewall.

6. The clamp of claim 1, wherein the insert can pivot such that a portion of the insert contacts the second slot sidewall before the joint is received in the slot.

7. The clamp of claim 1, wherein the first projection has a first curved surface to engage a sidewall of the joint, and wherein the second side surface of the arm comprises a curved portion to engage the sidewall of the joint.

8. The clamp of claim 1, wherein the first slot sidewall comprises a first section and a second section, with the second section of the first slot sidewall being located between the first section of the first slot sidewall and the slot base in a vertical dimension, and wherein the first section of the first slot sidewall and the second section of the first slot sidewall are each disposed in different orientations relative to the vertical dimension.

9. The clamp of claim 1, wherein the body further comprises a nose that extends into the slot from the second slot sidewall, and wherein the nose extends from a lower end of the second slot sidewall and into the slot.

10. The clamp of claim 9, wherein the second slot sidewall is generally planar between an upper portion of the nose and the slot base, and wherein no aperture extends through the second slot sidewall.

11. The clamp of claim 1, wherein the second slot sidewall is oriented at an oblique angle to the first slot sidewall and to the slot base, and wherein the first slot sidewall is fixed relative to the second slot sidewall and the slot base.

12. The clamp of claim 1, wherein the aperture has an internal thread and the bar component has an external thread that complements the internal thread of the aperture, and wherein the body further comprises a top surface and an attachment aperture that extends into the top surface.

13. The clamp of claim 1, wherein the aperture axis is oriented at an oblique angle to a first section of the first slot sidewall.

14. The clamp of claim 1, wherein the aperture axis is oriented perpendicular to a second section of the first slot sidewall.

15. A clamp body selectively securable to a joint connecting two metal panels of a building surface, comprising:
    a first end spaced from a second end in a longitudinal dimension;
    a slot to receive the joint, the slot extending from the first end to the second end and comprising:
        a first slot sidewall;
        a second slot sidewall oriented at an oblique angle to the first slot sidewall;
        a slot base between the first slot sidewall and the second slot sidewall; and
        a nose that extends into the slot from the second slot sidewall, wherein the second slot sidewall is fixed relative to the first slot sidewall and the slot base;
    a recess that extends through the clamp body from the first end to the second end along a rotation axis that is approximately perpendicular to the first end, the recess including an opening to the slot; and
    an aperture that extends through the first slot sidewall to the slot, the aperture extending along an aperture axis that intersects the second slot sidewall at an oblique angle.

16. The clamp body of claim 15, wherein the aperture axis is oriented at an oblique angle to a first section of the first slot sidewall.

17. The clamp body of claim 16, wherein the aperture axis is oriented perpendicular to a second section of the first slot sidewall, and wherein the second section is positioned between the first section and the slot base.

18. The clamp body of claim 16, wherein the aperture extends through a second section of the first slot sidewall that is oriented at an oblique angle to the first section.

19. The clamp body of claim 18, wherein the second section of the first slot sidewall is oriented at an oblique angle to the slot base.

20. The clamp body of claim 16, wherein the first section of the first slot sidewall is oriented at an oblique angle to the slot base.

* * * * *